US012064924B2

(12) United States Patent
Yamada et al.

(10) Patent No.: US 12,064,924 B2
(45) Date of Patent: Aug. 20, 2024

(54) IMAGE PROCESSING DEVICE, IMAGE PROCESSING METHOD, THREE-DIMENSIONAL OBJECT FORMING DEVICE, AND NON-TRANSITORY COMPUTER-READABLE STORAGE MEDIUM STORING COMPUTER PROGRAM

(71) Applicant: Seiko Epson Corporation, Tokyo (JP)

(72) Inventors: Kazumi Yamada, Azumino (JP); Takeshi Tsuchiya, Shiojiri (JP); Tomoyuki Yamada, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 342 days.

(21) Appl. No.: 17/569,650

(22) Filed: Jan. 6, 2022

(65) Prior Publication Data
US 2022/0212412 A1 Jul. 7, 2022

(30) Foreign Application Priority Data

Jan. 7, 2021 (JP) ................................ 2021-001493

(51) Int. Cl.
*B29C 64/393* (2017.01)
*B29C 64/112* (2017.01)
(Continued)

(52) U.S. Cl.
CPC .......... *B29C 64/393* (2017.08); *B29C 64/112* (2017.08); *B29C 64/209* (2017.08);
(Continued)

(58) Field of Classification Search
None
See application file for complete search history.

(56) References Cited

U.S. PATENT DOCUMENTS 8,559,052 B2 * 10/2013 Jacob ..................... G06Q 30/06
358/1.6
10,016,940 B2 * 7/2018 Liu ....................... B29C 64/393
(Continued)

FOREIGN PATENT DOCUMENTS

| JP | 2014-100635 A | 6/2014 |
| JP | 2017-019059 A | 1/2017 |
| JP | 2020-123237 A | 8/2020 |

*Primary Examiner* — Anand P Bhatnagar
(74) *Attorney, Agent, or Firm* — Harness, Dickey & Pierce, P.L.C.

(57) ABSTRACT

An image processing device includes a control section that causes a display section to display a first screen, and a reception section, the first screen includes a preview screen, and the preview screen includes i. a first preview screen that makes a first formation candidate, which is a formation candidate to be formed on a first forming surface of the three-dimensional object, visible to the user, ii. a second preview screen that makes a second formation candidate, which is the formation candidate to be formed on a second forming surface different from the first forming surface of the three-dimensional object, visible to the user, and iii. a third preview screen that makes a third formation candidate, which is the formation candidate to be formed on a third forming surface different from the first forming surface and the second forming surface of the three-dimensional object, visible to the user.

20 Claims, 11 Drawing Sheets

(51) Int. Cl.
  *B29C 64/209*  (2017.01)
  *B33Y 50/02*   (2015.01)
  *G06T 15/00*   (2011.01)
  *G06T 17/00*   (2006.01)
  *B33Y 10/00*   (2015.01)
  *B33Y 30/00*   (2015.01)

(52) U.S. Cl.
  CPC ............. *B33Y 50/02* (2014.12); *G06T 15/00* (2013.01); *G06T 17/00* (2013.01); *B33Y 10/00* (2014.12); *B33Y 30/00* (2014.12)

(56) References Cited

U.S. PATENT DOCUMENTS

| | | | |
|---|---|---|---|
| 10,045,405 B2* | 8/2018 | Chien | G09F 13/18 |
| 10,459,430 B2* | 10/2019 | Levine | G06F 3/1243 |
| 10,484,561 B2* | 11/2019 | Ilic | G06T 15/04 |
| 10,551,744 B2* | 2/2020 | Hart | G03F 7/2051 |
| 2006/0066929 A1* | 3/2006 | Miyazawa | H04N 1/3871 |
| | | | 358/540 |
| 2006/0192778 A1* | 8/2006 | Otani | G06T 15/005 |
| | | | 345/419 |
| 2006/0209064 A1* | 9/2006 | Otani | A63F 13/10 |
| | | | 345/419 |
| 2015/0283825 A1 | 10/2015 | Takai et al. | |
| 2017/0072639 A1* | 3/2017 | Levine | B29C 64/386 |
| 2018/0108185 A1* | 4/2018 | Capoia | G06T 19/20 |
| 2021/0312096 A1* | 10/2021 | Bowen | G06F 40/186 |
| 2021/0362425 A1* | 11/2021 | Tastl | B33Y 50/02 |

\* cited by examiner

① SELECT JOB
YOU CAN ALSO SELECT PRESET JOB OR CHANGE EXISTING JOB AND SAVE IT

Job PRESET:

| NAME | COMMENT |
|---|---|
| ✓ List Item1 | FOR CUP (CLEAN MODE) |
| List Item2 | FOR CUP (CLEAN MODE) |
| List Item3 | FOR CUP (CLEAN MODE) |
| List Item4 | FOR CUP (CLEAN MODE) |

- NEW CREATION
- DELETE
- READ...
- EXPORT

② PRINTER
SELECT DESTINATION PRINTER
PRINTER: PRINTER#1

③ SELECT WORK
SELECT THREE-DIMENSIONAL OBJECT DATA SERVING AS BASE TO BE PRINTED cup-base   REFERENCE...   DELETE ④ PRINTED IMAGE
SELECT IMAGE TO BE PRINTED ON EACH SIDE OF WORK   PREVIEW   Position...

● Front Image
Figure1.jpg   REFERENCE...   DELETE
IMAGE ADDITION

● Back Image
Figure2.jpg   REFERENCE...   DELETE
IMAGE ADDITION

● Left Image
● Right Image

⑤ JOB INSTRUCTION/MESSAGE
ENTER JOB INSTRUCTION TO OPERATOR
MESSAGE:
IMAGE ON BACK (Figure2.jpg) IS NO LONGER NEEDED THIS TIME, SO PLEASE TURN OFF PRINTING

IMAGE PROCESSING DEVICE, IMAGE PROCESSING METHOD, THREE-DIMENSIONAL OBJECT FORMING DEVICE, AND NON-TRANSITORY COMPUTER-READABLE STORAGE MEDIUM STORING COMPUTER PROGRAM

The present application is based on, and claims priority from JP Application Serial Number 2021-001493, filed Jan. 7, 2021, the disclosure of which is hereby incorporated by reference herein in its entirety.

BACKGROUND

1. Technical Field

The present disclosure relates to an image processing device, an image processing method, a three-dimensional object forming device, and a non-transitory computer-readable storage medium storing a computer program.

2. Related Art

In the related art, a technique of printing on a base material having a curved surface shape using an articulated robot or a print head is known (JP-A-2017-19059).

Provided is a technique that is excellent in user convenience when image formation is performed so that an image can be visually recognized from a plurality of surfaces of a three-dimensional object, such as a configuration in which an image is formed on a plurality of surfaces constituting A three-dimensional object or a configuration in which A three-dimensional object itself is formed.

SUMMARY

1. According to a first aspect of the present disclosure, there is provided an image processing device. This image processing device is used to form a three-dimensional object, the image processing device includes a control section that causes a display section to display a first screen for a user to give an instruction, and a reception section that receives the instruction from the user via the display section, the first screen includes a preview screen that makes formation candidates to be formed on the three-dimensional object visible to the user, and the preview screen includes i. a first preview screen that makes a first formation candidate, which is the formation candidate to be formed on a first forming surface of the three-dimensional object, visible to the user, ii. a second preview screen that makes a second formation candidate, which is the formation candidate to be formed on a second forming surface different from the first forming surface of the three-dimensional object, visible to the user, and iii. a third preview screen that makes a third formation candidate, which is the formation candidate to be formed on a third forming surface different from the first forming surface and the second forming surface of the three-dimensional object, visible to the user.

2. According to a second aspect of the present disclosure, there is provided a three-dimensional object forming device. This three-dimensional object forming device includes an ejection head that ejects a liquid, and the image processing device according to the above aspect.

3. According to a third aspect of the present disclosure, there is provided an image processing method. This image processing method is used to form a three-dimensional object, the image processing method includes a display step of causing a display section to display a first screen for a user to give an instruction, and a reception step of receiving the instruction from the user via the display section, the first screen includes a preview screen that makes formation candidates to be formed on the three-dimensional object visible to the user, and the preview screen includes i. a first preview screen that makes a first formation candidate, which is the formation candidate to be formed on a first forming surface of the three-dimensional object, visible to the user, ii. a second preview screen that makes a second formation candidate, which is the formation candidate to be formed on a second forming surface different from the first forming surface of the three-dimensional object, visible to the user, and iii. a third preview screen that makes a third formation candidate, which is the formation candidate to be formed on a third forming surface different from the first forming surface and the second forming surface of the three-dimensional object, visible to the user.

4. According to a fourth aspect of the present disclosure, there is provided a non-transitory computer-readable storage medium storing a computer program. This computer program is used to form a three-dimensional object, the computer program causes a computer to execute a display function of causing a display section to display a first screen for a user to give an instruction, and a reception function of receiving the instruction from the user via the display section, the first screen includes a preview screen that makes formation candidates to be formed on the three-dimensional object visible to the user, and the preview screen includes i. a first preview screen that makes a first formation candidate, which is the formation candidate to be formed on a first forming surface of the three-dimensional object, visible to the user, ii. a second preview screen that makes a second formation candidate, which is the formation candidate to be formed on a second forming surface different from the first forming surface of the three-dimensional object, visible to the user, and iii. a third preview screen that makes a third formation candidate, which is the formation candidate to be formed on a third forming surface different from the first forming surface and the second forming surface of the three-dimensional object, visible to the user.

BRIEF DESCRIPTION OF THE DRAWINGS

FIG. 8 is a diagram illustrating a print preparation dialog according to the embodiment of the present disclosure.

FIG. 9 is a diagram illustrating a print dialog according to the embodiment of the present disclosure.

FIG. 12 is a diagram schematically showing the entire administrator setting screen according to the embodiment of the present disclosure.

DESCRIPTION OF EXEMPLARY EMBODIMENTS

The following description will be given using an X axis, a Y axis, and a Z axis that intersect each other as appropriate. Further, one direction along the X axis is referred to as an X1 direction, and a direction opposite to the X1 direction is referred to as an X2 direction. Similarly, the directions opposite to each other along the Y axis are referred to as a Y1 direction and a Y2 direction. Further, the directions opposite to each other along the Z axis are referred to as a Z1 direction and a Z2 direction.

Here, the X axis, the Y axis, and the Z axis are the coordinate axes of the base coordinate system set in the space where a three-dimensional object W and a base 210, which will be described later, are installed. Typically, the Z axis is a vertical axis, and the Z2 direction corresponds to a downward direction in the vertical direction. The Z axis may not be a vertical axis. Further, the X axis, the Y axis, and the Z axis are typically orthogonal to each other, but the present disclosure is not limited thereto, and the X axis, the Y axis, and the Z axis may not be orthogonal to each other. For example, the X axis, the Y axis, and the Z axis may intersect each other at an angle within the range of 80° or more and 100° or less.

A. EMBODIMENT

A-1. Configuration of Three-Dimensional Object Forming System

Figure 1:
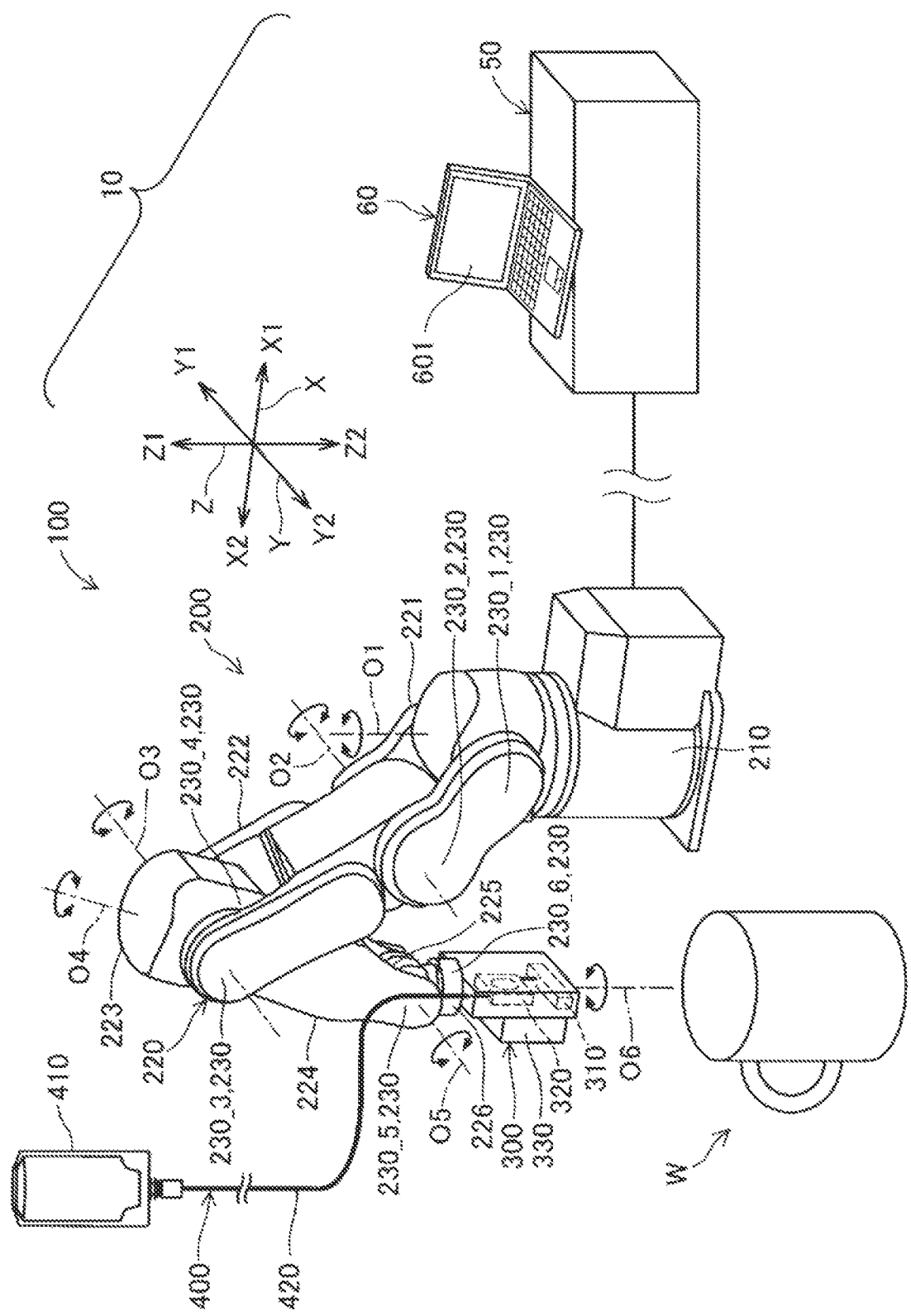
FIG. 1 is a perspective view schematically showing a three-dimensional object forming system according to an embodiment of the present disclosure.

FIG. 1 is a perspective view schematically showing a three-dimensional object forming system 10 according to an embodiment of the present disclosure. The three-dimensional object forming system 10 includes a three-dimensional object forming device 100, a robot control device 50, and an image processing device 60. The three-dimensional object forming device 100 and the robot control device 50, and the robot control device 50 and the image processing device 60 are connected to each other by wire or wirelessly.

The three-dimensional object forming device 100 is a device that forms an image as a formation by printing on the surface of a three-dimensional object W by an ink jet method using a vertical articulated robot. The robot control device 50 controls the operation of the three-dimensional object forming device 100. The image processing device 60 is, for example, a personal computer, a smartphone, or a tablet terminal, and includes a display section 601 and a display control device 610 that controls an image to be displayed on the display section 601. The display section 601 is constituted by a liquid crystal display and an organic EL display. In addition to the function of visually displaying information, the display section 601 may simultaneously have a function of receiving an instruction from a user, such as a reception section 621 to be described later, for example, a touch panel. Here, at least a part of the functions of the image processing device 60 may be built in as a part of the robot control device 50. Further, the image processing device 60 and the display section 601 may be separately configured to perform data communication by wire or wirelessly.

The three-dimensional object forming device 100 includes a robot 200, a liquid ejection unit 300, and a liquid supply unit 400. Hereinafter, each portion of the three-dimensional object forming device 100 shown in FIG. 1 will be described first.

The robot 200 is a moving mechanism that changes the position and posture of the liquid ejection unit 300 with respect to the three-dimensional object W. In the example shown in FIG. 1, the robot 200 is a so-called 6-axis vertical articulated robot. The robot 200 includes a base 210 and an arm 220.

The base 210 is a base that supports the arm 220. In the example shown in FIG. 1, the base 210 is fixed to an installation surface such as a floor surface facing the Z1 direction by screwing or the like. The installation surface on which the base 210 is fixed may be a surface facing in any direction, and may be, for example, a surface provided by a wall, a ceiling, a movable trolley, or the like.

The arm 220 is a 6-axis robot arm having a base end attached to the base 210 and a tip that changes its position and posture three-dimensionally with respect to the base end. Specifically, the arm 220 has arms 221, 222, 223, 224, 225, and 226, which are connected in this order.

The arm 221 is rotatably connected to the base 210 around a first rotation shaft O1 via a joint portion 230_1. The arm 222 is rotatably connected to the arm 221 around a second rotation shaft O2 via a joint portion 230_2. The arm 223 is rotatably connected to the arm 222 around a third rotation shaft O3 via a joint portion 230_3. The arm 224 is rotatably connected to the arm 223 around a fourth rotation shaft O4 via a joint portion 230_4. The arm 225 is rotatably connected to the arm 224 around a fifth rotation shaft O5 via a joint portion 230_5. The arm 226 is rotatably connected to the arm 225 around a sixth rotation shaft O6 via a joint portion 230_6. In the following, each of the joint portions 230_1 to 230_6 may be referred to as a joint portion 230.

The liquid ejection unit 300 is attached to the tip of the arm 220, that is, the arm 226, as an end effector.

The liquid ejection unit 300 includes a liquid ejecting head 310 that ejects ink, which is an example of a liquid, toward the three-dimensional object W, an energy emitting portion 330 that cures or solidifies the ink ejected from the liquid ejecting head 310 to the three-dimensional object W, and a pressure control valve 320 for adjusting the pressure of the liquid supplied to the liquid ejecting head 310. Since each of these elements 310, 320, and 330 is fixed to the arm 226, the relationship between their positions and postures is fixed.

The ink ejected by the liquid ejecting head 310 is not particularly limited, and examples of the ink include a water-based ink in which a coloring material such as a dye or a pigment is dissolved in an water-based solvent, a curable ink using a curable resin such as an ultraviolet curable type, and a solvent-based ink in which a coloring material such as a dye or a pigment is dissolved in an organic solvent. Among them, a curable ink is preferably used. The curable ink is not particularly limited, and may be any of a thermosetting type, a photocurable type, a radiation curable type, and an electron beam curable type, but a photocurable type such as an ultraviolet curable type is preferable. The ink is not limited to the solution, and may be an ink in which a coloring material or the like is dispersed as a dispersant in a dispersion medium. Further, the ink is not limited to the ink containing a coloring material, and may be an ink containing conductive particles such as metal particles for forming wiring or the like as a dispersant.

Although not shown in FIG. 1, the liquid ejecting head 310 has an energy generating element that generates energy for applying pressure to the liquid, a cavity (pressure chamber) that houses ink, and a nozzle that communicates with the cavity. Here, a piezoelectric element is used as the energy generating element. However, a heat generating element may be used as the energy generating element. Here, the piezoelectric element is provided for each cavity, and the piezoelectric element bends and vibrates when a signal for ejecting ink is supplied to the piezoelectric element. Thereby, the pressure in the cavity changes, and ink is ejected from the nozzle of the liquid ejecting head 310 corresponding to the cavity.

The pressure control valve 320 is a valve mechanism that opens and closes according to the pressure of the ink in the liquid ejecting head 310. By this opening and closing, the pressure of the ink in the liquid ejecting head 310 is maintained at a negative pressure within a predetermined range. Therefore, the meniscus of the ink formed in the nozzle of the liquid ejecting head 310 is stabilized.

In the example shown in FIG. 1, the number of each of the liquid ejecting head 310 and the pressure control valve 320 included in the liquid ejection unit 300 is one, but the number is not limited thereto, and two or more may be used. Further, the position where the pressure control valve 320 is installed is not limited to the arm 226, and may be, for example, another arm or a fixed position with respect to the base 210.

The energy emitting portion 330 emits energy such as light, heat, electron beam, or radiation, depending on the type of ink. For example, when the ink is ultraviolet curable type, the energy is ultraviolet rays. The energy emitting portion 330 has a configuration according to the type of energy. For example, when the energy is ultraviolet rays, the energy emitting portion 330 includes a light source such as a light emitting element such as a light emitting diode (LED) that emits ultraviolet rays. It is preferable that the energy emitting portion 330 can adjust the intensity of the emitted energy. Further, the energy emitting portion 330 may further include an optical component such as a lens for adjusting the energy emitting direction or the energy emitting range. Hereinafter, the surface formed by the portion where the energy emitting portion 330 emits energy is referred to as an emitting surface.

The liquid supply unit 400 is a mechanism for supplying ink to the liquid ejecting head 310. The liquid supply unit 400 includes a liquid storage portion 410 and a supply flow path 420.

The liquid storage portion 410 is a container for storing ink as a liquid. The liquid storage portion 410 is, for example, a bag-shaped ink pack made of a flexible film.

The liquid storage portion 410 is fixed to a wall, a ceiling, a pillar, or the like so that it is always located in the Z1 direction with respect to the liquid ejecting head 310. That is, the liquid storage portion 410 is located above the moving area of the liquid ejecting head 310 in the vertical direction. Therefore, ink can be supplied from the liquid storage portion 410 to the liquid ejecting head 310 with a predetermined pressurizing force without using a mechanism such as a pump. The place where the liquid storage portion 410 is installed may be located below the liquid storage portion 410 in the vertical direction with respect to the liquid ejecting head 310. In this case, for example, ink may be supplied from the liquid storage portion 410 to the liquid ejecting head 310 at a predetermined pressure by using a pump.

The supply flow path 420 is a flow path for supplying ink from the liquid storage portion 410 to the liquid ejecting head 310. The pressure control valve 320 described above is provided in the middle of the supply flow path 420. Therefore, even if the positional relationship between the liquid ejecting head 310 and the liquid storage portion 410 changes, the fluctuation of the ink pressure in the liquid ejecting head 310 can be reduced.

The supply flow path 420 is formed with, for example, the internal space of the pipe body. Here, the pipe body used for the supply flow path 420 is made of an elastic material such as a rubber material or an elastomer material, and has flexibility. By forming the supply flow path 420 using the flexible pipe body in this way, a change in the relative positional relationship between the liquid storage portion 410 and the pressure control valve 320 is allowed. Therefore, even if the position or posture of the liquid ejecting head 310 changes while the position and posture of the liquid storage portion 410 are fixed, ink can be supplied from the liquid storage portion 410 to the pressure control valve 320. A part of the supply flow path 420 may be made of a member having no flexibility. Further, a part of the supply flow path 420 may be configured to have a distribution flow path for distributing ink to a plurality of locations, or may be configured to be integrated with the liquid ejecting head 310 or the pressure control valve 320.

Figure 2:
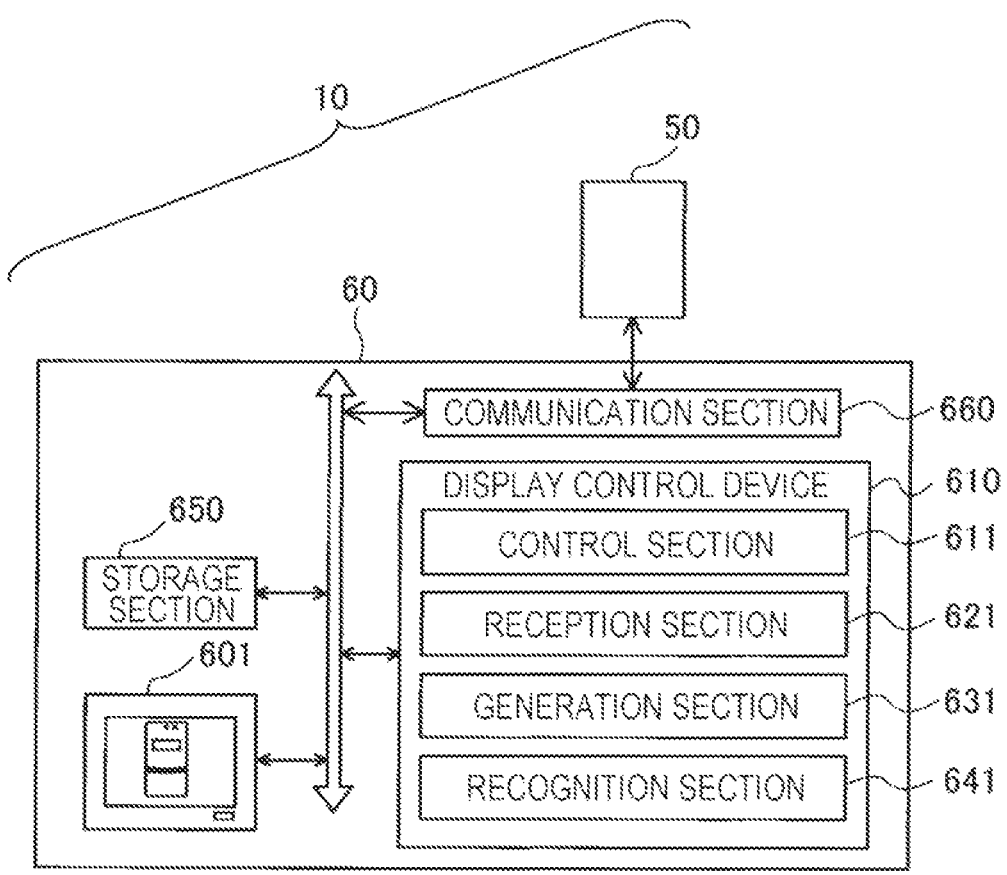
FIG. 2 is a block diagram showing a schematic configuration of an image processing device and a robot control device.

FIG. 2 is a block diagram showing a schematic configuration of the image processing device 60 and the robot control device 50. The robot control device 50 is a device that controls the drive of the robot 200. The robot control device 50 has a function of controlling the drive of the robot 200, a function of controlling the ejecting operation of the liquid ejecting head 310, and a function of synchronizing the ejecting operation of the liquid ejecting head 310 with the operation of the robot 200.

The image processing device 60 includes a storage section 650 and a communication section 660 in addition to the display section 601 and the display control device 610 described above. The communication section 660 performs data communication with an external device, for example, the robot control device 50. The storage section 650 is constituted by a storage device such as a RAM and a ROM. The storage section 650 stores various programs that control the operation of the image processing device 60.

The display control device 610 is constituted by a CPU. The display control device 610 includes one or more control sections 611, one or more reception sections 621, one or more generation sections 631, and one or more recognition sections 641. Each of the control section 611, the reception section 621, the generation section 631, and the recognition section 641 functions by loading various programs stored in the storage section 650. At least a part of the functions of the display control device 610 may be configured by a hardware circuit.

The control section 611 generates a screen for the user to give an instruction and causes the display section 601 to display the screen. The user inputs an instruction to the image processing device 60 using the screen displayed on the display section 601.

The reception section 621 receives an instruction from the user via the display section 601 or an input device such as a keyboard or a mouse. The input device may be a voice input device.

The generation section 631 generates image data for forming an image as a formation by ejecting a liquid to the three-dimensional object W according to the contents of the input instruction. The generated image data is transmitted to the robot control device 50 via the communication section 660. The robot control device 50 generates a control instruction for controlling the robot 200 based on the received image data and transmits the control instruction to the robot 200.

The recognition section 641 recognizes a user who gives an instruction via the display section 601 and the authority of the user. Based on the user's authority recognized by the recognition section 641, the control section 611 changes the content displayed on the display section 601. The detailed function of the recognition section 641 will be described later.

A printing step of printing an image on each surface of the three-dimensional object W using the robot control device 50 and the robot 200 includes the following step s. That is, the printing step includes a pre-formation step of setting a reference point and a path, a forming step of performing a liquid ejecting operation as a part of forming a three-dimensional object, and a curing step of performing a curing operation. When the robot control device 50 receives an instruction from the image processing device 60 to start printing including image data, the pre-formation step is executed.

Upon receiving an instruction to start printing via the reception section 621, the pre-formation step is executed. In the pre-formation step, first, a first reference point and a second reference point are set. Here, the first reference point is a point indicating the position of the liquid ejecting head 310, and is located at the center of a nozzle surface. The second reference point is a point indicating the position of the energy emitting portion 330, and is located at the center of an emitting surface. The first reference point is not limited to the center of the nozzle surface, and may be any position as long as it is located at a position closer to the nozzle surface than the emitting surface in the liquid ejection unit 300. Further, the second reference point is not limited to the center of the emitting surface, and may be any position as long as it is located at a position closer to the emitting surface than the nozzle surface in the liquid ejection unit 300. The first reference point and the second reference point may be controlled so as to include only one of the reference points.

The setting of the first reference point and the second reference point is performed, for example, by moving the portion of the liquid ejection unit 300, which should be one of these reference points, to a known position in the base coordinate system. The other reference point is set based on the positional relationship between these reference points. The setting of the first reference point and the second reference point may include a step of determining the three-dimensional object W and the formation target portion by a camera or a sensor provided in the three-dimensional object forming device 100.

Next, the robot control device 50 determines a first path as a path to be moved of the first reference point based on three-dimensional object information indicating the position and shape of the three-dimensional object W. Similarly, the robot control device 50 determines a second path as a path to be moved of the second reference point based on three-dimensional object information indicating the position and shape of the three-dimensional object W. In this case, the information such as the three-dimensional shape of the three-dimensional object W may be stored in the robot control device 50 in advance, or may be the information recognized by the camera or the sensor provided in the three-dimensional object forming device 100. The first path and the second path may be the same as or different from each other.

In the forming step, the ejection control of the liquid ejecting head 310 is performed while the first reference point moves along the first path according to the control of the robot control device 50. Thereby, the liquid ejecting head 310 ejects the liquid toward the three-dimensional object W, and an image is printed on each surface of the three-dimensional object W.

In the curing step, the ink is cured or solidified by the energy emitting portion 330 emitting energy toward the ink ejected to the three-dimensional object W while the second reference point moves along the second path according to the control of the robot control device 50.

The three-dimensional object W may be in a state where its position and posture can be changed by rotation or the like, or may be fixed. For example, a hand may be attached to the tip of the arm 220 of the articulated robot as an end effector, and the three-dimensional object W may be gripped by the hand. By moving the three-dimensional object W to a position suitable for the forming operation by the three-dimensional object forming device 100 and changing the posture of the three-dimensional object W in association with the rotation of the hand by an operation such as rotating the hand at that position, a formation can be formed on any surface of the three-dimensional object W. Further, when fixing the three-dimensional object W, for example, by fixing the three-dimensional object W to a pedestal whose position and posture can be changed by rotation, it may be possible to adjust the formation location of the formation on the three-dimensional object W. Further, the three-dimensional object W may be maintained in a certain position and posture by fixing the three-dimensional object W to a pedestal fixed to a floor surface, a ceiling, a wall, or the like.

In this way, when an image as a formation is printed and formed on the three-dimensional object W, a method of improving the convenience of the user by making formation candidates to be formed visible in a preview in advance, and displaying the preview image as a three-dimensional image can be considered. In this case, if the preview is performed on the fixed three-dimensional image, only the information from one viewpoint can be obtained, and it is not possible to confirm whether or not the formation is formed as intended when viewed in a plurality of directions. Further, if the preview is performed in which the viewing location of the three-dimensional image is made variable by a rotation operation or the like, the state after the formation can be grasped from various angles, but the operation by the user is required, which lacks convenience.

Therefore, the present disclosure provides a technique highly convenient for the user in the image processing device 60 used to form the three-dimensional object W. Hereinafter, the processing content of the image processing device 60 and a display mode of an operator screen displayed on the display section 601 according to the embodiment of the present disclosure will be described.

A-2. Processing Content of Image Processing Device and Display Mode of Operator Screen Assuming the device configuration described above, the display and input modes controlled by the image processing device 60 in the three-dimensional object forming system 10 will be described.

The recognition section 641 shown in FIG. 2 included in the image processing device 60 recognizes whether the user selected on a user selection screen 758 to be described later is an "operator" or an "administrator" as a user different from the operator, and performs control such that a screen according to each authority is displayed. When the "operator" is selected as the user, the control section 611 displays a first screen S1 and a second screen S2 as screens for the operator in a switchable manner on the display section 601. When the "administrator" is selected as the user, the control section 611 displays an administrator screen AS as a combination setting screen on the display section 601.

Figure 3:
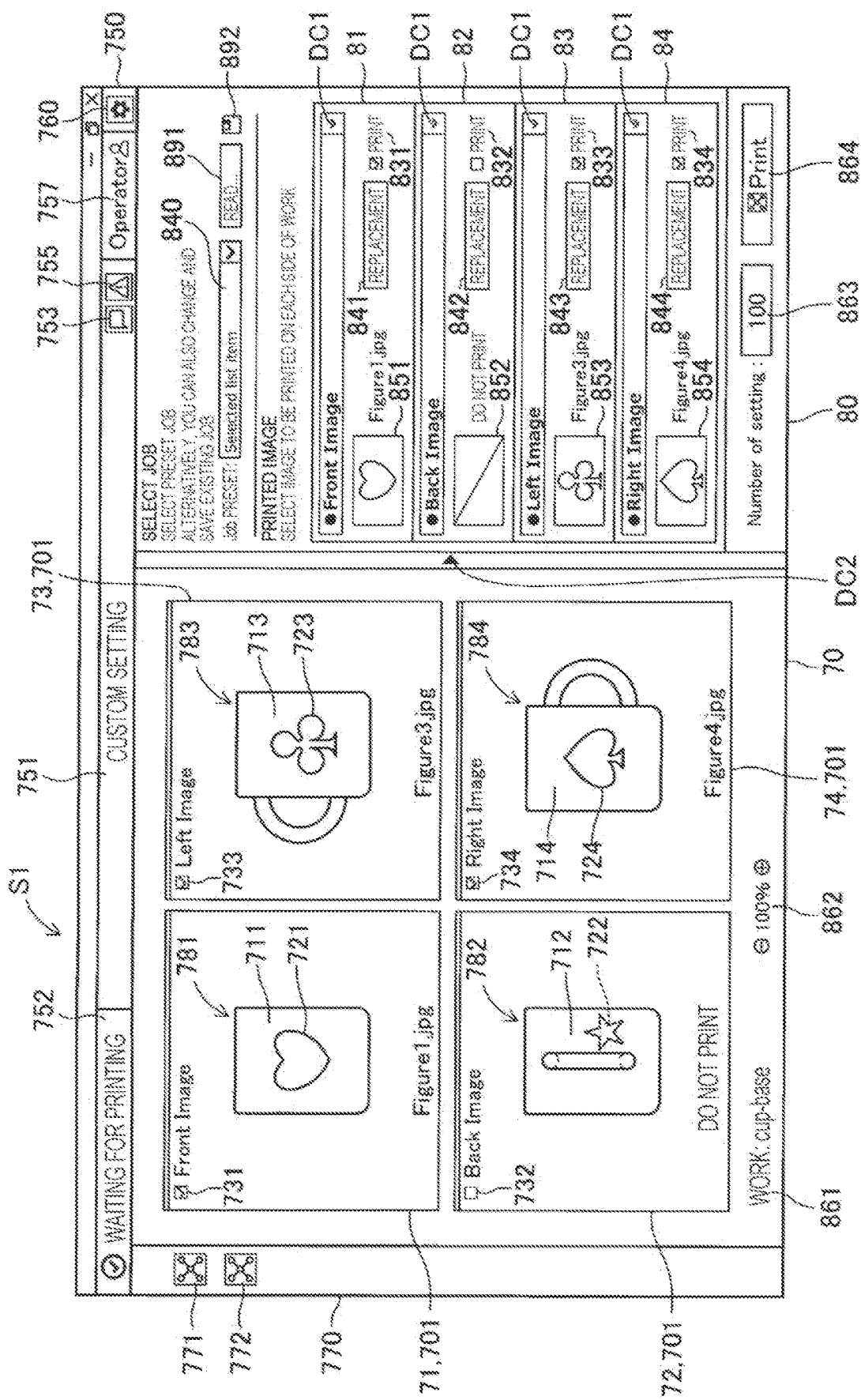
FIG. 3 is a diagram showing an example of a first screen according to the embodiment of the present disclosure.

FIG. 3 is a diagram showing an example of the first screen S1 according to the embodiment of the present disclosure. The first screen S1 includes a status screen 750 displayed in the upper end area of the first screen S1, a user menu screen 770 displayed in the left end area of the first screen S1, a preview screen 70 displayed in the left area of the first screen S1, and an operation screen 80 displayed in the right area of the first screen S1. The display positions of the screens 750, 770, 70, and 80 are not limited to the above description.

The status screen 750 is a screen for displaying information about the state of the three-dimensional object forming device 100. The status screen 750 includes a job name display screen 751, a device state display screen 752, a message confirmation button 753, a warning notification confirmation button 755, a user display screen 757, and a basic setting button 760. The job name display screen 751 displays the currently selected job name related to the setting contents. In FIG. 3, "custom setting" is selected as the job name. The device state display screen 752 is a screen for displaying the state of the printing operation in the three-dimensional object forming device 100. The message confirmation button 753 is a button for confirming a message from the administrator, which will be described later. The warning notification confirmation button 755 is a screen for displaying a list of warning notifications from the three-dimensional object forming system 10. The user display screen 757 is a screen for selecting a user of the three-dimensional object forming system 10. The basic setting button 760 is a button for displaying a screen for making settings related to the three-dimensional object forming system 10. The details of the device state display screen 752, the message confirmation button 753, the warning notification confirmation button 755, the user display screen 757, and the basic setting button 760 will be described below.

Figure 4:
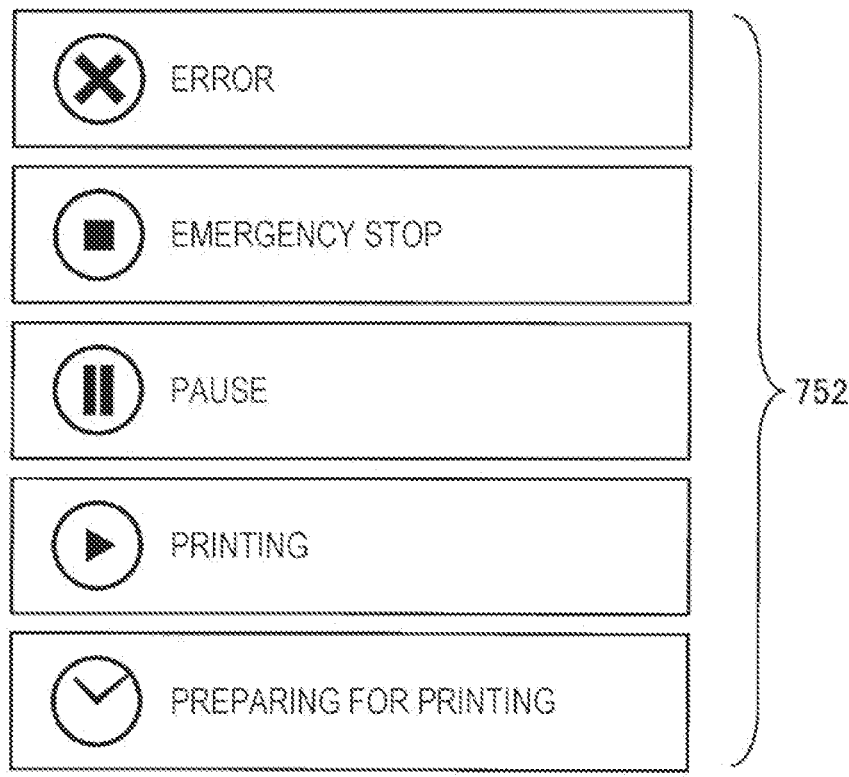
FIG. 4 is a diagram illustrating a device state display screen according to the embodiment of the present disclosure.

FIG. 4 is a diagram illustrating the device state display screen 752 according to the embodiment of the present disclosure. In FIG. 4, six states are shown. The six states indicate "error", "emergency stop", "pause", "printing", and "preparing for printing". Further, in addition to the six states, there is a state indicating "waiting for printing" as shown in the device state display screen 752 shown in FIG. 3. To the left of each piece of character information, logo information indicating the content of each piece of character information is displayed. On the device state display screen 752, one of the seven states to be described below is displayed according to the state of the printing operation.

The "waiting for printing" state is displayed until the robot control device 50 receives an instruction to start printing including image data from the image processing device 60, that is, before a print execution button 864 to be described later is pressed. The "error" state is displayed when some abnormality that cannot be printed occurs in the three-dimensional object forming device 100. The "emergency stop" state is displayed when the user presses an emergency stop switch (not shown) displayed on the display section 601 via the reception section 621 and the three-dimensional object forming device 100 is urgently stopped. In addition, the "emergency stop" state is also displayed when the three-dimensional object forming device 100 automatically stops, such as when an excessive temperature rise or leakage of ink is detected. The "pause" state is displayed, when either the forming step or the curing step is being executed, in a case where an instruction to temporarily stop printing is received from the user via the reception section 621, or in a case where the setting to temporarily stop printing is performed in advance before starting the next print job. In addition, the "pause" is displayed even until the instruction is received and the ink ejection actually stops. The "printing" state is displayed in a case where the three-dimensional object forming device 100 is executing the forming step and the curing step as printing. The "preparing for printing" state is displayed in the period after the print execution button 864 is pressed and before the forming step is executed.

Figure 5:
FIG. 5 is a diagram illustrating a message screen according to the embodiment of the present disclosure.

FIG. 5 is a diagram illustrating a message screen 754 according to the embodiment of the present disclosure. The message screen 754 is displayed in a case where there is a message from the administrator, for example, an instruction from the administrator. The message screen 754 is displayed in a pop-up format that automatically pops up when, for example, the user places a cursor on the message confirmation button 753 by operating the mouse. Further, the message screen 754 may be always displayed in a case where a message from the administrator is registered, or may be displayed only when the user presses the message confirmation button 753. The method of inputting a message from the administrator will be described later.

Figure 6:
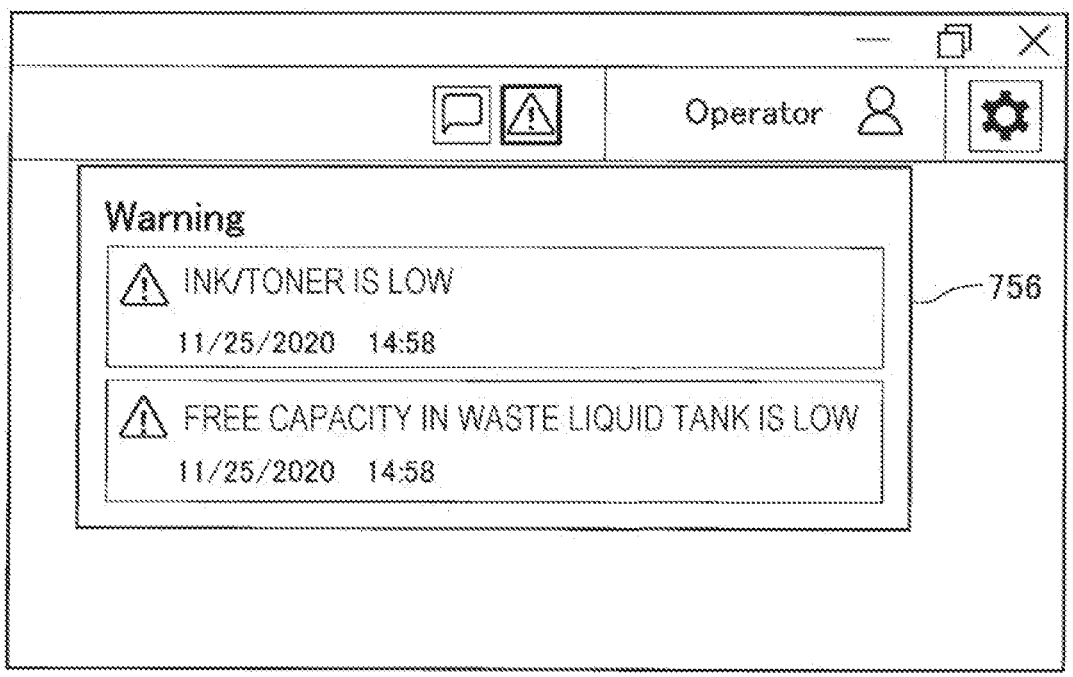
FIG. 6 is a diagram illustrating a warning notification screen according to the embodiment of the present disclosure.

FIG. 6 is a diagram illustrating a warning notification screen 756 according to the embodiment of the present disclosure. In the example shown in FIG. 6, the contents of the warning display include a first warning notification notifying that the remaining amount of ink or toner, which is a consumable used for printing, is approaching the lower limit value of printing, and a second warning notification notifying that the free capacity of a waste liquid tank is approaching the limit value. The warning notification screen 756 is displayed in a pop-up format that automatically pops up when, for example, the user places a cursor on the warning notification confirmation button 755 by operating the mouse. In this case, the warning notification confirmation button 755 may be displayed so as to be easily visually recognizable when there is a warning notification. For example, the warning notification confirmation button 755 may be controlled to blink. Further, the warning notification screen 756 may be always displayed in a case where there is a warning notification, or may be displayed only when the user presses the warning notification confirmation button 755. The method of calculating the remaining amount of ink and the method of calculating the amount of waste liquid stored will be described later.

Figure 7:
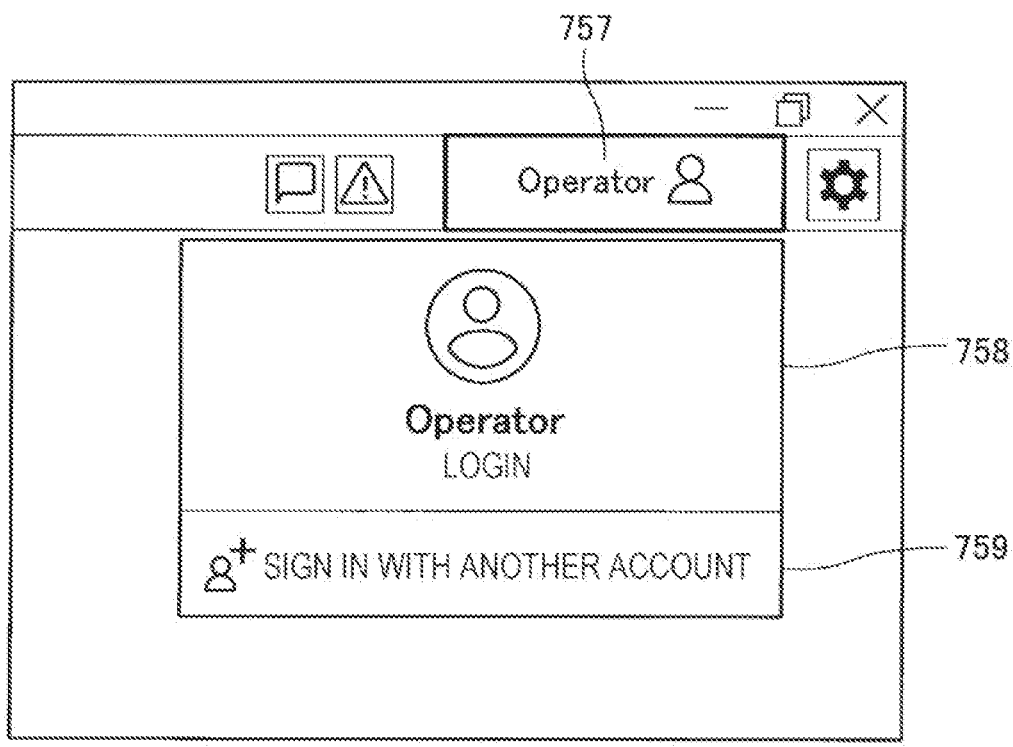
FIG. 7 is a diagram illustrating a user selection screen according to the embodiment of the present disclosure.

FIG. 7 is a diagram illustrating a user selection screen 758 according to the embodiment of the present disclosure. The user selection screen 758 includes a user selection button 759. In the example shown in FIG. 7, the user selection screen 758 is displayed by selecting on the user display screen 757, for example, by a click operation. In addition, the user display screen always displays the currently selected user.

The currently selected user is displayed on the user selection screen 758. In the example shown in FIG. 7, the "operator" is selected as the user. The name displayed on the user selection screen 758 may be a generic name for a group of users classified according to the difference in authority, such as the "operator" and the "administrator", and a name that can identify an individual, for example, a name or employee number, a user ID assigned to the individual, or a combination thereof.

The user selection button 759 is a button for switching from the currently selected user to another user. In the example shown in FIG. 7, by selecting on the user selection button 759, for example, by a click operation, although not shown, a separate screen for selecting a user is displayed. This separate screen may be provided with, for example, a user selection field for selecting a user. The user selection field is, for example, an input field provided with a pull-down menu for displaying a list of users stored in advance in the storage section 650 and a search function by character input.

The user selected by the user selection button 759 is recognized by the recognition section 641. Specifically, the recognition section 641 recognizes who the user is and recognizes the authority of that person. The recognition of the user and the user's authority can be realized by, for example, the following configuration and control. The storage section 650 stores an ID, a name, and a user's authority assigned to an individual as information about the user in advance. The user's authority is a group of authority classified according to the range of functions that can be executed, such as the above-mentioned "operator" and "administrator". The range of functions that can be executed differs depending on the classification of the "operator" and the "administrator". First, the recognition section 641 collates the ID of the user stored in the storage section 650 with the ID of the currently selected user, and recognizes whether the authority of the currently selected user is the "operator" or the "administrator". Next, the control section 611 displays a screen according to the user's authority based on a result of recognition of the recognition section 641. In the present embodiment, when the user's authority is the "operator", one of the first screen S1 and the second screen S2 as the operator screen is selectively displayed on the display section 601 as one of the functions that can be executed by the operator. Further, when the user's authority is the "administrator", in addition to the functions that can be executed by the operator, an administrator screen AS as one of the functions that can be executed by the administrator, which will be described later, is displayed.

When the user is not changed by the user selection button 759, that is, when the user is not changed from the currently selected user, the above-described processing of the recognition section 641 is executed for the currently selected user.

The basic setting button 760 shown in FIG. 3 is a button used when displaying a screen for making settings different from the various setting items displayed on the first screen S1, the second screen S2 to be described later, and the administrator screen AS to be described later. For example, the control section 611 causes the display section 601 to display a screen different from the first screen S1 by recognizing that the basic setting button 760 has been pressed. For example, the control section 611 causes the display section 601 to display a screen for setting the software currently used in the three-dimensional object forming system 10.

The image processing device 60 provides a plurality of menus according to the user's authority. As shown in FIG. 3, the user menu screen 770 is a screen for switching main menus. The user menu screen 770 includes a first menu button 771 and a second menu button 772. In the example shown in FIG. 3, the first menu button 771 selectively displays the first screen S1 as a print screen and the second screen S2 to be described later. Further, the second menu button 772 displays a maintenance screen for making settings for repairing and maintenance of the three-dimensional object forming system 10. On the screen displayed by activating the second menu button 772, for example, a screen for instructing the user to execute the nozzle check of the nozzle provided in the liquid ejecting head 310 and the cleaning of the liquid ejecting head 310 is displayed. The number of menus and the number of menu buttons provided by the image processing device 60 are not limited thereto.

Next, the preview screen 70 and the operation screen 80 will be described. First, the preview screen 70 will be described.

As shown in FIG. 3, the outer shape of the preview screen 70 is defined by a rectangular area. The preview screen 70 includes a first individual preview screen 701, a work name 861 of the three-dimensional object W, and a magnification change screen 862.

The first individual preview screen 701 has a plurality of screens including images printed on a plurality of surfaces of the three-dimensional object W. That is, the preview screen 70 in the first screen S1 includes M (M is an integer of three or more) number of first individual preview screens 701. In the present embodiment, M is "4". Specifically, the M number of first individual preview screens 701 include a first preview screen 71 as the first individual preview screen 701, a second preview screen 72 as the first individual preview screen 701, a third preview screen 73 as the first individual preview screen 701, and a fourth preview screen 74 as the first individual preview screen 701. The outer shape of each first individual preview screen 701 is defined by a rectangular area.

The first preview screen 71 makes a first formation candidate 721, which is a formation candidate to be formed on a first forming surface 711 as the forming surface of the three-dimensional object W, visible to the user. The second preview screen 72 makes a second formation candidate 722, which is a formation candidate to be formed on a second forming surface 712 as a forming surface different from the first forming surface 711 of the three-dimensional object W, visible to the user. The third preview screen 73 makes a third formation candidate 723, which is a formation candidate to be formed on a third forming surface 713 as a forming surface different from the first forming surface 711 and the second forming surface 712 of the three-dimensional object W, visible to the user. The fourth preview screen 74 makes a fourth formation candidate 724, which is a formation candidate to be formed on a fourth forming surface 714 as a forming surface different from the first forming surface 711, the second forming surface 712, and the third forming surface 713 of the three-dimensional object W, visible to the user.

The three-dimensional object W in the present embodiment is a tubular cup with a handle, a so-called mug. Further, among the outer surfaces of the three-dimensional object W, that is, the outer surfaces of the mug, the surface viewed from the side opposite to the side where the handle is located is defined as the front surface as the first forming surface 711. Further, among the outer surfaces of the three-dimensional object W, the surface viewed from the side where the handle is located is defined as the back surface as the second forming surface 712. Further, among the outer surfaces of the three-dimensional object W, the surface viewed from one side with the handle on the left side is defined as the left surface as the third forming surface 713. Further, among the outer surfaces of the three-dimensional object W, the surface viewed from the other side with the handle on the right side is defined as the right surface as the fourth forming surface 714.

It is preferable that the names of the forming surfaces 711 to 714 are displayed on the first individual preview screen 701 so that the user can easily visually recognize which of the forming surfaces 711 to 714 of the three-dimensional object W is the preview. For example, the first preview screen 71 is a screen for displaying a print preview on the front surface as the first forming surface 711. Therefore, as shown in FIG. 3, "Front Image", which means the front view, is displayed in the first preview screen 71. The display for distinguishing the forming surfaces 711 to 714 is not limited to the present embodiment, and may be any notation that can be distinguished by the user.

On the first preview screen 71, the second preview screen 72, the third preview screen 73, and the fourth preview screen 74, preview images 781 to 784 in which formation candidates are projected onto the forming surfaces 711 to 714 of the three-dimensional object W are displayed. That is, the control section 611 generates preview images 781 to 784 in which images that are candidates for printing are combined with the images of the forming surfaces 711 to 714 of the three-dimensional object W for each of the plurality of first individual preview screens 701, and displays the generated preview images on the display section 601.

On the first preview screen 71, the first preview image 781 is displayed as a preview image in which the first formation candidate 721 is projected onto the first forming surface 711 of the three-dimensional object W. In the example shown in FIG. 3, the first preview image 781 is displayed as a preview image in which an image of a heart, which is the first formation candidate 721, is projected onto the front surface of the mug as the first forming surface 711. Similarly, on the second preview screen 72, the second preview image 782 is displayed as a preview image in which the second formation candidate 722 is projected onto the second forming surface 712 of the three-dimensional object W. Further, on the third preview screen 73, the third preview image 783 is displayed as a preview image in which the third formation candidate 723 is projected onto the third forming surface 713 of the three-dimensional object W is displayed. Further, on the fourth preview screen 74, the fourth preview image 784 is displayed as a preview image in which the fourth formation candidate 724 is projected onto the fourth forming surface 714 of the three-dimensional object W.

The first individual preview screen 701 further includes individual determination screens 731 to 734 corresponding to the respective forming surfaces 711 to 714. The individual determination screens 731 to 734 are screens for receiving instructions from the user as to whether or not to print an image on each of the forming surfaces 711 to 714. The first preview screen 71 includes the first individual determination screen 731. Similarly, the second preview screen 72 includes the second individual determination screen 732, and the third preview screen 73 includes the third individual determination screen 733. Further, the fourth preview screen 74 includes the fourth individual determination screen 734.

The first individual determination screen 731 is a screen for the user to determine whether or not to print the image as the first formation candidate 721 displayed on the first preview screen 71 on the first forming surface 711. Similarly, the second individual determination screen 732 is a screen for the user to determine whether or not to print the image as the second formation candidate 722 displayed on the second preview screen 72 on the second forming surface 712. Further, the third individual determination screen 733 is a screen for the user to determine whether or not to print the image as the third formation candidate 723 displayed on the third preview screen 73 on the third forming surface 713. Further, the fourth individual determination screen 734 is a screen for the user to determine whether or not to print the image as the fourth formation candidate 724 displayed on the fourth preview screen 74 on the fourth forming surface 714.

The first individual determination screen 731, the second individual determination screen 732, the third individual determination screen 733, and the fourth individual determination screen 734 are constituted by check boxes. When a check is entered in the check box, the robot 200 prints the image on the corresponding forming surfaces 711 to 714.

The processing flow executed by the control section 611 when a user's instruction is received on the individual determination screens 731 to 734 via the display section 601 will be described by taking the first individual determination screen 731 as an example. The processing flows of the second individual determination screen 732 to the fourth individual determination screen 734 are the same as that of the first individual determination screen 731.

When printing an image as the first formation candidate 721 on the first forming surface 711 of the three-dimensional object W, the user checks the first individual determination screen 731 displayed on the display section 601. When the first individual determination screen 731 is checked, the recognition section 641 recognizes that a formation instruction from the user that printing is necessary has been received via the reception section 621. Subsequently, the recognition section 641 transmits the formation instruction of the first formation candidate 721 to the first forming surface 711 of the three-dimensional object W to the control section 611. In accordance with the input instruction, here, the formation instruction, the control section 611 displays image data corresponding to the formation instruction, which is generated in advance by the generation section 631, as the first preview image 781 located on the display section 601, here, the first preview screen 71. Here, the image data has been generated by the generation section 631 in advance, when the recognition section 641 recognizes the reception of the formation instruction by the reception section 621, the recognition section 641 may also transmit the formation instruction to the generation section 631, and the generation section 631 may generate image data based on the reception.

When the formation instruction is received, the data names of the formation candidates 721 to 724 may be displayed in the corresponding preview screens 71 to 74. For example, on the first preview screen 71 of FIG. 3, "Figure1.jpg", which is the data name of the first formation candidate 721, is displayed.

As shown in FIG. 3, when the second individual determination screen 732 is unchecked, the control section 611 recognizes that a non-formation instruction from the user that printing is unnecessary has been received via the reception section 621. When the non-formation instruction is received, the formation instruction is not transmitted to the generation section 631. When the individual determination screens 731 to 734 are unchecked, that is, when the instruction not to print is received, the fact that printing is not performed may be displayed in the corresponding first individual preview screen 701. For example, as shown in the second preview screen 72 of FIG. 3, when the second individual determination screen 732 is unchecked, "Do not print" is displayed instead of the data name of the second formation candidate 722. Further, when the instruction not to print is received, the first individual preview screen 701 itself corresponding to the forming surface not to be printed may be controlled not to be displayed instead of displaying the fact that printing is not performed. Further, when the instruction not to print is received, although the first individual preview screen 701 corresponding to the forming surfaces 711 to 714 not to be printed may be displayed, the formation candidates 721 to 724 corresponding to the forming surfaces 711 to 714 may be controlled not to be displayed instead of displaying the fact that printing is not performed. For ease of understanding, the second formation candidate 722 to be printed when the second individual determination screen 732 is checked is shown by a dotted line.

When the user gives a non-formation instruction not to form the formation candidates 721 to 724 on the individual determination screens 731 to 734 via the reception section 621, the control section 611 may perform control such that the preview images 781 to 784 of the forming surfaces 711 to 714 for which the non-formation instruction has been given are not displayed on the corresponding preview screens 71 to 74. For example, the second preview screen 72 that has received the non-formation instruction is hidden. In this way, the number of the first individual preview screens 701 displayed in the preview screen 70 is reduced, and the hidden area becomes a free area. Another first individual preview screen 701, for example, another preview screen 75, which will be described later, may be displayed in the free area, or the currently displayed first individual preview screen 701, for example, the first preview screen 71 may be enlarged and displayed.

Further, when the number of the first individual preview screens 701 displayed on the preview screen 70 is smaller than that of a first case in a second case, the control section 611 may control the size of the first individual preview screen 701 of the preview screen 70 or the sizes of the preview images 781 to 784 in the first individual preview screen 701 such that they can be enlarged more than in the first case.

The magnification change screen 862 is a screen for changing the sizes of each first individual preview screen 701 displayed on the first individual preview screens 701 and a second individual preview screen 702 to be described later. The magnification change screen 862 displays the current display magnification and includes an enlargement button and a reduction button. In the example shown in FIG. 3, the display magnification is "100%", the "+ button" provided on the right side of the display magnification is the enlargement button, and the "– button" provided on the left side of the display magnification is the reduction button. The user can increase the display magnification by pressing the enlargement button and decrease the display magnification by pressing the reduction button. In addition, instead of the enlargement button and the reduction button, an input field may be provided so that the user can change the display magnification by inputting the display magnification in the input field. When the display section 601 has a touch panel function, it may be possible to change the display magnification by pinching in or pinching out with the user's finger on the preview screen 70.

When receiving a magnification change instruction from the user by at least one of the enlargement button and the reduction button, it is preferable to change both the display magnification of the first forming surface 711 and the display magnification of the first formation candidate 721, and the entire first individual preview screen 701 may be enlarged or reduced.

According to the image processing device 60 described above, when a formation is formed on the three-dimensional object W which is a three-dimensionally formed object, images of formation candidates to be formed viewed in a plurality of directions are displayed. Therefore, the user can grasp the state after formation from various surfaces. That is, the user can confirm whether or not the desired formation is formed on each of the forming surfaces 711 to 714 of the three-dimensional object W before printing is started.

Further, the image processing device 60 described above displays the preview images 781 to 784 for each of the forming surfaces 711 to 714 of the three-dimensional object W. Therefore, the preview images 781 to 784 of the three-dimensional object W can be visually recognized without requiring the user to perform an operation such as rotation. That is, the user can easily confirm the preview image of the three-dimensional object W as a three-dimensionally formed object from multiple surfaces.

Next, the operation screen 80 will be described. The outer shape of the operation screen 80 is defined by a rectangular area. The operation screen 80 is arranged adjacent to the preview screen 70. The operation screen 80 is a screen for displaying information about the currently selected combination and the setting for the combination and receiving the user's operation. The operation screen 80 includes a combination selection screen 840, a read button 891, and a combination save button 892. The combination selection screen 840, the read button 891, and the combination save button 892 are displayed side by side in a horizontal row in the upper area of the operation screen 80. The operation screen 80 further includes a first operation screen 81, a second operation screen 82, a third operation screen 83, and a fourth operation screen 84. The first operation screen 81 to the fourth operation screen 84 are displayed in a vertical row in the area below the combination selection screen 840. The operation screen 80 further includes a second display state change button DC2, a number-of-copies setting screen 863, and a print execution button 864. The second display state change button DC2 is arranged on the left side of the first operation screen 81 to the fourth operation screen 84 in the operation screen 80. The detailed function of the second display state change button DC2 will be described later. The number-of-copies setting screen 863 and the print execution button 864 each are arranged below the first operation screen 81 to the fourth operation screen 84 in the operation screen 80.

An operation guide for each screen may be displayed on the operation screen 80. For example, the area including the combination selection screen 840, the read button 891, and the combination save button 892 is referred to as a "combination selection area". Further, an area in which a screen including the first operation screen 81, the second operation screen 82, the third operation screen 83, and the fourth operation screen 84 and corresponding to each first individual preview screen 701 is displayed is referred to as an "operation area". In the example shown in FIG. 3, as an operation guide, a display of "Select a job" as a heading of the combination selection area and an explanation for indicating the operation content of the combination selection area are displayed. For example, the explanation in the combination selection area is "Select a preset job. Alternatively, you can also change and save an existing job." Similarly, in the example shown in FIG. 3, as an operation guide, a display of "printed image" as a heading of the operation area and a display of "Select an image to be printed on each side of the work." as an explanation for indicating the operation content of the operation area are shown. The headings and explanations in the area are not limited to the present disclosure, and can be optionally displayed and may not be displayed.

Further, the user of the first screen S1 is an operator. The main task of the operator is to execute printing after confirming the preview image as a finished image and confirming that there is no problem with the setting contents displayed on the display section 601 before printing. Therefore, it is preferable that the preview screen 70 is displayed larger than the operation screen 80 so that the operator can easily visually recognize the preview image on the first screen S1. In the example shown in FIG. 3, the preview screen 70 on the first screen S1 and the operation screen 80 on the first screen S1 are displayed at a ratio of about 3:2. The present disclosure is not limited to the ratio described above, and may be a state in which the preview screen 70 and the operation screen 80 are displayed on the first screen S1.

The combination selection screen 840 is a screen on an administrator setting screen 90, which will be described later, in which the user selects a combination of images as formations to be formed on the respective forming surfaces 711 to 714 of the three-dimensional object W registered in advance in the storage section 650 by the administrator. The combination of images in the present embodiment is a combination of formation candidates including the first formation candidate 721, the second formation candidate 722, the third formation candidate 723, and the fourth formation candidate 724, and is information in which the forming surfaces 711 to 714 of the three-dimensional object W and the image to be printed are associated with each other. Further, the combination includes information about the three-dimensional object W and information such as the print positions of the images as the formation candidates 721 to 724 for the respective forming surfaces 711 to 714 and performing of printing. The combination may include color information of the image and the like.

As described above, the combination selected on the combination selection screen 840 is a group of information in which the forming surfaces 711 to 714 of the three-dimensional object W and the images to be printed on the respective forming surfaces 711 to 714 are associated with each other. Therefore, by selecting any combination displayed on the combination selection screen 840, the images to be printed on the respective forming surfaces 711 to 714 of the three-dimensional object W can be set at one time. As an example of formations preferably used when setting at one time, a case in which the setting contents registered as a combination are infrequently changed or a case in which a specific formation candidate is attached in common to the three-dimensional object W is conceivable. For example, the case is when the formation candidates 721 to 724 are company names or slogans. Since the user can set the image to be printed by using the combination, for images whose setting contents are infrequently changed, it is not necessary to reset the setting every time printing is performed on each of the forming surfaces 711 to 714 of the three-dimensional object W. That is, in setting the data when forming the formation on the three-dimensional object W, the convenience of the user is improved by providing the combination setting as compared with the case of only the individual setting.

In the example shown in FIG. 3, the combination selection screen 840 is constituted by a pull-down menu. When the combination selection screen 840 is selected, the selectable combinations are displayed by the pull-down menu, and the user can select one combination from among the combinations displayed by the pull-down menu. The combination selection screen 840 may not be a pull-down menu, but may be a text box for inputting characters indicating a combination. In this case, the control section 611 searches for a combination of names close to the input characters from the plurality of combinations stored in the storage section 650, and displays the combination on the combination selection screen 840. Further, it may be a combo box in which a pull-down menu and a text box having a search function are used together.

The read button 891 is a button for reading the combination selected on the combination selection screen 840 and reflecting the information of the selected combination on the preview screen 70 and the operation screen 80. When the read button 891 is pressed, the control section 611 displays images constituting the combination selected on the combination selection screen 840 on the first individual preview screen 701 corresponding to each of the forming surfaces 711 to 714 and the operation screen 80 corresponding to each of the forming surfaces 711 to 714. The display mode on the operation screen 80 will be described below.

The combination save button 892 is a button for saving the changed combination with a different name when at least a part of the combination is changed by the user on the first operation screen 81 to the fourth operation screen 84, which will be described later, with respect to the combination selected on the combination selection screen 840. The detailed function of the combination save button 892 will be described later.

The first operation screen 81 is a screen corresponding to the first preview screen 71, and is a screen for setting the first formation candidate 721 to be printed on the first forming surface 711 of the three-dimensional object W. The first operation screen 81 includes a first display state change button DC1, a first determination screen 831 as a determination screen, a first individual selection screen 841 as an individual selection screen, and a first thumbnail screen 851 as a thumbnail screen.

It is preferable that the names of the forming surfaces 711 to 714 are displayed as headings on the individual operation screens 81 to 84 so that the user can easily visually recognize which of the forming surfaces 711 to 714 of the three-dimensional object W is the preview. For example, on the first operation screen 81, as shown in FIG. 3, "Front Image" meaning the front surface is displayed. The display for distinguishing the forming surfaces 711 to 714 is not limited to the present embodiment, and may be any notation that can be distinguished by the user.

The first display state change button DC1 is a button for switching between display and non-display by opening and closing a specific area in the screen in a foldable manner. That is, on the first operation screen 81, the display and non-display are switched by opening and closing an operation information area in the first operation screen 81 in a foldable manner. The above-mentioned "operation information area" means an area including operation information such as the first determination screen 831, the first individual selection screen 841, the first thumbnail screen 851, and data names of the first formation candidate 721.

In the present embodiment, the initial state is the state in which the operation information area is displayed. When the user presses the first display state change button DC1 while the operation information area is displayed, the operation information area is folded from the bottom to the top in parallel with the heading. That is, only the heading is displayed, and the operation information area is hidden. Further, when the user presses the first display state change button DC1 again while the operation information area is not displayed, the operation information area is displayed again.

The second operation screen 82 is a screen corresponding to the second preview screen 72, and is a screen for setting the second formation candidate 722 to be printed on the second forming surface 712 of the three-dimensional object W. The second operation screen 82 includes a first display state change button DC1, a second determination screen 832 as a determination screen, a second individual selection screen 842 as an individual selection screen, and a second thumbnail screen 852 as a thumbnail screen. In the example shown in FIG. 3, "Back Image", which means a rear view, is displayed in the second operation screen 82.

The third operation screen 83 is a screen corresponding to the third preview screen 73, and is a screen for setting the third formation candidate 723 to be printed on the third forming surface 713 of the three-dimensional object W. The third operation screen 83 includes a first display state change button DC1, a third determination screen 833 as a determination screen, a third individual selection screen 843 as an individual selection screen, and a third thumbnail screen 853 as a thumbnail screen. In the example shown in FIG. 3, "Left Image", which means a left side view, is displayed in the third operation screen 83.

Further, the fourth operation screen 84 is a screen corresponding to the fourth preview screen 74, and is a screen for setting the fourth formation candidate 724 to be printed on the fourth forming surface 714 of the three-dimensional object W. The fourth operation screen 84 includes a first display state change button DC1, a fourth determination screen 834 as a determination screen, a fourth individual selection screen 844 as an individual selection screen, and a fourth thumbnail screen 854 as a thumbnail screen. In the example shown in FIG. 3, "Right Image", which means a right side view, is displayed in the fourth operation screen 84.

In the above description, the operation screen 80 includes the individual first operation screen 81 to fourth operation screen 84, but the number of individual operation screens can be changed. For example, a new individual operation screen for a surface different from the first forming surface 711 to the fourth forming surface 714 of the three-dimensional object W may be included. The new individual operation screen is also called another operation screen. Images to be formed on different surfaces may be determined via another operation screen. Further, for example, each of the first operation screen 81 to the fourth operation screen 84 may be configured so that the surface of the three-dimensional object W forming the formation can be selected. For example, when a button for displaying a pull-down menu for selecting the forming surfaces 711 to 714 is arranged next to the first display state change button DC1, and this button is selected, a surface to be set as an image as a formation is selected.

The first determination screen 831 is a screen for the user to determine whether or not to form the first formation candidate 721 displayed on the first preview screen 71 on the first forming surface 711. Similarly, the second determination screen 832 is a screen for the user to determine whether or not to form the second formation candidate 722 displayed on the second preview screen 72 on the second forming surface 712. Further, the third determination screen 833 is a screen for the user to determine whether or not to form the third formation candidate 723 displayed on the third preview screen 73 on the third forming surface 713. Further, the fourth determination screen 834 is a screen for the user to determine whether or not to form the fourth formation candidate 724 displayed on the fourth preview screen 74 on the fourth forming surface 714.

In the example shown in FIG. 3, the first determination screen 831, the second determination screen 832, the third determination screen 833, and the fourth determination screen 834 are constituted by check boxes. The processing flow executed by the control section 611 when a user's instruction is received on the determination screens 831 to 834 via the display section 601 will be described by taking the first determination screen 831 as an example. The processing flows of the second determination screen 832 to the fourth determination screen 834 are the same as that of the first determination screen 831.

The control section 611 in the present embodiment links the determination of the user for the first individual determination screen 731 via the reception section 621 and the determination of the user for the first determination screen 831 via the reception section 621 with each other. Therefore, when printing an image as the first formation candidate 721 on the first forming surface 711 of the three-dimensional object W, the user checks either the first individual determination screen 731 or the first determination screen 831 displayed on the display section 601. When either the first individual determination screen 731 or the first determination screen 831 is checked, the recognition section 641 recognizes that a formation instruction from the user that printing is necessary has been received via the reception section 621. Subsequently, the recognition section 641 transmits the formation instruction of the first formation candidate 721 to the first forming surface 711 of the three-dimensional object W to the control section 611. The generation section 631 generates image data for forming an image as a formation by ejecting ink to the three-dimensional object W in accordance with the input instruction, here, the formation instruction. In accordance with the formation instruction, the control section 611 displays image data corresponding to the formation instruction, which is generated in advance by the generation section 631, as the first preview image 781 located on the display section 601, here, the first preview screen 71.

As described above, when the formation instruction is received, the data names of the formation candidates 721 to 724 may be displayed in the individual operation screens 81 to 84 corresponding to the respective forming surfaces 711 to 714. For example, on the first operation screen 81 of FIG. 3, "Figure1.jpg", which is the data name of the first formation candidate 721, is displayed.

As shown in FIG. 3, when the second determination screen 832 is unchecked, the control section 611 recognizes that a non-formation instruction from the user that printing is unnecessary has been received via the reception section 621. When the non-formation instruction is received, the formation instruction is not transmitted to the generation section 631. When the determination screens 831 to 834 are unchecked, that is, when the instruction not to print is received, the fact that printing is not performed may be displayed in the first operation screen 81 to the fourth operation screen 84 corresponding to the respective forming surfaces 711 to 714. For example, in the example shown in FIG. 3, on the second determination screen 832 where the check on the determination screens 831 to 834 is unchecked, "Do not print" is displayed instead of the data name of the second formation candidate 722. Further, when an instruction not to print is received, it is preferable not to display the image on the thumbnail screens 851 to 854.

In order to make it easier for the user to recognize the operation target, it is preferable that the check box constituting the first determination screen 831 is also displayed as a check box for determining whether or not to print. For example, in the example shown in FIG. 3, the word "print" is also written in the check box of the first determination screen 831.

The first individual selection screen 841 as the individual selection screen is a screen corresponding to the first preview screen 71, and is a screen for the user to individually select the image as the first formation candidate 721 to be printed on the first forming surface 711 of the three-dimensional object W. Similarly, the second individual selection screen 842 as the individual selection screen is a screen corresponding to the second preview screen 72, and is a screen for the user to individually select the image as the second formation candidate 722 to be printed on the second forming surface 712 of the three-dimensional object W. Further, the third individual selection screen 843 as the individual selection screen is a screen corresponding to the third preview screen 73, and is a screen for the user to individually select the image as the third formation candidate 723 to be printed on the third forming surface 713 of the three-dimensional object W. Further, the fourth individual selection screen 844 as the individual selection screen is a screen corresponding to the fourth preview screen 74, and is a screen for the user to individually select the image as the fourth formation candidate 724 to be printed on the fourth forming surface 714 of the three-dimensional object W.

In the example shown in FIG. 3, the first individual selection screen 841, the second individual selection screen 842, the third individual selection screen 843, and the fourth individual selection screen 844 are constituted by buttons. The processing flow executed by the control section 611 when an instruction from the user is received on the individual selection screen via the display section 601 will be described by taking the first individual selection screen 841 as an example. The processing flows of the second individual selection screen 842 to the fourth individual selection screen 844 are the same as that of the first individual selection screen 841.

When the button constituting the first individual selection screen 841 is pressed, although not shown, a separate screen for individually selecting an image as the first formation candidate 721 to be printed on the first forming surface 711 of the three-dimensional object W is displayed. On a separate screen accompanying the activation of the first individual selection screen 841, means for selecting an image different from the currently selected first formation candidate 721 is displayed, and for example, it has a function of displaying a list of a plurality of images registered in advance in the storage section 650 by the administrator and a function of referring to a folder which is a save destination of the images stored in the storage section 650.

In the present embodiment, the selection of an image on the first individual selection screen 841 is limited to the function of replacing the currently selected image with another image. That is, the first individual selection screen 841 in the first screen S1 as the operator screen only has the authority as an operator, and as will be described later, functions such as setting the position of an image with respect to the forming surfaces 711 to 714 of the three-dimensional object W that can be executed by the administrator on the administrator screen AS cannot be executed. However, the present disclosure is not limited thereto, and even when the user's authority is an operator, it may be possible to execute some of the functions of the administrator screen AS.

When a new image is selected on the first individual selection screen 841, the control section 611 recognizes the newly selected image as the first formation candidate 721 and transmits changes and contents of the first formation candidate 721 to the generation section 631. The generation section 631 generates image data for forming an image by ejecting ink to the three-dimensional object W in accordance with the input instruction, here, the change request of the first formation candidate 721. The control section 611 displays the image data generated by the generation section 631 as the display section 601 and here, the first preview image 781 located on the first preview screen 71, and displays the newly selected image on the first thumbnail screen 851 to be described later.

Here, when both the determination of the user for the first individual selection screen 841 and the determination of the user for the combination selection screen 840 are received via the reception section 621, the control section 611 gives priority to the determination of the user on the first individual selection screen 841. That is, the control section 611 controls the preview screen 70 by using the determined content of the first individual selection screen 841 regardless of the determined content of the combination selection screen 840.

When the image is selected on the first individual selection screen 841, that is, the image is replaced, the contents set for each of the forming surfaces 711 to 714 are applied only to the print job currently being executed. When a part of the combination selected on the combination selection screen 840 is changed on the individual selection screens 841 to 844 on the respective forming surfaces 711 to 714, after making it possible to distinguish between the combination registered in advance in the storage section 650 by the administrator and the changed combination in which a part of the combination is changed, the changed combination may be saved with a different name. For example, when the combination registered in advance in the storage section 650 by the administrator is "Selected list item", the changed combination in which a part of the combination is changed may be saved as "Selected list item 'change'". In this case, in the example shown in FIG. 3, the saving of the combination under a different name as described above is realized by the combination save button 892.

As described above, the individual determination screens 731 to 734, the determination screens 831 to 834, and the individual selection screens 841 to 844 are screens for individually setting each of the forming surfaces 711 to 714 of the three-dimensional object W. Therefore, when the setting is changed for parts of the plurality of forming surfaces 711 to 714 of the three-dimensional object W, the user can change the setting individually. As an example of a formation in which individual settings are preferably used, a case in which the setting contents registered as a combination are frequently changed is conceivable. For example, the case is when the formation candidates 721 to 724 are personal information such as a name and blood type. By making individual settings as the individual determination screens 731 to 734, the determination screens 831 to 834, and the individual selection screens 841 to 844, the user can set items that frequently change the setting contents without registering a new combination each time the setting is changed. That is, in setting the data when forming the formation on the three-dimensional object W, compared with the case where only the combination setting of setting the images to be printed on the respective forming surfaces 711 to 714 of the three-dimensional object W at one time is provided, the convenience of the user is improved by providing the individual settings.

Further, the control section 611 may perform control to prohibit the user from individually changing the formation candidates 721 to 724 constituting the combination when a prohibition setting for prohibiting the change of the formation candidates 721 to 724 is made by the administrator in the individual selection screens 841 to 844, and to enable the user to individually change the formation candidates 721 to 724 constituting the combination when the prohibition setting is not made. Examples of the formation candidates 721 to 724 for which the prohibition setting is made include a common image that is commonly printed for a plurality of types of three-dimensional objects W. Examples of the common image include a company name and a brand logo.

The control section 611 may control the individual selection screens 841 to 844 such that the plurality of formation candidates 721 to 724 can be set for one of the forming surfaces 711 to 714.

The first thumbnail screen 851 as the thumbnail screen is a screen for making a thumbnail displayed by reducing an image as the first formation candidate 721 visible to the user. Similarly, the second thumbnail screen 852 as the thumbnail screen is a screen for making the thumbnail as the second formation candidate 722 visible to the user. Further, the third thumbnail screen 853 as the thumbnail screen is a screen for making the thumbnail as the third formation candidate 723 visible to the user. Further, the fourth thumbnail screen 854 as the thumbnail screen is a screen for making the thumbnail as the fourth formation candidate 724 visible to the user. Since the operation screen 80 is a screen for selecting the formation candidates 721 to 724 on the respective forming surfaces 711 to 714, on the thumbnail screens 851 to 854, the forming surfaces 711 to 714 of the three-dimensional object W are not visible, and the formation candidates 721 to 724 are visible. The outer shapes of the thumbnail screens 851 to 854 are defined by rectangular areas.

When an instruction from the user is received on at least one of the combination selection screen 840 and the individual selection screens 841 to 844 via the display section 601, the selected formation candidates 721 to 724 are displayed on the corresponding thumbnail screens 851 to 854. For example, as shown in FIG. 3, when an image of a heart is selected as the first formation candidate 721 on the combination selection screen 840 or the first individual selection screen 841 via the display section 601, the image of the heart, which is the first formation candidate 721, is displayed on the first thumbnail screen 851.

Further, when the check box is unchecked on either the individual determination screens 731 to 734 or the determination screens 831 to 834 via the display section 601, that is, when a non-formation instruction from the user is received, the control section 611 executes the following. That is, the control section 611 stops displaying the thumbnails of the thumbnail screens 851 to 854 corresponding to the forming surfaces 711 to 714 that have received the non-formation instruction. In this case, it is preferable that the thumbnail screens 851 to 854 display that the non-formation instruction has been given. When the non-formation instruction is received, for example, as in the second preview screen 72 in FIG. 3, the control section 611 performs control such that a thumbnail is not displayed on the second thumbnail screen 852 and a diagonal line is displayed thereon.

The control section 611 can further set the number of copies to set the number of the three-dimensional object W to be formed as one combination via the number-of-copies setting screen 863. The number-of-copies setting screen 863 is a screen for receiving an input of the number of copies for forming an image as a formation on the three-dimensional object W by printing according to the contents set on the preview screen 70 and the operation screen 80. The number-of-copies setting screen 863 is, for example, an input field for inputting the number of copies in numbers. In the example shown in FIG. 3, the first forming surface 711 of the three-dimensional object W is set to form the image of the heart which is the first formation candidate 721, the third forming surface 713 of the three-dimensional object W is set to form an image of a clover which is the third formation candidate 723, the fourth forming surface 714 of the three-dimensional object W is set to form an image of a spade which is the fourth formation candidate 724, and "100" is input as the number of copies to print an image with this combination. That is, printing is performed on each of the forming surfaces 711 to 714 by the combination described above for 100 mugs as the three-dimensional object W.

The number-of-copies setting screen 863 may be configured such that the number of copies to be printed for each of a plurality of sets of combinations can be input. For example, the number-of-copies setting screen 863 may be configured such that the number to be formed by printing an image of a first combination as a combination on the three-dimensional object W and the number to be formed by printing an image of a second combination as a combination different from the first combination on the three-dimensional object W can be input. That is, the combination including performing of printing on each of the forming surfaces 711 to 714 of the three-dimensional object W and the replacement of the formation candidates 721 to 724 can be set for each individual, and a plurality of individuals can be executed as one print job.

The print execution button 864 is a button for giving a print execution instruction to execute printing according to the contents displayed on the first screen S1 and the second screen S2 to be described later. The control section 611 recognizes that the print execution button 864 has been pressed by the user, and performs control such that the pre-formation step is started. When the print execution button 864 is pressed by the user, a print preparation dialog 870 to be described later is displayed, and the pre-formation step is started.

Figure 8:
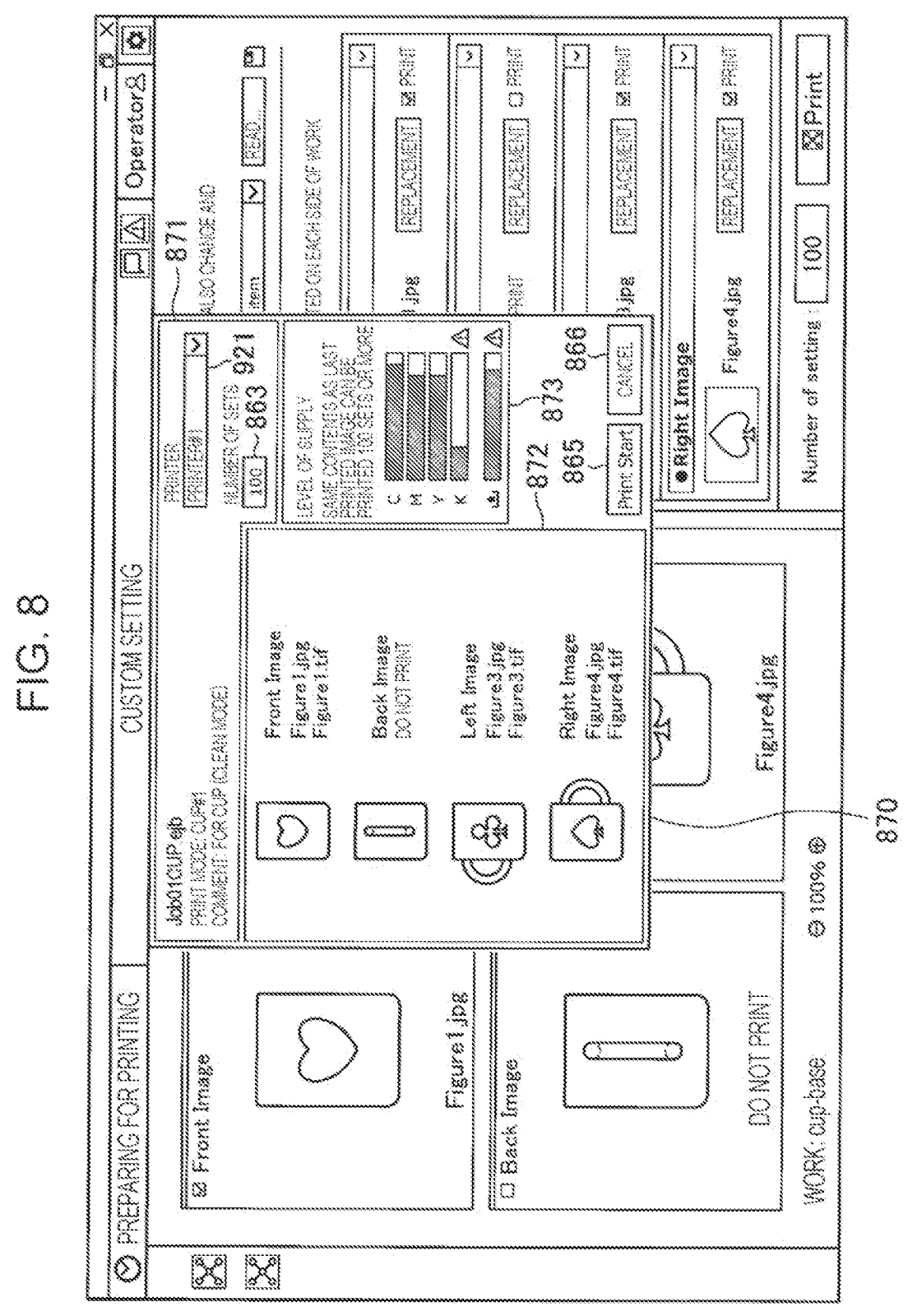

FIG. 8 is a diagram illustrating a print preparation dialog 870 according to the embodiment of the present disclosure. The print preparation dialog 870 is a screen displayed when the user presses the print execution button 864 located on the first screen S1 or the second screen S2 to be described later. The print preparation dialog 870 is a screen for making a part of the setting contents visible so that the user can confirm the contents set on the first screen S1 or the second screen S2 again before the start of printing. When the print preparation dialog 870 is displayed, it is in a state of waiting for receiving a print start instruction, which is an instruction for starting the forming step.

The print preparation dialog 870 includes a print information display screen 871, a pre-print preview screen 872, a first consumables remaining amount confirmation screen 873, a print start button 865, and a cancel button 866.

The print information display screen 871 is a screen for making a part of the contents set on at least one of the first screen S1 and the second screen S2 visible to the user. The print information display screen 871 includes an information area, a number-of-copies setting screen 863, and a device input field 921.

In the information area located on the print information display screen 871, information about a print job as one combination for receiving a print execution instruction is displayed. In the information area, as information about the print job, for example, in addition to the name of the print job, the print mode as the currently selected print style, and the comment as the content of the print style are displayed. In the example shown in FIG. 8, "Job01cup.ejb" as the name of the print job, "cup #1" as the print mode, and "for cup (clean mode)" as the comment are displayed. The user can easily grasp the information about the print job by visually recognizing the information area.

The number-of-copies setting screen 863 located on the print information display screen 871 is a screen that makes it possible to visually recognize the number input on the number-of-copies setting screen 863 on at least one of the first screen S1 and the second screen S2. The number-of-copies setting screen 863 on the print information display screen 871 is preferably an input field for inputting the number of copies in numbers. In this way, even after the print execution instruction is given, the user can change the number of copies as necessary before giving the print start instruction.

The device input field 921 located on the print information display screen 871 is a screen for selecting the three-dimensional object forming device 100 to execute the above-mentioned printing. That is, when a plurality of three-dimensional object forming devices 100 are communicably connected to one image processing device 60, the user can select in the device input field 921 which three-dimensional object forming device 100 is to transmit the print start instruction to execute printing.

In the example shown in FIG. 8, the device input field 921 is constituted by a pull-down menu. When the device input field 921 is selected, machine information of the three-dimensional object forming device 100 that can be selected, for example, a printing device name associated with an IP address of the three-dimensional object forming device 100 is displayed by the pull-down menu. The user can select one three-dimensional object forming device 100 for transmitting a print start instruction from the printing device names as the three-dimensional object forming device 100 displayed by the pull-down menu. The device input field 921 may not be a pull-down menu, and may be in a display form capable of displaying the three-dimensional object forming device 100 currently connected to the image processing device 60.

In the example shown in FIG. 8, "printer #1" is selected as the transmission destination of the print start instruction in the device input field 921. In the present embodiment, the printing device name displayed as the initial setting in the device input field 921 is the three-dimensional object forming device 100 selected by the administrator on a device input screen 920 located on the administrator setting screen 90 to be described later.

Further, only one three-dimensional object forming device 100 may be communicably connected to one image processing device 60. In the device input field 921 in this case, the machine information of the three-dimensional object forming device 100 currently connected, for example, the IP address of the three-dimensional object forming device 100 is displayed.

The pre-print preview screen 872 is a screen for making a part of the contents set on the preview screen 70 located on at least one of the first screen S1 and the second screen S2 visible to the user. In the example shown in FIG. 8, the types of the forming surfaces 711 to 714 corresponding to the first preview image 781, the second preview image 782, the third preview image 783, and the fourth preview image 784, respectively, the names of the formation candidates 721 to 724, and the names of the preview images 781 to 784 are displayed. For example, "Front Image" is displayed as the type of the first forming surface 711, "Figure1.jpg" is displayed as the name of the first formation candidate 721, and "Figure1.tif" is displayed as the name of the first preview image 781.

The first consumables remaining amount confirmation screen 873 is a screen for allowing the user to visually recognize the remaining amount of ink as a liquid stored in the liquid storage portion 410 and the amount of waste liquid stored in the waste liquid tank. The remaining amount of ink is calculated by, for example, the control section 611 based on the ejection amount as the ink consumption amount. The amount of waste liquid stored is calculated by, for example, the control section 611 based on the ejection amount of ink consumed by the cleaning operation of the liquid ejecting head 310. The liquid storage portion 410 and the waste liquid tank may be provided with sensors for detecting the remaining amount of ink and the amount of waste liquid stored, and the storage amount may be calculated by the sensors provided in the liquid storage portion and the waste liquid tank.

As shown in FIG. 8, the remaining amount of ink and the amount of waste liquid stored are preferably displayed in a graph or the like so that the user can easily visually recognize them. In the example shown in FIG. 8, the remaining amount of ink for the four types of inks of cyan, magenta, yellow, and black is displayed in a horizontal bar graph in order from the top, and cyan is displayed as "C", magenta is displayed as "M", yellow is displayed as "Y", and black is displayed as "K" on the left side of the horizontal bar graph. In the horizontal bar graph, the colored areas indicate the remaining amount of ink. Further, when the remaining amount of ink reaches a predetermined value, for example, a value indicating the amount of ink required for the printing operation when the printing operation is executed, a mark prompting a warning may be displayed. In FIG. 8, since the remaining amount of black ink has fallen below a predetermined value, a mark prompting a warning is displayed on the right side of the horizontal bar graph showing the remaining amount of ink.

Further, below the horizontal bar graph showing the remaining amount of black ink, the amount of waste liquid stored is displayed in the horizontal bar graph. In the horizontal bar graph, the colored areas indicate the amount of waste liquid stored in the waste liquid tank. Further, when the amount of waste liquid stored reaches a predetermined value, for example, a value that is 80% or more of the maximum storage amount of waste liquid tank, a mark prompting a warning may be displayed. In FIG. 8, since the amount of waste liquid stored exceeds 80% of the maximum storage amount of waste liquid tank, a mark prompting a warning is displayed on the right side of the horizontal bar graph showing the amount of waste liquid stored.

The first consumables remaining amount confirmation screen 873 may further have a function of displaying the number of printable copies in which the number of copies that can be printed is predicted based on the remaining amount of ink. For example, the number of printable copies is determined by the following. First, the control section 611 recognizes the remaining amount of ink for each color, and calculates the amount of ink consumed for each color required when the currently set print job is executed for one individual. Next, based on the above-mentioned ink consumption amount per individual, the number of copies that can be executed with the current remaining amount of ink is calculated for each color. Subsequently, the number of printable copies as the three-dimensional object forming system 10 is determined based on the color having the smallest number of executable copies among the number of executable copies calculated for each color. The control section 611 displays the determined number of printable copies on the first consumables remaining amount confirmation screen 873.

When the number of printable copies is greater than the predetermined number of copies, the number of printable copies may be displayed in stages instead of displaying in units of copies. It is assumed that when the number of printable copies determined by the above method is 123 sets and the number of printable copies is 100 sets or more, the display is controlled in units of 100 sets. In this case, as the number of printable copies, instead of "123 sets can be printed", as shown in FIG. 8, "the same contents as the last printed image can be printed 100 sets or more" may be displayed.

The print start button 865 is a button for giving a print start instruction to start the forming step as printing with the contents displayed in the print preparation dialog 870. The control section 611 recognizes that the print start button 865 has been pressed by the user, and performs control such that the forming step is started. When the print start button 865 is pressed by the user, a print dialog 880 to be described later is displayed, and the forming step is started.

It is desirable that the print start button 865 has a different display form so that the user can distinguish between the print execution button 864 and the print start button 865. For example, in the present embodiment, the print execution button 864 located on the first screen S1 is displayed as "Print", and the print start button 865 is displayed as "Print Start".

The cancel button 866 is a button for stopping the display of the screen currently displayed on the display section 601 and returning to the screen previously displayed. In the present embodiment, when the cancel button 866 located in the print preparation dialog 870 is pressed, the control section 611 causes the display section 601 to display the previously displayed screen, that is, either the first screen S1 or the second screen S2. By pressing the cancel button 866, the user can visually recognize the preview screen 70 and the operation screen 80 on either the first screen S1 or the second screen S2 and make the setting again.

Figure 9:
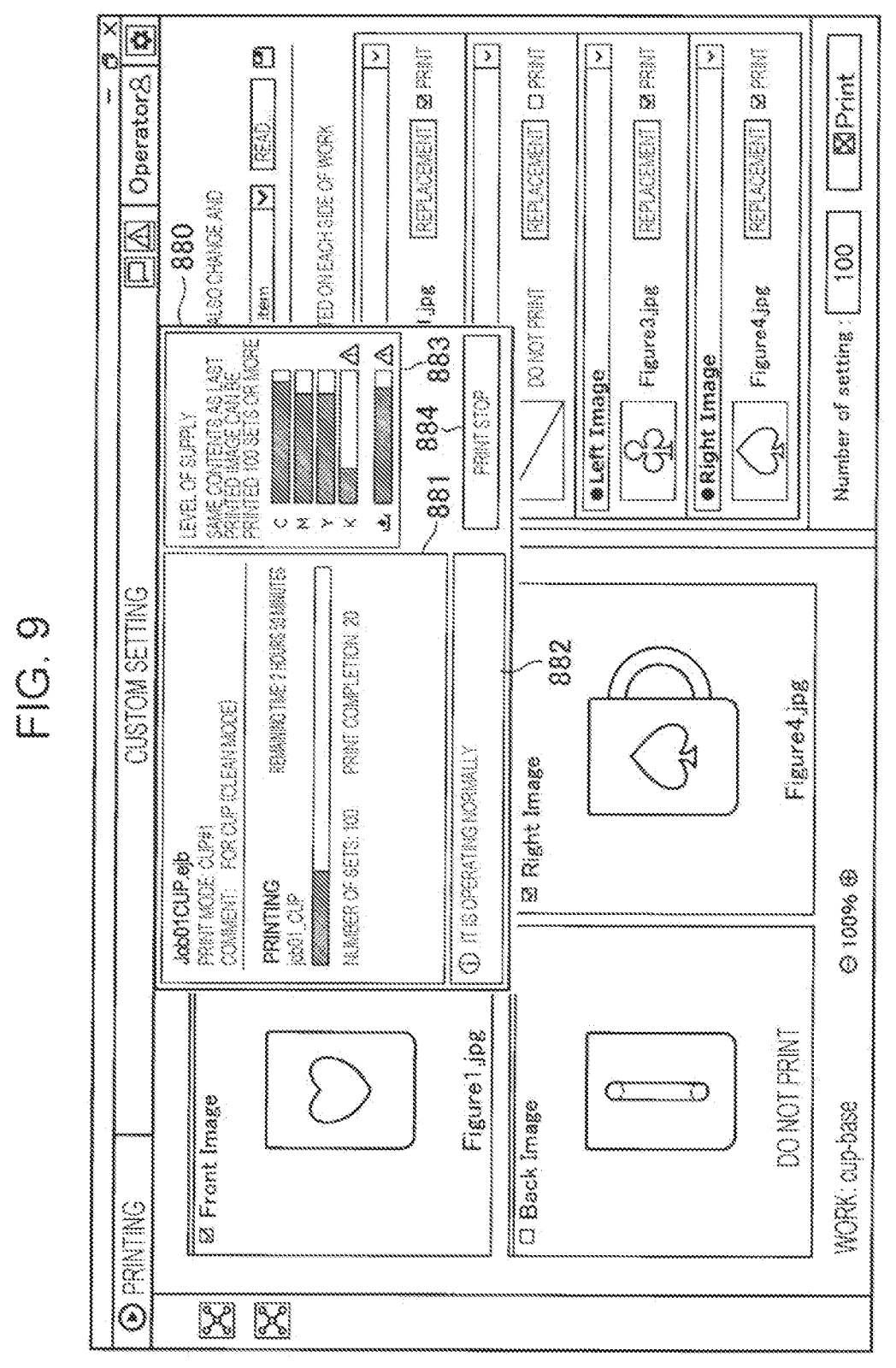

FIG. 9 is a diagram illustrating a print dialog 880 according to the embodiment of the present disclosure. The print dialog 880 is a screen displayed when the user presses the print start button 865 located in the print preparation dialog 870. The print dialog 880 is displayed when the forming step is started and is displayed until the curing step is ended. That is, the print dialog 880 is displayed when the forming step and the curing step are being executed.

The print dialog 880 includes a print status display screen 881, a state confirmation screen 882, a second consumables remaining amount confirmation screen 883, and a print stop button 884.

The print status display screen 881 is a screen for displaying information about printing that is currently being executed. That is, the print status display screen 881 makes a part of the setting contents visible to the user and makes the progress of the print job visible to the user in the operations up to the print preparation dialog 870. The print status display screen 881 includes an information area and a progress display area.

The display content of the information area on the print status display screen 881 is the same as the display content of the information area on the print information display screen 871. That is, in the information area, as information about the print job, for example, in addition to the name of the print job, the print mode as the currently selected print style, and the comment as the content of the print style are displayed.

In the progress display area, for example, the number of copies input on the number-of-copies setting screen 863 and the number of copies for which printing has been completed are displayed as information about the progress of the print job currently being executed. In the example shown in FIG. 9, "number of sets: 100" is displayed as the number of copies input on the number-of-copies setting screen 863, and "print completion: 20" is displayed as the number of copies for which printing has been completed so far. Further, the ratio of the number of copies for which printing has been completed so far to the number of copies input on the number-of-copies setting screen 863 may be displayed as the progress status of the print job. For example, as shown in FIG. 9, the progress status of the print job may be displayed as a horizontal bar graph. In this case, in the horizontal bar graph, the colored area indicates the ratio of the number of copies for which printing has been completed to the total number of copies when the number of copies input on the number-of-copies setting screen 863 is taken as the total number of copies.

Further, in the progress display area, a guideline for the remaining time until the print job currently being executed is completed may be displayed. For example, the calculation of the remaining time can be realized by the following control. First, the control section 611 recognizes the time from the start of printing to the completion of printing in one individual, that is, the printing time per individual. Next, the control section 611 subtracts the number of copies for which printing has been completed from the total number of copies, and calculates the number of copies to be printed after the present time as the remaining number of copies. Further, the control section 611 calculates the remaining time until the print job is completed when printing is executed at the currently executed printing speed based on the remaining number of copies to be printed and the printing time per individual. The control section 611 displays the calculated remaining time on the print status display screen 881. In the example shown in FIG. 9, "remaining time: 2 hours 59 minutes" is displayed as a guideline for the remaining time until the print job is completed.

The state confirmation screen 882 is a screen for displaying the state of the three-dimensional object forming device 100 executing printing with character information. When the three-dimensional object forming device 100 is printing without any problem, for example, as shown in FIG. 9, "It is operating normally" is displayed. Further, when an abnormality occurs in the three-dimensional object forming device 100, the content of the generated abnormality is displayed.

The second consumables remaining amount confirmation screen 883 located in the print dialog 880 calculates the remaining amount of ink and the amount of waste liquid stored in each color in the same manner as the first consumables remaining amount confirmation screen 873 located in the print preparation dialog 870. In the example shown in FIG. 9, the display form of the second consumables remaining amount confirmation screen 883 is the same as the display form of the first consumables remaining amount confirmation screen 873 in FIG. 8.

It is preferable that the second consumables remaining amount confirmation screen 883 further calculates the remaining amount of ink at predetermined time intervals and displays the remaining amount of ink according to the progress of the print job. The second consumables remaining amount confirmation screen 883 is displayed during the forming step and the curing step. In the forming step, ink as a liquid is ejected from the liquid ejecting head 310, and the remaining amount of ink changes every moment according to the ejection amount. For example, the display on the second consumables remaining amount confirmation screen 883 can be realized by the following control.

First, the control section 611 calculates the remaining amount of ink of each color at predetermined time intervals, for example, every 10 seconds by the same method as the calculation method on the first consumables remaining amount confirmation screen 873. Next, the control section 611 calculates the number of printable copies by the same method as the first consumables remaining amount confirmation screen 873, based on the calculated remaining amount of ink of each color. Further, the control section 611 displays the calculated remaining amount of ink for each color and the number of printable copies on the second consumables remaining amount confirmation screen 883. In this way, the user can confirm the remaining amount of ink in a state linked with the progress of the print job.

The print stop button 884 is a button for stopping the print job currently being executed, that is, stopping printing. The control section 611 recognizes that the print stop button 884 has been pressed by the user, and performs control such that the print job currently being executed is stopped. When the print stop button 884 is pressed, the currently executing job may be temporarily stopped and a screen for the user to determine whether or not to continue printing may be displayed.

In this way, the user can confirm the state of the three-dimensional object forming device 100, the information of the print job, and the progress of the print job during the forming step and the curing step.

The timing at which the print dialog 880 is displayed does not have to be exactly the same as the start of the forming step, and for example, there may be a time error such as the time for communication between the image processing device 60 and the three-dimensional object forming device 100. Further, the timing at which the display of the print dialog 880 ends does not have to be exactly the same as the end of the curing step, and may be, for example, after the curing step is ended.

According to the image processing device 60 described above, in the setting of the data when forming the formation on the three-dimensional object W, the combination setting and the individual setting as the individual determination screens 731 to 734, the determination screens 831 to 834, and the individual selection screens 841 to 844 are used together. Therefore, when forming a formation on the three-dimensional object W, the user can select a setting method according to the type and use of the formation candidates 721 to 724. That is, the user can easily set the data when forming the formation on the three-dimensional object W.

Figure 10:
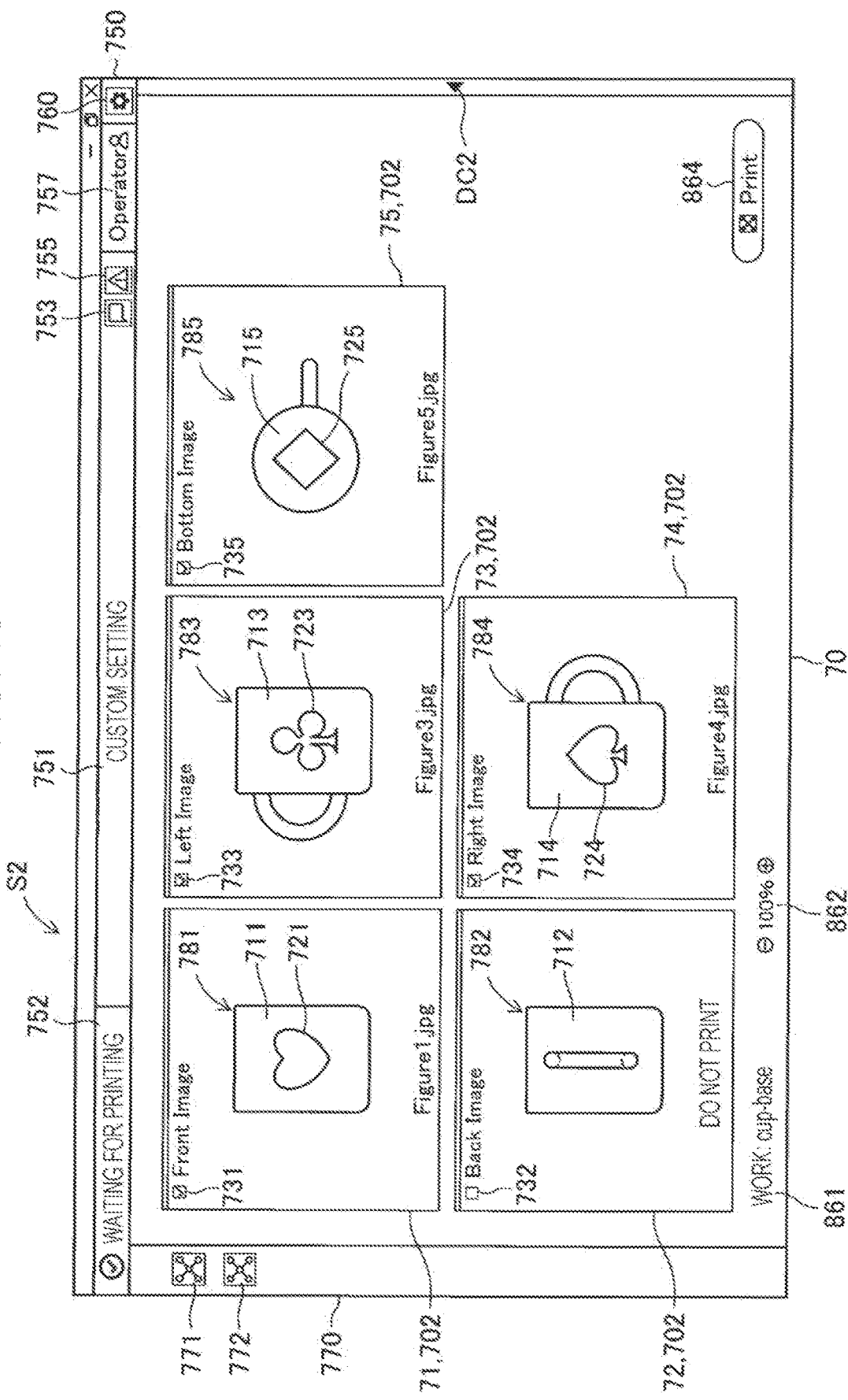
FIG. 10 is a diagram showing an example of a second screen according to the embodiment of the present disclosure.

FIG. 10 is a diagram showing an example of a second screen S2 according to the embodiment of the present disclosure. The second screen S2 is a screen in which the operation screen 80 is hidden, and includes a second display state change button DC2. The control section 611 switches between the display and non-display of the operation screen 80 by opening and closing the operation screen 80 on the display section 601 in a foldable manner by using the second display state change button DC2, and causes the display section 601 to display the first screen S1 and the second screen S2 in a switchable manner. For example, switching between the first screen S1 and the second screen S2 by the second display state change button DC2 can be realized by the following control.

In FIG. 10, when the control section 611 recognizes that the second display state change button DC2 located on the second screen S2 is pressed by the user, the hidden operation screen 80 is expanded from right to left in parallel with the user menu screen 770. That is, the second display state change button DC2 is located between the preview screen 70 and the operation screen 80, and the preview screen 70 and the operation screen 80 are displayed on the display section 601 at the same time. In the present embodiment, the screen in which the preview screen 70 and the operation screen 80 are displayed at the same time is referred to as the first screen S1. The configuration of the first screen S1 is as described above. The direction in which the operation screen 80 is expanded by pressing the second display state change button DC2 is optional and is not limited thereto.

In contrast, in FIG. 3, when the control section 611 recognizes that the second display state change button DC2 located on the first screen S1 is pressed by the user, the operation screen 80 is folded from left to right in parallel with the user menu screen 770. That is, the operation screen 80 is hidden, the second display state change button DC2 is located at the right end of the first screen S1, and the area of the preview screen 70 is widened. In the present embodiment, the screen in which the operation screen 80 is hidden by pressing the second display state change button DC2 located on the first screen S1 is referred to as the second screen S2. The direction in which the operation screen 80 is folded by pressing the second display state change button DC2 is optional and is not limited thereto.

The second screen S2 includes a status screen 750, a user menu screen 770, and a preview screen 70. The functions of the status screen 750 and the user menu screen 770 on the second screen S2 are the same as the functions of the status screen 750 and the user menu screen 770 on the first screen S1.

The preview screen 70 in the second screen S2 includes N number of second individual preview screens 702 (N is an integer greater than M), a work name 861 as a data name of the three-dimensional object W, and a magnification change screen 862. In the present embodiment, N is "5". The work name 861 and the magnification change screen 862 on the second screen S2 are the same as the work name 861 and the magnification change screen 862 on the first screen S1.

The N number of second individual preview screens 702 include a first preview screen 71, a second preview screen 72, a third preview screen 73, a fourth preview screen 74, and another preview screen 75 as the second individual preview screen 702.

In the example shown in FIG. 10, the first preview screen 71 to the fourth preview screen 74 are the same as the first preview screen 71 to the fourth preview screen 74 in the first screen S1. The second individual preview screen 702 may not include the individual determination screens 731 to 734 and another individual determination screen 735 as a fifth individual determination screen to be described later.

The other preview screen 75 further includes another preview screen 75 as a second individual preview screen 702 that makes another formation candidate 725 as a fifth formation candidate, which is a formation candidate to be formed on another forming surface 715 as a fifth forming surface of the three-dimensional object W different from the first forming surface 711 to the fourth forming surface 714, visible to the user. On the other preview screen 75, another preview image 785 is displayed as a fifth preview image in which the other formation candidate 725 is projected onto the other forming surface 715 of the three-dimensional object W.

In the example shown in FIG. 10, another preview image 785 is displayed in which an image of a diamond, which is the other formation candidate 725, is projected onto the bottom surface of the mug as the other forming surface 715. Further, "Bottom Image", which means a bottom view, is displayed in the other preview screen 75.

The other preview screen 75 as the second individual preview screen 702 further includes the other individual determination screen 735 as the fifth individual determination screen corresponding to the other forming surface 715. The other individual determination screen 735 is a screen for the user to determine whether or not to print the image as the other formation candidate 725 displayed on the other preview screen 75 on the other forming surface 715. The other individual determination screen 735 is constituted by a check box. When a check is entered in the check box, the image is printed on the other forming surface 715. The processing flow when an instruction from the user is received on the other individual determination screen 735 is the same as that of the first individual determination screen 731 described above.

As described above, when the formation instruction is received, the data names of the formation candidates 721 to 725 may be displayed in the corresponding preview screens 71 to 75. For example, in the example shown in FIG. 10, "Figure.5.jpg", which is the data name of the other formation candidate 725, is displayed on the other preview screen 75.

The preview screen 70 on the second screen S2 has a larger area for displaying the preview than the preview screen 70 on the first screen S1. Therefore, the user can display more second individual preview screens 702 than the first individual preview screen 701 on the first screen S1.

As described above, the print execution button 864 is a button for giving a print execution instruction to execute printing according to the contents displayed on the first screen S1 and the second screen S2. The function of the print execution button 864 is as described above.

Hereinafter, the processing content of the image processing device 60 and a display mode of an administrator screen AS displayed on the display section 601 according to the embodiment of the present disclosure will be described.

Figure 11:
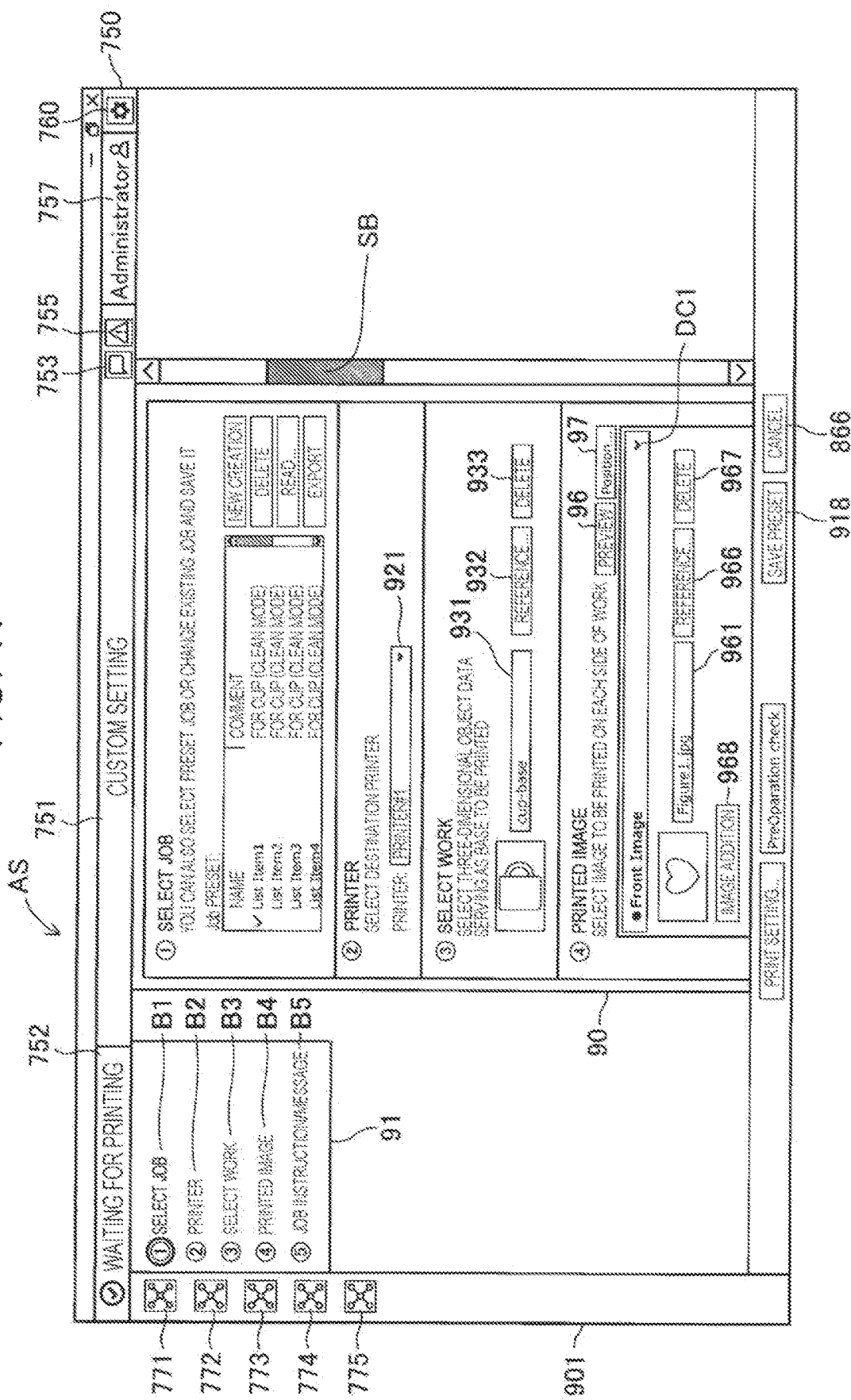
FIG. 11 is a diagram showing an example of an administrator screen according to the embodiment of the present disclosure.

A-3. Processing Content of Image Processing Device and Display Mode of Administrator Screen FIG. 11 is a diagram showing an example of an administrator screen AS according to the embodiment of the present disclosure. The same configurations as those of the first screen S1 shown in FIG. 3 are designated by the same reference numerals, and the description of the same configurations will be omitted as appropriate. The administrator screen AS as a combination setting screen includes a status screen 750 displayed in the upper end area of the administrator screen AS, an administrator menu screen 901 displayed in the left end area of the administrator screen AS, and an administrator setting screen 90 displayed in the right area of the administrator screen AS. Further, the administrator screen AS includes a guidance screen 91 displayed adjacent to the left area of the administrator screen AS, a cancel button 866 displayed in the lower end area of the administrator screen AS, and a setting save button 918 displayed in the lower end area of the administrator screen AS and arranged on the left side of the cancel button 866. The display positions of the screens 750, 901, 90, and 91 and the buttons 866 and 918 located on the administrator screen AS are not limited to the above.

Here, an area fixedly provided in the lower end area of the administrator screen AS is referred to as an action button area. The setting save button 918 and the cancel button 866 are located in the action button area as the lower end area of the administrator screen AS. A screen or button other than the setting save button 918 and the cancel button 866 may be provided in the action button area. In the example shown in FIG. 11, in the action button area, a button displayed as "PreOperation check" is provided in the left area of the setting save button 918, and further, a button displayed as "print setting . . . " is provided so as to be adjacent to the left area.

In the present embodiment, the action button area including the setting save button 918 and the cancel button 866 is fixed to the lower end area of the administrator screen AS. In this way, the administrator as a user can stop, for example, saving the created combination and creating the combination at any timing regardless of the display range of the administrator setting screen 90. The detailed functions of the setting save button 918 and the cancel button 866 will be described later.

The status screen 750 on the administrator screen AS includes a job name display screen 751, a device state display screen 752, a message confirmation button 753, a warning notification confirmation button 755, a user display screen 757, and a basic setting button 760. The function of the status screen 750 on the administrator screen AS is the same as the function of the status screen 750 on the first screen S1 and the second screen S2.

The administrator menu screen 901 located on the administrator screen AS is a screen for switching main menus, like the user menu screen 770 on the first screen S1 and the second screen S2. The administrator menu screen 901 includes a first menu button 771, a second menu button 772, a third menu button 773, a fourth menu button 774, and a fifth menu button 775. The function of the first menu button 771 and the function of the second menu button 772 on the administrator screen AS are the same as the function of the first menu button 771 and the function of the second menu button 772 on the first screen S1 and the second screen S2. That is, when the user's authority is "administrator", both the functions that can be used when the user's authority is "operator" and the functions that can be used when the user's authority is "administrator" can be executed.

The third menu button 773 displays the administrator setting screen 90 to be described later. The fourth menu button 774 displays a service engineer setting screen (not shown) for a "service engineer" to make settings, which is different from the "operator" as the user and the "administrator" as the user. The service engineer referred to here is, for example, an employee of a provider who provides the three-dimensional object forming system 10. On the service engineer setting screen, a screen for making settings for repairing and maintenance of the hardware and software included in the three-dimensional object forming system 10 is displayed. The fifth menu button 775 displays an administrator maintenance screen for the administrator as a user to make settings for repairing and maintenance of the three-dimensional object forming system 10. The number of menus and the number of menu buttons provided by the image processing device 60 are not limited thereto.

Next, the administrator setting screen 90 will be described. The administrator setting screen 90 is a screen for the administrator as a user to create a combination of images as a formation to be formed on the forming surfaces 711 to 714 of the three-dimensional object W and registering the combination in the storage section 650. The outer shape of the administrator setting screen 90 is defined by a rectangular area, and is arranged in the center of the administrator screen AS. The administrator setting screen 90 includes a combination creation screen 910, a device input screen 920, a work selection screen 930, a formation candidate selection screen 940, and a message input screen 950. In the example shown in FIG. 11, some of the screens 910, 920, 930, 940, and 950 included in the administrator setting screen 90 are displayed. The area displayed on the display section 601 on the administrator setting screen 90 is hereinafter referred to as a setting display area.

At the right end of the administrator setting screen 90, a vertical scroll bar SB for moving the display range in the administrator setting screen 90 in the up-and-down direction is provided in the vertical direction. The administrator as a user adjusts the display range of the administrator setting screen 90 displayed on the display section 601 by operating the vertical scroll bar SB provided on the administrator setting screen 90, for example, with a mouse or the like.

FIG. 12 is a diagram schematically showing the entire administrator setting screen 90 according to the embodiment of the present disclosure. For convenience, FIG. 12 is shown as one figure in order to display all of the screens 910, 920, 930, 940, and 950 included in the administrator setting screen 90. The outer shape of each of the screens 910, 920, 930, 940, and 950 included in the administrator setting screen 90 is defined by a rectangular area. The respective screens 910, 920, 930, 940, and 950 included in the administrator setting screen 90 are displayed in a vertical row in this order from the upper end of the administrator setting screen 90. The display positions of the screens 910, 920, 930, 940, and 950 are not limited to the above description.

An operation guide may be displayed on the respective screens 910, 920, 930, 940, and 950 included in the administrator setting screen 90. In the example shown in FIG. 12, as operation guides, headings of the screens 910, 920, 930, 940, and 950 included in the administrator setting screen 90 and explanations for indicating the operation contents of the screens 910, 920, 930, 940, and 950 included in the administrator setting screen 90 are displayed. For example, on the combination creation screen 910, "Select a job" is displayed as a heading of the combination creation screen 910 and "You can also select a preset job or change an existing job and save it." is displayed as an explanation for indicating the operation content of the combination creation screen 910. On the device input screen 920, "Printer" is displayed as a heading of the device input screen 920, and "Select a destination printer." is displayed as an explanation to indicate the operation content of the device input screen 920. On the work selection screen 930, "Select a work" is displayed as a heading of the work selection screen 930, and "Select three-dimensional object data serving as a base to be printed." is displayed as an explanation for indicating the operation content of the work selection screen 930. On the formation candidate selection screen 940, "Printed image" is displayed as a heading of the formation candidate selection screen 940, and "Select the image to be recorded on each side of the work." is displayed as an explanation for indicating the operation content of the formation candidate selection screen 940. On the message input screen 950, the display "Job instruction/message" is displayed as a heading of the message input screen 950 and "Enter the job instruction to the operator." is displayed as an explanation for indicating the operation content of the message input screen 950. The headings and explanations in the administrator setting screen 90 are not limited to the present disclosure, and can be optionally displayed and may not be displayed.

The functions and display modes of the screens 910, 920, 930, 940, and 950 included in the administrator setting screen 90 will be described in order.

The combination creation screen 910 is a screen for the administrator to select a template when registering a combination and to transfer data related to the combination. The outer shape of the combination creation screen 910 is defined by a rectangular area. The combination creation screen 910 includes a combination display screen 911, a new creation button 912, a combination deletion button 913, an administrator read button 914, and an export button 915. The outer shape of the combination display screen 911 is defined by a horizontally long rectangular area. The new creation button 912, the combination deletion button 913, the administrator read button 914, and the export button 915 are displayed in a vertical row in this order in the area on the right side of the combination display screen 911.

The combination display screen 911 is a screen that displays the combinations registered in the past by the administrator as a user in a list format. In the present embodiment, at the right end of the combination display screen 911, a vertical scroll bar SB for moving the display range in the combination display screen 911 in the up-and-down direction is provided in the vertical direction. The administrator adjusts the display range of the combination display screen 911 displayed on the display section 601 by operating the vertical scroll bar SB located on the combination display screen 911, for example, with a mouse or the like.

In FIG. 12, four combinations are displayed on the combination display screen 911 as combinations registered in the past by the administrator as a user. The four combinations are "List Item 1", "List Item 2", "List Item 3", and "List Item 4".

In the example shown in FIG. 12, the combination display screen 911 is constituted by a list box provided with the vertical scroll bar SB. The user can select a combination to be a template by selecting any of the combinations displayed on the combination display screen 911. When the control section 611 receives an instruction from the administrator as a user on the combination display screen 911, here, an instruction to select one combination, the control section 611 recognizes which combination is selected. The combination display screen 911 may not be a list box, and may be, for example, a pull-down menu.

Further, the control section 611 may display which combination is selected in the combination display screen 911 such that the administrator as a user can visually recognize it. In the example shown in FIG. 12, since the combination "List Item1" is selected, a check mark is displayed on the left side of the combination name "List Item1".

When registering a combination for the first time, the combination display screen 911 may provide a combination as an initial setting, and the control section 611 may display the combination as an initial setting.

The new creation button 912 is a button for creating a new combination without using the combination registered in the past by the administrator as a user. When the new creation button 912 is pressed, the control section 611 does not receive data related to the combinations in the respective screens 910, 920, 930, 940, and 950 included in the administrator setting screen 90. That is, the control section 611 performs control such that none of the information of the setting items on the respective screens 920, 930, 940, and 950 included in the administrator setting screen 90 is selected. Therefore, the administrator as a user can make individual settings on the respective screens 920, 930, 940, and 950 included in the administrator setting screen 90.

The combination deletion button 913 is a button for deleting data related to the selected combination among the combinations registered in the past by the administrator as the user. When the combination deletion button 913 is pressed, the control section 611 deletes one combination currently selected on the combination display screen 911. It is preferable that a confirmation screen is displayed for confirming whether or not the selected combination may be deleted after the combination deletion button 913 is pressed until the combination is actually deleted. In this way, even when the administrator as a user accidentally presses the combination deletion button 913, the deletion instruction can be canceled. Further, the control section 611 may perform control such that the combination deleted by pressing the combination deletion button 913 maintains the state stored in the storage section 650 for a predetermined period.

The administrator read button 914 has two functions. First, the first function provided in the administrator read button 914 will be described. When the administrator read button 914 is pressed while the combination is selected on the combination display screen 911, the control section 611 reads the selected combination and causes the display section 601 to display the read combination. That is, the control section 611 displays an image or the like in which the data related to the combination selected on the combination display screen 911 is reflected on the device input screen 920, the work selection screen 930, the formation candidate selection screen 940, and the message input screen 950.

Next, the second function provided in the administrator read button 914 will be described. The administrator read button 914 further reads the combination registered in one three-dimensional object forming system 10 into another three-dimensional object forming system (not shown) as another three-dimensional object forming system different from the three-dimensional object forming system 10. Further, the administrator read button 914 expands data related to the combination in another three-dimensional object forming system. The other three-dimensional object forming system referred to here may be any model as long as it can exchange data with the three-dimensional object forming system 10, and may not be, for example, a model having the same model number as the three-dimensional object forming system 10.

Specifically, when the administrator read button 914 is pressed, the control section 611 recognizes data related to the combination exported by the export button 915, which will be described later, in the other three-dimensional object forming system. Further, the control section 611 receives a reading instruction and reads the data related to the recognized combination into one three-dimensional object forming system 10. As a method of reading the combination selected in the other three-dimensional object forming system into one three-dimensional object forming system 10, for example, there is a method of physically moving data via a USB flash drive. Further, one three-dimensional object forming system 10 and the other three-dimensional object forming system may be communicably connected to each other wirelessly or by wire so that data related to the combination can be exchanged with each other.

When the administrator read button 914 is pressed after importing the data related to the combination into one three-dimensional object forming system 10, the control section 611 reads the data related to the combination imported from the other three-dimensional object forming system and causes the display section 601 to display the data. That is, the control section 611 reads the data related to the combination imported from the other three-dimensional object forming system and displays an image in which the imported data related to the combination is reflected on the device input screen 920, the work selection screen 930, the formation candidate selection screen 940, and the message input screen 950.

When there is data related to the combination read from the other three-dimensional object forming system, the control section 611 may display the save destination of the data related to the read combination by an explorer. In this way, the user can easily grasp the location of the data related to the combination read from the other three-dimensional object forming system.

The export button 915 is a button for exporting the data related to the combination in order to expand the data related to the combination registered in one three-dimensional object forming system 10 to the other three-dimensional object forming system.

For example, when the export button 915 in the other three-dimensional object forming system is pressed while the combination is selected on the combination display screen 911 included in the other three-dimensional object forming system, the control section 611 exports the data related to the selected combination, and displays the save destination of the data related to the combination by the explorer. That is, the control section 611 exports the data related to the combination selected on the combination display screen 911 in the other three-dimensional object forming system. Further, the control section 611 saves the data related to the combination in the save destination designated by the administrator as a user. Here, when the administrator read button 914 is pressed in the one three-dimensional object forming system 10, the control section 611 receives a reading instruction for reading the data related to the combination in the one three-dimensional object forming system 10. The control section 611 recognizes the reading instruction and reads the data related to the combination, so that the user can expand the data related to the combination from one three-dimensional object forming system 10 to the other three-dimensional object forming system. When the export button 915 is pressed, the combination to be exported may not be selected on the combination display screen 911 at that time, and although not shown, the control section 611 may display a separate screen for selecting the combination to be exported.

As described above, when the combination is created on the administrator setting screen 90, the control section 611 causes the display section 601 to display the combination creation screen 910. Thereby, the control section 611 performs control such that the administrator as a user can selectively execute the creation of the combination by two methods via the combination creation screen 910 displayed on the display section 601. Of the two methods, the first is a method of creating a new combination by using the new creation button 912 without using the combination registered in the past by the administrator as a user. The second is a method of creating a new combination by diverting and editing the combination registered in the past by the administrator as a user by using the combination display screen 911 and the administrator read button 914. In this way, the administrator as a user can create a combination according to the purpose.

Further, even when there are a plurality of three-dimensional object forming systems 10 provided with the same image processing device 60, the control section 611 causes the display section 601 to display the combination creation screen 910. Thereby, the control section 611 can expand the combination created in the three-dimensional object forming system 10 provided with one image processing device 60 to another three-dimensional object forming system, and vice versa. In this way, in the plurality of three-dimensional object forming systems 10, various data including the data related to the combination can be communicated with each other.

The device input screen 920 is a screen for selecting a three-dimensional object forming device 100 to execute printing. An instruction from the image processing device 60 is transmitted to the three-dimensional object forming device 100 selected in the device input field 921. In the present embodiment, in the device input screen 920 included in the administrator screen AS, the three-dimensional object forming device 100 selected by the administrator as a user is displayed as an initial setting in the device input field 921 on the print information display screen 871.

The work selection screen 930 is a screen for selecting data of a three-dimensional object W to be printed. The three-dimensional object data of the three-dimensional object W is given the work name 861 of the three-dimensional object W. Here, the three-dimensional object data includes at least data indicating the surface shape of the three-dimensional object W. Further, the three-dimensional object data may include data indicating various recording conditions for the three-dimensional object W such as the type of ink suitable for the three-dimensional object W, the ejection amount, and the recording method, but the data is not essential in the present disclosure. The work selection screen 930 includes a work selection field 931, a work reference button 932, a work image deletion button 933, and a first work thumbnail screen 934. The first work thumbnail screen 934, the work selection field 931, the work reference button 932, and the work image deletion button 933 are displayed side by side in a horizontal row in this order in the work selection screen 930.

The work selection field 931 is an input field for inputting the three-dimensional object W as a print target in the combination created by the administrator as a user on the administrator setting screen 90. The work selection field 931 is constituted by, for example, a text box having a search function. When the three-dimensional object W is selected in the work selection field 931, the control section 611 recognizes data related to the selected three-dimensional object W and displays the work name 861 of the selected three-dimensional object W in the work selection field 931. In the example shown in FIG. 12, "cup-base" is displayed as the work name 861 of the selected three-dimensional object W. When none of the three-dimensional objects W is selected, it may be displayed that the three-dimensional object W is not selected. For example, in the work selection field 931, "An image is not selected" may be displayed instead of the work name 861 of the three-dimensional object W.

The work reference button 932 is a button for referring to the save destination of the data related to the three-dimensional object W stored in the storage section 650. When the work reference button 932 is pressed, the control section 611 displays, for example, a folder in which the three-dimensional object data related to the three-dimensional object W is saved by an explorer. Thereby, the administrator as a user presses the work reference button 932 and selects the data related to the three-dimensional object W, so that the three-dimensional object W as a print target in the combination currently set on the administrator setting screen 90 can be selected.

The work image deletion button 933 is a button for deselecting the data related to the selected three-dimensional object W. When the work image deletion button 933 is pressed, the control section 611 deselects the data related to the three-dimensional object W selected in the work selection field 931 and controls the state such that a new three-dimensional object W can be selected.

When the work image deletion button 933 is pressed, it is preferable that the control section 611 stops displaying the work name 861 of the three-dimensional object W displayed in the work selection field 931, and displays that the data related to the three-dimensional object W has not been selected instead of the work name 861 of the three-dimensional object W. When the data related to the three-dimensional object W is not selected, the control section 611 causes the display section 601 to display, for example, "An image is not selected".

The first work thumbnail screen 934 is a screen for making a thumbnail displayed by reducing an image of the three-dimensional object W set by the administrator on the work selection screen 930 visible to the administrator as a user. The outer shape of the first work thumbnail screen 934 is defined by a horizontally long rectangular area. When an instruction from the administrator as a user is received in either the work selection field 931 or the work reference button 932 via the display section 601 the control section 611 displays the thumbnail of the three-dimensional object W on the first work thumbnail screen 934 based on the data related to the selected three-dimensional object W.

Further, when the work image deletion button 933 is pressed via the display section 601, it is preferable that the control section 611 stops displaying the thumbnail on the first work thumbnail screen 934 and displays that the print target is not selected. When the data related to the three-dimensional object W is not selected, for example, as in the second thumbnail screen 852 in FIG. 3, the control section 611 performs control such that the first work thumbnail screen 934 does not display thumbnails and displays diagonal lines.

The formation candidate selection screen 940 is a screen for selecting formation candidates 721 to 724 to be printed on the respective forming surfaces 711 to 714 of the three-dimensional object W. The formation candidate selection screen 940 includes a first formation candidate selection screen 941, a second formation candidate selection screen 942, a third formation candidate selection screen 943, a fourth formation candidate selection screen 944, a preview button 96, and an edit button 97. The outer shapes of the first formation candidate selection screen 941, the second formation candidate selection screen 942, the third formation candidate selection screen 943, and the fourth formation candidate selection screen 944 are defined by a horizontally long rectangular area, and displayed in a vertical row in this order in the formation candidate selection screen 940. Further, the preview button 96 and the edit button 97 are displayed side by side in a horizontal row in this order in the right area of the upper area of the first formation candidate selection screen 941. The display positions of the screens 941 to 944 and the buttons 96 and 97 are not limited to the above description.

The first formation candidate selection screen 941 is a screen for selecting an image as the first formation candidate 721 to be printed on the first forming surface 711 of the three-dimensional object W. Similarly, the second formation candidate selection screen 942 is a screen for selecting an image as the second formation candidate 722 to be printed on the second forming surface 712 of the three-dimensional object W. Further, the third formation candidate selection screen 943 is a screen for selecting an image as the third formation candidate 723 to be printed on the third forming surface 713 of the three-dimensional object W. Similarly, the fourth formation candidate selection screen 944 is a screen for selecting an image as the fourth formation candidate 724 to be printed on the fourth forming surface 714 of the three-dimensional object W. The formation candidate selection screen 940 may further be provided with another formation candidate selection screen (not shown) for selecting an image as the other formation candidate 725 to be printed on the other forming surface 715 of the three-dimensional object W.

It is preferable that the names of the forming surfaces 711 to 714 of the three-dimensional object W are displayed as headings on the first formation candidate selection screen 941, the second formation candidate selection screen 942, the third formation candidate selection screen 943, and the fourth formation candidate selection screen 944 in order to make it easier for the administrator as a user to visually recognize which screen corresponds to the forming surfaces 711 to 714 of the three-dimensional object W. For example, since the first formation candidate selection screen 941 is a screen for selecting the first formation candidate 721 to be printed on the front surface of the three-dimensional object W as the first forming surface 711, "Front Image", which means a front view, is displayed in FIG. 12. The display for distinguishing each of the forming surfaces 711 to 714 of the three-dimensional object W is not limited to the present embodiment, and may be any notation that can be distinguished by the administrator as a user.

The first formation candidate selection screen 941, the second formation candidate selection screen 942, the third formation candidate selection screen 943, and the fourth formation candidate selection screen 944 each include the first display state change button DC1. The function of the first display state change button DC1 is as described above. Describing the first formation candidate selection screen 941 as an example, in the first formation candidate selection screen 941, the display and non-display are switched by opening and closing a setting information area in the first formation candidate selection screen 941 in a foldable manner. The above-mentioned "setting information area" means an area including setting information for setting the first formation candidate 721 on the first forming surface 711 of the three-dimensional object W, such as an image reference button 966, an image deletion button 967, a first formation candidate selection field 961, a first thumbnail screen 951 for an administrator, and an image addition button 968. In the example shown in FIG. 12, the setting information area is displayed on the first formation candidate selection screen 941 and the second formation candidate selection screen 942, and the setting display area is hidden on the third formation candidate selection screen 943 and the fourth formation candidate selection screen 944. The processing flows of the second formation candidate selection screen 942, the third formation candidate selection screen 943, and the fourth formation candidate selection screen 944 are the same as that of the first formation candidate selection screen 941.

In the example shown in FIG. 12, the setting information area on the first formation candidate selection screen 941 and the setting information area on the second formation candidate selection screen 942 are displayed. Further, the setting display area on the third formation candidate selection screen 943 and the setting information area on the fourth formation candidate selection screen 944 are hidden. When the administrator as a user presses the first display state change button DC1 while the setting information area is displayed, the setting information area is folded from the bottom to the top in parallel with the heading. That is, only the heading is displayed, and the setting information area is hidden. Further, when the administrator presses the first display state change button DC1 again while the setting information area is not displayed, the setting information area is displayed again.

The first formation candidate selection screen 941 includes a first formation candidate selection field 961, an image reference button 966, an image deletion button 967, a first thumbnail screen 951 for an administrator, and an image addition button 968. Similarly, the second formation candidate selection screen 942 includes a second formation candidate selection field 962, an image reference button 966, an image deletion button 967, a second thumbnail screen 952 for an administrator, and an image addition button 968. Although not shown, the third formation candidate selection screen 943 includes a third formation candidate selection field, an image reference button 966, an image deletion button 967, a third thumbnail screen for an administrator, and an image addition button 968. Further, although not shown, the fourth formation candidate selection screen 944 includes a fourth formation candidate selection field, an image reference button 966, an image deletion button 967, a fourth thumbnail screen for an administrator, and an image addition button 968. The thumbnail screens 951 and 952 for an administrator, the formation candidate selection fields 961 and 962, the image reference buttons 966, and the image deletion buttons 967 are displayed side by side in a horizontal row in this order on the formation candidate selection screens 941 to 944. Further, the image addition buttons 968 are displayed below the thumbnail screens 951 and 952 for an administrator on the formation candidate selection screens 941 to 944. The display positions of the screens 961, 962, 951, and 952 and the buttons 966, 967, and 968 included in the formation candidate selection screens 941 to 944 are not limited to the above description.

The functions of the components and processing flows in the first formation candidate selection field 961, the second formation candidate selection field 962, the third formation candidate selection field (not shown), and the fourth formation candidate selection field (not shown) described above will be described by taking the first formation candidate selection field 961 as an example. The functions and processing flows of the second formation candidate selection field 962, the third formation candidate selection field (not shown), and the fourth formation candidate selection field (not shown) are the same as those of the first formation candidate selection field 961.

The first formation candidate selection field 961 is an input field for inputting the first formation candidate 721 of the combination created by the administrator as a user on the administrator setting screen 90. The first formation candidate selection field 961 is constituted by, for example, a text box having a search function. When the image as the first formation candidate 721 is selected in the first formation candidate selection field 961, the control section 611 recognizes the data related to the image as the selected first formation candidate 721, and displays the data name of the image as the selected first formation candidate 721 in the first formation candidate selection field 961. In the example shown in FIG. 12, "Figure1.jpg" is displayed as the data name of the first formation candidate 721. When none of the images is selected, it may be displayed that the image as the first formation candidate 721 is not selected. For example, in the first formation candidate selection field 961, "An image is not selected" may be displayed instead of the data name of the first formation candidate 721.

The image reference button 966 is a button for the administrator as a user to refer to a save destination of image data previously stored in the storage section 650 as a formation candidate. When the image reference button 966 is pressed, the control section 611 displays, for example, a folder in which an image that can be selected as a formation candidate is saved by an explorer. When the image reference button 966 in each of the formation candidate selection screens 941 to 944 corresponding to the forming surfaces 711 to 714 of the three-dimensional object W is pressed, the control section 611 recognizes the selected images as the formation candidates 721 to 724 on the forming surfaces 711 to 714 of the corresponding three-dimensional object W. Thereby, the administrator as a user presses the image reference button 966 and selects an image, so that the formation candidates 721 to 724 in the combination created by the administrator on the administrator setting screen 90 can be selected.

The image deletion button 967 is a button for deselecting the selected images as the formation candidates 721 to 724. When the image deletion button 967 is pressed, the control section 611 deselects the images as the formation candidates 721 to 724 selected in the first formation candidate selection field 961, the second formation candidate selection field 962, the third formation candidate selection field (not shown), and the fourth formation candidate selection field (not shown), and performs control such that a new image can be selected.

When the image deletion button 967 is pressed, it is preferable that the control section 611 does not display the data names of the formation candidates 721 to 724 displayed in the first formation candidate selection field 961, the second formation candidate selection field 962, the third formation candidate selection field (not shown), and the fourth formation candidate selection field (not shown), and controls the display section 601 to display that no image is selected in the formation candidates 721 to 724 instead of the data names of the formation candidates 721 to 724. When the formation candidates 721 to 724 are not selected, the control section 611 causes the display section 601 to display, for example, "An image is not selected".

The first thumbnail screen 951 for an administrator as the thumbnail screen for an administrator is a screen for making a thumbnail displayed by reducing an image as the first formation candidate 721 set by the administrator as a user on the first formation candidate selection screen 941 visible to the administrator as a user. Similarly, the second thumbnail screen 952 for an administrator as the thumbnail screen for an administrator is a screen for making a thumbnail displayed by reducing an image as the second formation candidate 722 set by the administrator as a user on the second formation candidate selection screen 942 visible to the administrator as a user. Further, although not shown, the third thumbnail screen for an administrator as the thumbnail screen for an administrator is a screen for making a thumbnail displayed by reducing an image as the third formation candidate 723 set by the administrator as a user on the third formation candidate selection screen 943 visible to the administrator as a user. Further, although not shown, the fourth thumbnail screen for an administrator as the thumbnail screen for an administrator is a screen for making a thumbnail displayed by reducing an image as the fourth formation candidate 724 set by the administrator as a user on the fourth formation candidate selection screen 944 visible to the administrator as a user.

When an instruction from the administrator as a user is received in at least one of the first formation candidate selection field 961 and the image reference button 966 via the display section 601, the control section 611 executes the following. The control section 611 displays the thumbnail screens 951 and 952 for an administrator, the third thumbnail screen for an administrator (not shown), and the fourth thumbnail screen for an administrator (not shown) corresponding to the selected formation candidates 721 to 724. For example, as shown in FIG. 12, when an image of a heart is selected as the first formation candidate 721 in at least one of the first formation candidate selection field 961 and the image reference button 966 via the display section 601, the image of the heart, which is the first formation candidate 721, is displayed on the first thumbnail screen 951 for an administrator.

Further, when an instruction from the user is received by the image deletion button 967 via the display section 601, it is preferable that the control section 611 stops displaying the thumbnail on the first thumbnail screen 951 for an administrator and displays that the formation candidates 721 to 724 are not selected. When the formation candidates 721 to 724 are not selected, for example, as in the second thumbnail screen 952 for an administrator in FIG. 12, the control section 611 performs control such that the second thumbnail screen 952 for an administrator does not display thumbnails and displays diagonal lines.

The image addition button 968 is a button for adding an image as the formation candidates 721 to 724 to be printed on one of the forming surfaces 711 to 714 of the three-dimensional object W. That is, the control section 611 causes the display section 601 to display the image addition button 968 as a setting screen for printing a plurality of images on one of the forming surfaces 711 to 714 of the three-dimensional object W. In the example shown in FIG. 12, by selecting the image addition button 968 on, for example, by a click operation, although not shown, a separate screen for adding an image to be printed on one of the forming surfaces 711 to 714 of the three-dimensional object W is displayed. This separate screen may be provided with a number setting field for setting the number of images to be printed on one of the forming surfaces 711 to 714 of the three-dimensional object W, for example, in addition to an input field for selecting data related to an image to be printed on one of the forming surfaces 711 to 714 of the three-dimensional object W. This number setting field is, for example, a spin button provided with an input field for inputting the number of images to be printed on one of the forming surfaces 711 to 714 of the three-dimensional object W in numbers and an input assist button for increasing or decreasing the input numbers.

The message input screen 950 is a screen for the administrator as a user to register an instruction from the administrator as a user to the operator. The message input screen 950 includes a message input field 958.

The message input field 958 is an input field for the administrator as a user to input a message from the administrator to the operator. The outer shape of the message input field 958 is defined by a rectangular area. In the example shown in FIG. 12, the message input field 958 is constituted by a text box for inputting characters. The processing flow executed by the control section 611 when the administrator's instruction is received in the message input field 958 via the display section 601 will be described below.

The control section 611 causes the display section 601 to display the message input field 958. The administrator as a user inputs characters as a message into the message input field 958 via the display section 601 by, for example, an input operation using a keyboard. The control section 611 stores the input character information in the storage section 650 as data related to the combination currently created on the administrator setting screen 90. Here, tentatively, the combination of the formation candidates 721 to 724 currently created on the administrator setting screen 90 is referred to as the first combination. When the first combination is selected on at least one of the first screen S1 and the second screen S2, the character information input in the message input field 958 is displayed as a message on the message screen 754.

In the example shown in FIG. 12, character information "The image on the back (Figure2.jpg) is no longer needed this time, so please turn off printing." is input as a message in the message input field 958. Therefore, for example, when the first combination is selected on the first screen S1, the same character information as the character information input in the message input field 958 as shown in FIG. 5 is displayed as a message.

The preview button 96 is a button for displaying the combinations created on the combination creation screen 910, the work selection screen 930, and the formation candidate selection screen 940 in a preview format. When the preview button 96 is pressed, the control section 611 causes the display section 601 to display, for example, the combinations created on the combination creation screen 910, the work selection screen 930, and the formation candidate selection screen 940 in the same format as the second screen S2. That is, the formation candidates 721 to 724 to be formed on the forming surfaces 711 to 714 of the three-dimensional object W can be visually recognized by the administrator as a user. Thereby, the administrator as a user can grasp the combination created on the administrator setting screen 90 for each of the forming surfaces 711 to 714 of the three-dimensional object W. Further, the administrator as a user can confirm whether or not the forming surfaces 711 to 714 of the three-dimensional object W are set to form the desired formation before registering the combination created on the administrator setting screen 90, that is, storing the combination in the storage section 650.

The edit button 97 is a button for shifting the screen displayed on the display section 601 to an edit screen ES to be described later. When the edit button 97 is pressed, the control section 611 causes the display section 601 to display the edit screen ES to be described later.

Next, the guidance screen 91 will be described. As shown in FIG. 11, the guidance screen 91 is a screen for shifting the locations displayed in the setting display area described above to each of five administrator setting items in the administrator setting screen 90 displayed on the display section 601. The outer shape of the guidance screen 91 is defined by a rectangular area. Here, as shown in FIG. 12, the five administrator setting items are "select a job" as the combination creation screen 910, "printer" as the device input screen 920, "select a work" as the work selection screen 930, "printed image" as the formation candidate selection screen 940, and "job instruction/message" as the message input screen 950.

The guidance screen 91 shown in FIG. 11 includes five shift buttons (in other words, transition buttons) B1 to B5 corresponding to the five administrator setting items. When the first shift button B1 to the fifth shift button B5 are pressed, the display position of the administrator setting screen 90 is adjusted so that the corresponding administrator setting item is located in the setting display area of the display section 601. The first shift button B1 is a button for adjusting the display position of the administrator setting screen 90 so that the combination creation screen 910 is displayed in the display area of the display section 601 in the setting display area. For example, in the administrator setting screen 90 of the administrator screen AS shown in FIG. 11, when the administrator as a user displays the administrator setting item of "job instruction/message" in the setting display area, it is necessary to scroll the vertical scroll bar SB downward. On the other hand, by pressing the fifth shift button B5 on the guidance screen 91, the administrator as a user can display the administrator setting item of "job instruction/message" in the setting display area without operating the vertical scroll bar SB.

On the shift buttons B1 to B5, the same character information as the heading of each of the screens 910, 920, 930, 940, and 950 on the administrator setting screen 90 is displayed as information indicating the shift destination. In the example shown in FIG. 11, "select a job" as the first shift button B1, "printer" as the second shift button B2, "select a work" as the third shift button B3, "printed image" as the fourth shift button B4, and "job instruction/message" as the fifth shift button B5 are displayed. Further, when the shift buttons B1 to B5 are selected, it is preferable that the control section 611 controls the display forms of the selected shift buttons B1 to B5 to be different from the display forms of the other shift buttons B1 to B5 that are not selected such that the user can easily visually recognize them. In the example shown in FIG. 11, since "Select a job" is selected as the first shift button B1, the character information of the first shift button B1 is displayed thicker than that of the unselected shift buttons B2 to B5. Further, "1" as a number which is a part of the character information of the first shift button B1 is displayed in a color tone different from the numbers of the unselected shift buttons B2 to B5. The display form when the shift buttons B1 to B5 are selected is not limited to the present embodiment, and may be any notation that can be distinguished by the administrator as a user.

The setting save button 918 is a button for registering information related to the combination created on the administrator setting screen 90, that is, storing the information in the storage section 650. When the setting save button 918 is pressed, the control section 611 recognizes the data, character information, and the like selected on the administrator setting screen 90. Further, the control section 611 controls the storage section 650 to store the recognized group of information as a combination. In this case, a separate screen may be provided for the administrator to input the save destination of the created combination and the name of the created combination. This separate screen includes, for example, a text box for displaying the save destination of the data related to the created combination by an explorer and for the administrator to input the name of the created combination as character information.

As described above, the cancel button 866 on the administrator screen AS is a button for stopping the display of the screen currently displayed on the display section 601 and returning to the screen previously displayed. In the present embodiment, when the cancel button 866 located in the administrator screen AS is pressed, the control section 611 causes the display section 601 to display the screen previously displayed. That is, in a case where the first screen S1 is displayed on the display section 601 immediately before the administrator screen AS is displayed on the display section 601, the control section 611 causes the display section 601 to display the first screen S1 when the cancel button 866 is pressed. The administrator as a user can interrupt the operation on the administrator screen AS by pressing the cancel button 866.

After pressing the cancel button 866, the control section 611 may display a confirmation screen on the display section 601 for stopping the registration of the information related to the currently selected combination and confirming whether the information related to the currently selected combination may be deleted. In this way, even when the administrator accidentally presses the cancel button 866, the instruction to stop the setting and delete the currently selected combination on the administrator setting screen 90 can be canceled. Further, the control section 611 may perform control such that the combination deleted by pressing the cancel button 866 maintains the state stored in the storage section 650 for a predetermined period.

FIGS. 11 and 12 show an example in which formation candidates 721 to 724 are printed on the four forming surfaces 711 to 714 of the three-dimensional object W, but the present disclosure is not limited thereto. For example, when the other forming surface 715 different from the four forming surfaces 711 to 714 of the three-dimensional object W is provided, the other formation candidate selection screen (not shown) may be provided on the formation candidate selection screen 940.

Figure 13:
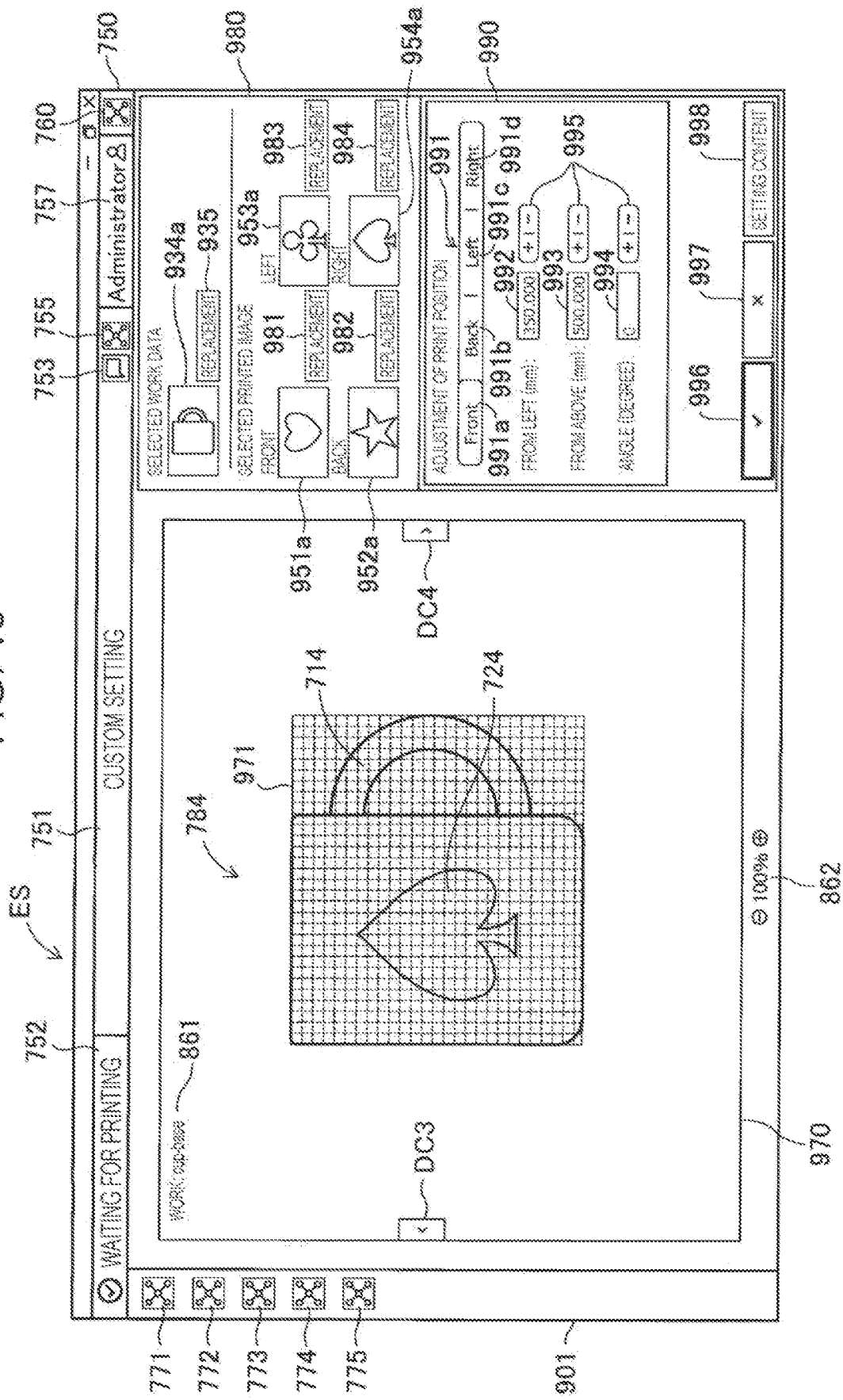
FIG. 13 is a diagram showing an example of an edit screen according to the embodiment of the present disclosure.

Subsequently, the edit screen ES will be described. FIG. 13 is a diagram showing an example of the edit screen ES according to the embodiment of the present disclosure. The edit screen ES is displayed on the display section 601 when the edit button 97 located on the administrator setting screen 90 is pressed. The edit screen ES is a screen for the administrator to edit at which position on the forming surfaces 711 to 714 of the three-dimensional object W images as the formation candidates 721 to 724 are printed with respect to the combination selected on the administrator setting screen 90.

The edit screen ES includes a status screen 750 displayed in the upper end area of the edit screen ES, an administrator menu screen 901 displayed in the left end area of the edit screen ES, a design display screen 970 displayed in the left area of the edit screen ES, a magnification change screen 862 displayed below the design display screen 970, and an editing operation screen 980 and an adjustment screen 990 displayed in the right area of the edit screen ES. The editing operation screen 980 and the adjustment screen 990 are displayed in a vertical row in this order. The display positions of the screens 750, 901, 970, 980, and 990 included in the edit screen ES are not limited to the above description. Since the function of the magnification change screen 862 on the edit screen ES is the same as the function of the magnification change screen 862 on the first screen S1 and the second screen S2, the description thereof will be omitted.

The status screen 750 on the edit screen ES includes a job name display screen 751, a device state display screen 752, a message confirmation button 753, a warning notification confirmation button 755, a user display screen 757, and a basic setting button 760. The function of the status screen 750 on the edit screen ES is the same as the function of the status screen 750 on the first screen S1 and the second screen S2.

The administrator menu screen 901 in the edit screen ES includes a first menu button 771, a second menu button 772, a third menu button 773, a fourth menu button 774, and a fifth menu button 775. The function of the status screen 750 on the edit screen ES is the same as the function of the administrator menu screen 901 on the administrator screen AS.

The design display screen 970 is a screen for the administrator as a user to determine at which position and angle on the forming surfaces 711 to 714 of the three-dimensional object W images as the formation candidates 721 to 724 are printed among the formation candidates 721 to 724 selected on the administrator setting screen 90. The outer shape of the design display screen 970 is defined by a rectangular area, and the design display screen 970 includes an arrangement display screen 971, a third display state change button DC3, a fourth display state change button DC4, and a work name 861 of the three-dimensional object W. The third display state change button DC3 is arranged at the left end of the design display screen 970 and at the center of the short side in the rectangular form. The fourth display state change button DC4 is arranged at the right end of the design display screen 970 and at the center of the short side in the rectangular form. The work name 861 of the three-dimensional object W is arranged in the upper area and the left end side of the design display screen 970. The arrangement display screen 971 is arranged at the center of the design display screen 970. The display positions of the third display state change button DC3, the fourth display state change button DC4, the work name 861 of the three-dimensional object W, and the arrangement display screen 971 are not limited to the above description.

The arrangement display screen 971 is a screen for adjusting the print positions and angles of the images as the formation candidates 721 to 724 when the administrator as a user determines at which position on the forming surfaces 711 to 714 of the three-dimensional object W images as the formation candidates 721 to 724 are printed. The outer shape of the arrangement display screen 971 is defined by a rectangular area, and is arranged in the center of the design display screen 970. On the arrangement display screen 971, preview images 781 to 784 in which the formation candidates 721 to 724 are projected onto the forming surfaces 711 to 714 of the three-dimensional object W are displayed. That is, the control section 611 generates preview images 781 to 784 in which images as the formation candidates 721 to 724 that are candidates for printing are combined with the images of the forming surfaces 711 to 714 of the three-dimensional object W, and displays the generated preview images on the display section 601, here, the arrangement display screen 971.

In the present embodiment, the aspect ratio of the sides forming the outer circumference of the arrangement display screen 971 is variable. That is, in the up-and-down direction of the forming surfaces 711 to 714 of the three-dimensional object W, the control section 611 determines the length of the sides in the up-and-down direction of the arrangement display screen 971 with an upper end of a portion having the longest length of the forming surfaces 711 to 714 of the three-dimensional object W as an upper end of the arrangement display screen 971, and with a lower end of a portion having the longest length of the forming surfaces 711 to 714 of the three-dimensional object W as a lower end of the arrangement display screen 971. Further, in the left-and-right direction of the forming surfaces 711 to 714 of the three-dimensional object W, the control section 611 determines the length of the sides in the left-and-right direction of the arrangement display screen 971 with a left end of a portion having the longest length of the forming surfaces 711 to 714 of the three-dimensional object W as a left end of the arrangement display screen 971, and with a right end of a portion having the longest length of the forming surfaces 711 to 714 of the three-dimensional object W as a right end of the arrangement display screen 971. In the example shown in FIG. 13, the upper end of the portion having the longest length in the up-and-down direction of the fourth forming surface 714 of the mug as the three-dimensional object W is displayed as the upper end of the arrangement display screen 971, and the lower end of the portion having the longest length in the up-and-down direction of the mug is displayed as the lower end of the arrangement display screen 971. Further, the left end of the portion having the longest length in the left-and-right direction of the fourth forming surface 714 of the mug as the three-dimensional object W is displayed as the left end of the arrangement display screen 971, and the right end of the portion having the longest length in the left-and-right direction of the mug is displayed as the right end of the arrangement display screen 971.

Further, in the background of the preview images 781 to 784 displayed on the arrangement display screen 971, grid-like lines are displayed in the entire area in the arrangement display screen 971 is covered so that the administrator as a user can easily adjust the positions and angles of the formation candidates 721 to 724.

The control section 611 performs control such that the print positions of the formation candidates 721 to 724 with respect to the forming surfaces 711 to 714 of the three-dimensional object W can be changed by clicking or dragging the formation candidates 721 to 724 displayed on the arrangement display screen 971, for example, with a mouse or the like. In this way, the administrator as a user can determine the print positions of the formation candidates 721 to 724 with respect to the forming surfaces 711 to 714 of the three-dimensional object W while visually recognizing the preview images 781 to 784. Further, the control section 611 may display a tool for rotating the angles of the formation candidates 721 to 724 by clicking the formation candidates 721 to 724 displayed on the arrangement display screen 971 with, for example, a mouse or the like. In this way, the administrator as a user can adjust the angles of the formation candidates 721 to 724 with respect to the forming surfaces 711 to 714 of the three-dimensional object W while visually recognizing the preview images 781 to 784. In addition to the functions described above, the arrangement display screen 971 may be controlled by the control section 611 such that the size and color tone of the formation candidates 721 to 724 to be formed on the forming surfaces 711 to 714 of the three-dimensional object W can be adjusted.

The third display state change button DC3 and the fourth display state change button DC4 are buttons for displaying the preview images 781 to 784 displayed on the arrangement display screen 971 in a switchable manner by shifting the preview images 781 to 784 displayed on the arrangement display screen 971 to the left or right.

The third display state change button DC3 shifts the preview images 781 to 784 currently displayed on the arrangement display screen 971 to the left, and switches to preview images 781 to 784 corresponding to the forming surfaces 711 to 714 of the three-dimensional object W, which is one before the order. The fourth display state change button DC4 shifts the preview images 781 to 784 currently displayed on the arrangement display screen 971 to the right, and switches to preview images 781 to 784 corresponding to the forming surfaces 711 to 714 of the three-dimensional object W, which is one after the order. In the order of the preview images 781 to 784 displayed on the arrangement display screen 971, on the formation candidate selection screen 940, the surface of the three-dimensional object W as the first forming surface 711 is the first, the surface of the three-dimensional object W as the second forming surface 712 is the second, the surface of the three-dimensional object W as the third forming surface 713 is the third, and the surface of the three-dimensional object W as the fourth forming surface 714 is the fourth. In the present embodiment, the front surface of the three-dimensional object W as the first forming surface 711 is the first, the back surface of the three-dimensional object W as the second forming surface 712 is the second, the left surface of the three-dimensional object W as the third forming surface 713 is the third, and the right surface of the three-dimensional object W as the fourth forming surface 714 is the fourth. The order from the first to the fourth is a loop shape, the one before the first is the fourth, and the one after the fourth is the first.

It is assumed that the first preview image 781 corresponding to the first forming surface 711 of the three-dimensional object W as the first is displayed on the arrangement display screen 971. Here, when the third display state change button DC3 is pressed while the first preview image 781 corresponding to the first forming surface 711 of the three-dimensional object W is displayed on the arrangement display screen 971, the control section 611 causes the arrangement display screen 971 to display the fourth preview image 784 corresponding to the fourth forming surface 714 of the three-dimensional object W as the fourth, which is one before the order, on the first forming surface 711 of the three-dimensional object W as the first. Further, when the fourth display state change button DC4 is pressed while the first preview image 781 corresponding to the first forming surface 711 is displayed on the arrangement display screen 971, the control section 611 causes the arrangement display screen 971 to display the second preview image 782 corresponding to the second forming surface 712 of the three-dimensional object W as the second, which is one after the order, on the first forming surface 711 of the three-dimensional object W as the first. When the display section 601 has a touch panel function, it may be possible to switch the preview images 781 to 784 displayed on the arrangement display screen 971 by an operation of sliding the finger of the administrator as a user to the left or right, that is, a so-called swipe, on the design display screen 970.

In this way, the administrator as a user can switch the preview images 781 to 784 to be displayed on the arrangement display screen 971 while visually recognizing the preview images 781 to 784 one by one on the arrangement display screen 971.

As the work name 861 of the three-dimensional object W on the edit screen ES, the work name 861 of the three-dimensional object W selected on the work selection screen 930 located on the administrator setting screen 90 is displayed.

Next, the editing operation screen 980 will be described. The outer shape of the editing operation screen 980 is defined by a rectangular area. The editing operation screen 980 includes a work area including a second work thumbnail screen 934a and a work change button 935, and an image area including a first thumbnail screen 951a for editing, a first formation candidate selection button 981, a second thumbnail screen 952a for editing, and a second formation candidate selection button 982. Further, the editing operation screen 980 includes an image area including a third thumbnail screen 953a for editing, a third formation candidate selection button 983, a fourth thumbnail screen 954a for editing, and a fourth formation candidate selection button 984.

The work area is an area for displaying a part of information about the three-dimensional object W selected on the work selection screen 930 located on the administrator setting screen 90. In the example shown in FIG. 13, "selected work data" is displayed as a heading of the work area.

The second work thumbnail screen 934a located in the work area is a screen for making a thumbnail displayed by reducing an image of the three-dimensional object W selected by the administrator on the work selection screen 930 located in the administrator setting screen 90 and an image of another three-dimensional object newly selected by the work change button 935, which will be described later, visible to the administrator as a user. That is, the control section 611 performs control such that the first work thumbnail screen 934 and the second work thumbnail screen 934a are linked to each other. The outer shape of the second work thumbnail screen 934a is defined by a rectangular area, and is provided in the left area of the work area.

In the present embodiment, in the initial state, the image of the three-dimensional object W is displayed on the second work thumbnail screen 934a based on the data related to the three-dimensional object W selected by the administrator as a user on the work selection screen 930 located on the administrator setting screen 90.

The work change button 935 located in the work area is a button for changing the three-dimensional object W selected by the administrator as a user on the work selection screen 930 to another three-dimensional object different from the three-dimensional object W selected by the administrator as a user on the work selection screen 930. When the work change button 935 is pressed, for example, a separate screen for newly selecting data related to another three-dimensional object is displayed. On the separate screen accompanying the activation of the work change button 935, a means for selecting data related to another three-dimensional object different from the currently selected three-dimensional object W is displayed. For example, the separate screen has a function for displaying the save destinations of a plurality of pieces of three-dimensional object data as candidates for the three-dimensional object W registered in advance in the storage section 650 by the administrator as a user by an explorer.

When data related to another three-dimensional object is newly selected by the work change button 935, the control section 611 recognizes the newly selected data as another three-dimensional object, and transmits changes and contents of the three-dimensional object W to be printed to the generation section 631. The generation section 631 generates image data of the respective forming surfaces 711 to 714 of the three-dimensional object W when another three-dimensional object to be displayed on the second work thumbnail screen 934a and the arrangement display screen 971 is viewed in a plurality of directions, in accordance with the input instruction, here, the change request for changing the print target from the three-dimensional object W to the other three-dimensional object. Further, the control section 611 displays the image data generated by the generation section 631 on the display section 601, here, on the second work thumbnail screen 934a and also on the arrangement display screen 971.

The image area is an area for displaying a part of information about the formation candidates 721 to 724 selected on the formation candidate selection screens 941 to 944 located on the administrator setting screen 90. In the example shown in FIG. 13, "selected printed image" is displayed as the heading of the image area.

Subsequently, the image area on the editing operation screen 980 will be described. In the image area, the following display is made as headings of the forming surfaces 711 to 714 of the three-dimensional object W so that the administrator as a user can easily visually recognize which of the forming surfaces 711 to 714 of the three-dimensional object W is the information. In the example shown in FIG. 13, the heading of the first forming surface 711 of the three-dimensional object W is displayed as "front", the heading of the second forming surface 712 of the three-dimensional object W is displayed as "back", the heading of the third forming surface 713 of the three-dimensional object W is displayed as "left", the heading of the fourth forming surface 714 of the three-dimensional object W is displayed as "right".

The outer shapes of the thumbnail screens 951a to 954a for editing are defined by rectangular areas, and are provided in the left area of the work area. The first thumbnail screen 951a for editing is arranged in the lower area of the notation "front" as the heading of the first forming surface 711 of the three-dimensional object W, and the first formation candidate selection button 981 is arranged adjacent to the right area of the first thumbnail screen 951a for editing. The second thumbnail screen 952a for editing is arranged in the lower area of the notation "back" as the heading of the second forming surface 712 of the three-dimensional object W, and the second formation candidate selection button 982 is arranged adjacent to the right area of the second thumbnail screen 952a for editing. The third thumbnail screen 953a for editing is arranged in the lower area of the notation "left" as the heading of the third forming surface 713 of the three-dimensional object W, and the third formation candidate selection button 983 is arranged adjacent to the right area of the third thumbnail screen 953a for editing. The fourth thumbnail screen 954a for editing is arranged in the lower area of the notation "right" as the heading of the fourth forming surface 714 of the three-dimensional object W, and the fourth formation candidate selection button 984 is arranged adjacent to the right area of the fourth thumbnail screen 954a for editing.

The thumbnail screens 951a to 954a for editing located in the image area are screens for making thumbnails displayed by reducing images of the formation candidates 721 to 724 selected by the administrator as a user on the formation candidate selection screens 941 to 944 and images of other formation candidates newly selected by the formation candidate selection buttons 981 to 984, which will be described later, visible to the administrator as a user. That is, the control section 611 performs control such that the first thumbnail screen 951 for an administrator, the second thumbnail screen 952 for an administrator, the third thumbnail screen for an administrator (not shown), and the fourth thumbnail screen for an administrator (not shown) are linked to the first thumbnail screen 951a for editing, the second thumbnail screen 952a for editing, the third thumbnail screen 953a for editing, and the fourth thumbnail screen 954a for editing, respectively.

In the present embodiment, in the initial state, the images of the formation candidates 721 to 724 are displayed on the thumbnail screens 951a to 954a for editing based on the data related to the formation candidates 721 to 724 selected by the administrator as a user on the formation candidate selection screens 941 to 944 located on the administrator setting screen 90.

The first formation candidate selection button 981 is a button for changing to another formation candidate different from the first formation candidate 721 selected by the administrator on the first formation candidate selection screen 941. Similarly, the second formation candidate selection button 982 is a button for changing to another formation candidate different from the second formation candidate 722 selected by the administrator on the second formation candidate selection screen 942. Further, the third formation candidate selection button 983 is a button for changing to another formation candidate different from the third formation candidate 723 selected by the administrator on the third formation candidate selection screen 943. Further, the fourth formation candidate selection button 984 is a button for changing to another formation candidate different from the fourth formation candidate 724 selected by the administrator on the fourth formation candidate selection screen 944.

The processing flow executed by the control section 611 when an instruction from the administrator as a user is received by the formation candidate selection buttons 981 to 984 via the display section 601 will be described by taking the first formation candidate selection button 981 as an example. The processing flows of the second formation candidate selection button 982 to the fourth formation candidate selection button 984 are the same as that of the first formation candidate selection button 981.

When the first formation candidate selection button 981 is pressed, for example, a separate screen for newly selecting the data related to the first formation candidate 721 is displayed. On the separate screen accompanying the activation of the first formation candidate selection button 981, a means for selecting data related to another formation candidate different from the currently selected first formation candidate 721 is displayed. For example, the separate screen has a function for displaying the save destinations of a plurality of pieces of image data as formation candidates registered in advance in the storage section 650 by the administrator as a user by an explorer.

When data related to another formation candidate is newly selected by the first formation candidate selection button 981, the control section 611 recognizes the newly selected data as another formation candidate, and transmits changes and contents of the first formation candidate 721 to the generation section 631. The generation section 631 generates image data for forming an image by ejecting ink to the three-dimensional object W in accordance with the input instruction, here, the change request of the first formation candidate 721. The control section 611 displays the image data generated by the generation section 631 on the display section 601, here, on the first thumbnail screen 951*a* for editing and also on the arrangement display screen 971.

The adjustment screen 990 will be described below. The outer shape of the adjustment screen 990 is defined by a rectangular area. The adjustment screen 990 includes a forming surface switching screen 991, a first print position input field 992, a second print position input field 993, an angle input field 994, three numerical value increase/decrease buttons 995, an edit save button 996, an edit cancel button 997, and a setting content confirmation button 998. The forming surface switching screen 991 is displayed in the upper end area of the adjustment screen 990. The first print position input field 992, the second print position input field 993, and the angle input field 994 are displayed in a vertical row in this order in the lower area of the forming surface switching screen 991. The three numerical value increase/decrease buttons 995 are arranged one by one in the right area of the first print position input field 992, the second print position input field 993, and the angle input field 994. The edit save button 996, the edit cancel button 997, and the setting content confirmation button 998 are displayed in this order in the lower end area of the adjustment screen 990 side by side in a horizontal row from the left end side of the adjustment screen 990. Further, in the example shown in FIG. 13, "adjustment of print position" is displayed as a heading of the adjustment screen 990.

The forming surface switching screen 991 is a button for switching the preview images 781 to 784 currently displayed on the arrangement display screen 971. The forming surface switching screen 991 includes four buttons for displaying the preview images 781 to 784 corresponding to the forming surfaces 711 to 714 of the three-dimensional object W on the arrangement display screen 971. The four buttons are a first forming surface switching button 991*a*, a second forming surface switching button 991*b*, a third forming surface switching button 991*c*, and a fourth forming surface switching button 991*d*. The first forming surface switching button 991*a* displays the first preview image 781 on the arrangement display screen 971. The second forming surface switching button 991*b* displays the second preview image 782 on the arrangement display screen 971. The third forming surface switching button 991*c* displays the third preview image 783 on the arrangement display screen 971. The fourth forming surface switching button 991*d* displays the fourth preview image 784 on the arrangement display screen 971.

The processing flow executed by the control section 611 when an instruction from the administrator as a user is received by the forming surface switching buttons 991*a* to 991*d* via the display section 601 will be described by taking the first forming surface switching button 991*a* as an example. The processing flows of the second forming surface switching button 991*b* to the fourth forming surface switching button 991*d* are the same as that of the first forming surface switching button 991*a*.

When the first forming surface switching button 991*a* is pressed, the control section 611 recognizes that it has received the instruction to display the first preview image 781 on the first forming surface 711, and displays the first preview image 781 on the arrangement display screen 971.

Here, when switching the preview images 781 to 784 displayed on the arrangement display screen 971, the difference between the case where at least one of the third display state change button DC3 and the fourth display state change button DC4 described above is used and the case where the forming surface switching screen 991 is used will be described. The case where the preview images 781 to 784 displayed on the arrangement display screen 971 are changed from the first preview image 781 to the third preview image 783 is shown below. In this case, when switching the preview images 781 to 784 displayed on the arrangement display screen 971 by pressing at least one of the third display state change button DC3 and the fourth display state change button DC4, there are a method of pressing the third display state change button DC3 twice and a method of pressing the fourth display state change button DC4 twice. That is, when at least one of the third display state change button DC3 and the fourth display state change button DC4 is used, the number of preview images 781 to 784 that is switched when the display state change buttons DC3 and DC4 are pressed once is one, and thus it is necessary to press the display state change buttons DC3 and DC4 until the target preview images 781 to 784 are displayed.

On the other hand, when the first preview image 781 displayed on the arrangement display screen 971 is switched to the third preview image 783 by pressing the forming surface switching buttons 991*a* to 991*d* on the forming surface switching screen 991, the third forming surface switching button 991*c* may be pressed once. In this way, the administrator as a user can switch the preview images 781 to 784 to be displayed on the arrangement display screen 971 by pressing the forming surface switching buttons 991*a* to 991*d* once on the forming surface switching screen 991, and thus the convenience of the administrator as a user is improved.

It is preferable to provide both the display state change buttons DC3 and DC4 and the forming surface switching screen 991 as a means for switching the preview images 781 to 784 displayed on the arrangement display screen 971. In this way, the administrator as a user can select and operate any method from the two methods. The administrator as a user can execute a method of switching the preview images 781 to 784 to be displayed on the arrangement display screen 971 while visually recognizing the preview images 781 to 784 one by one on the arrangement display screen 971. Further, the administrator as a user can execute a method of switching the preview images 781 to 784 to be displayed on the arrangement display screen 971 by pressing the forming surface switching buttons 991*a* to 991*d* once on the forming surface switching screen 991. Thereby, the convenience of the administrator as a user is further improved.

The first print position input field 992 is a screen for designating the print positions of the formation candidates 721 to 724 on the forming surfaces 711 to 714 of the three-dimensional object W by inputting the distance from the left end of the arrangement display screen 971. The first print position input field 992 is, for example, an input field for inputting the distance from the left end of the arrangement display screen 971 in numbers.

The second print position input field 993 is a screen for designating the print positions of the formation candidates 721 to 724 on the forming surfaces 711 to 714 of the three-dimensional object W by inputting the distance from the upper end of the arrangement display screen 971. The second print position input field 993 is, for example, an input field for inputting the distance from the upper end of the arrangement display screen 971 in numbers.

The processing executed by the control section 611 when an instruction from the administrator as a user is received in the first print position input field 992 via the display section 601 can be realized by, for example, the following control.

When designating the print positions of the formation candidates 721 to 724 on the forming surfaces 711 to 714 of the three-dimensional object W, the administrator as a user inputs numbers in the first print position input field 992 and the second print position input field 993 displayed on the display section 601. When numbers are input to the first print position input field 992 and the second print position input field 993, the control section 611 recognizes that it has received a position designation instruction from the administrator as a user that the print positions of the formation candidates 721 to 724 on the forming surfaces 711 to 714 of the three-dimensional object W have been designated via the reception section 621. In this case, the control section 611 recognizes any one point in the image as the currently selected formation candidates 721 to 724, for example, the center of gravity of the image as the formation candidates 721 to 724, and determines the print position based on the center of gravity. Subsequently, the control section 611 transmits a position designation instruction to the forming surfaces 711 to 714 of the three-dimensional object W to the generation section 631. The generation section 631 generates image data related to the preview images 781 to 784 in which images as the formation candidates 721 to 724 that are candidates for printing are combined at designated positions on the forming surfaces 711 to 714 of the three-dimensional object W in accordance with the input instruction, here, the position designation instruction. The control section 611 displays the image data generated by the generation section 631 as preview images 781 to 784 on the display section 601, here, the arrangement display screen 971.

In addition, the control section 611 may perform control such that predetermined numbers are input to the first print position input field 992 and the second print position input field 993 as an initial state. For example, the control section 611 recognizes the three-dimensional object data related to the forming surfaces 711 to 714 of the three-dimensional object W and the data related to the formation candidates 721 to 724. Further, the control section 611 may recognize the center of gravity of the forming surfaces 711 to 714 of the three-dimensional object W and the center of gravity of the formation candidates 721 to 724 corresponding to the forming surfaces 711 to 714 of the three-dimensional object W based on the recognized data, and perform control such that the centers of gravity of both are aligned.

The angle input field 994 is an input field for inputting the angle of the image as the formation candidates 721 to 724 to be printed on the forming surfaces 711 to 714 of the three-dimensional object W. For example, when the administrator as a user stores the formation candidates 721 to 724 in the storage section 650, the standard state is registered, and the angle input field 994 is an input field for inputting the rotation angle from the standard state in numbers.

The processing executed by the control section 611 when an instruction from the administrator is received in the angle input field 994 via the display section 601 can be realized by, for example, the following control.

When designating the rotation angle from the standard state in the images as the formation candidates 721 to 724 on the forming surfaces 711 to 714 of the three-dimensional object W, the administrator as a user inputs numbers in the angle input field 994 displayed on the display section 601. When numbers are input to the angle input field 994, the control section 611 recognizes that it has received an angle designation instruction from the administrator as a user that the rotation angles of the formation candidates 721 to 724 on the forming surfaces 711 to 714 of the three-dimensional object W have been designated via the reception section 621. In this case, the control section 611 recognizes any one point in the image as the currently selected formation candidates 721 to 724, for example, the center of gravity of the image as the formation candidates 721 to 724, and determines the rotation angle based on the center of gravity. Subsequently, the control section 611 transmits an angle designation instruction to the forming surfaces 711 to 714 of the three-dimensional object W to the generation section 631. The generation section 631 generates image data related to the preview images 781 to 784 in which images as the formation candidates 721 to 724 that are candidates for printing are combined at designated angles on the forming surfaces 711 to 714 of the three-dimensional object W in accordance with the input instruction, here, the angle designation instruction. The control section 611 displays the image data generated by the generation section 631 as preview images 781 to 784 on the display section 601, here, the arrangement display screen 971.

In addition, the control section 611 may perform control such that predetermined numbers are input to the angle input field 994 as an initial state. For example, the control section 611 may set the rotation angle of the formation candidates 721 to 724 as a standard state to 0 degrees, and perform control such that the inclination when rotated clockwise becomes the rotation angle of the formation candidates 721 to 724. That is, when "30" is input in the angle input field 994, the control section 611 recognizes a state in which the formation candidates 721 to 724 are inclined 30 degrees clockwise from the standard state as an angle designation instruction.

In the example shown in FIG. 13, "350.000" is input as the distance from the left end of the arrangement display screen 971 in the first print position input field 992. That is, the image of the spade, which is the fourth formation candidate 724, is formed at a position of 350.000 mm from the left end of the arrangement display screen 971. Further, in the second print position input field 993, "500.000" is input as the distance from the upper end of the arrangement display screen 971. That is, the image of the spade, which is the fourth formation candidate 724, is formed at a position of 500.000 mm from the upper end of the arrangement display screen 971. Further, in the angle input field 994, "0" is input as the rotation angle of the fourth formation candidate 724 with respect to the standard state, that is, the image of the spade, which is the fourth formation candidate 724, is formed on the fourth forming surface 714 of the three-dimensional object W at the same angle as the standard state without being rotated with respect to the standard state.

The numerical value increase/decrease button 995 is a button for increasing or decreasing a number as a numerical value input in the first print position input field 992, the second print position input field 993, and the angle input field 994. The numerical value increase/decrease button 995 includes an increase button for increasing a number as a numerical value input in the first print position input field 992, the second print position input field 993, and the angle input field 994, and a decrease button for decreasing a number as a numerical value input in the first print position input field 992, the second print position input field 993, and the angle input field 994. In the example shown in FIG. 13, the "+ button" provided in the right area of the first print position input field 992, the second print position input field 993, and the angle input field 994 is the increase button, and the "− button" arranged adjacent to the right side of the increase button is the decrease button. The administrator can increase the number as the numerical value input in the corresponding input fields 992, 993, and 994 by pressing the increase button. In addition, the administrator can reduce the number as the numerical value input in the corresponding input fields 992, 993, and 994 by pressing the decrease button.

In this way, when designating the print positions and angles of the formation candidates 721 to 724 to be formed on the forming surfaces 711 to 714 of the three-dimensional object W, the administrator as a user can select and operate any method from the following two methods. As the two methods, there are a method of changing a numerical value from a predetermined numerical value as an initial state by using the numerical value increase/decrease button 995 while visually recognizing the arrangement display screen 971, and a method of directly inputting a number as a numerical value in the respective input fields 992, 993, and 994. Thereby, the convenience of the administrator as a user is improved.

The edit save button 996 is a button for registering the information set on the edit screen ES, that is, storing the information in the storage section 650. When the edit save button 996 is pressed, the control section 611 recognizes the data selected on the edit screen ES, the print position information, and the like. Further, the control section 611 associates the recognized group of information with the information related to the combination created on the administrator setting screen 90 and controls the storage section 650 to store it. When the registration of the information set in the edit screen ES in the storage section 650 is completed, the control section 611 switches the screen displayed on the display section 601 from the edit screen ES to the administrator screen AS.

The edit cancel button 997 is a button for stopping the display of the edit screen ES currently displayed on the display section 601 and returning to the administrator screen AS. In the present embodiment, when the edit cancel button 997 is pressed, the control section 611 redisplays the administrator screen AS without storing the information set in the edit screen ES in the storage section 650. After pressing the edit cancel button 997, the control section 611 may display a confirmation screen on the display section 601 for confirming whether or not the information set on the edit screen ES does not need to be registered. In this way, even when the administrator accidentally presses the edit cancel button 997, the instruction to stop the setting on the edit screen ES can be canceled.

The setting content confirmation button 998 is a button for displaying a screen different from the edit screen ES displayed on the display section 601 on the display section 601 at the same time as the edit screen ES. When the setting content confirmation button 998 is pressed, the control section 611 displays, for example, a separate screen for making a part of the content of the administrator setting screen 90 visible to the administrator by a dialog box.

FIG. 13 shows an example in which formation candidates 721 to 724 are printed on the four forming surfaces 711 to 714 of the three-dimensional object W, but the present disclosure is not limited thereto. For example, when the other forming surface 715 different from the four forming surfaces 711 to 714 of the three-dimensional object W is provided, the image area and the forming surface switching screen 991 located on the editing operation screen 980 may be provided with a screen corresponding to the other forming surface 715.

According to the image processing device 60 described above, in the data setting when forming the formation on the three-dimensional object W, the setting related to the combination can be completed on one screen, that is, the administrator screen AS. Therefore, the administrator as a user can easily set the data when forming the formation on the three-dimensional object W. That is, the convenience of the administrator as a user is improved.

Further, according to the image processing device 60, in the data setting when forming the formation on the three-dimensional object W, a screen for performing detailed settings, for example, print positions and angles of the formation candidates 721 to 724 to be printed on the forming surfaces 711 to 714 of the three-dimensional object W, is displayed as necessary. Therefore, the administrator as a user can select and register the setting contents as necessary when making the settings related to the combination. That is, the convenience of the administrator as a user is further improved.

B-1. Other Embodiment 1

In the above embodiment, on the first individual preview screen 701 shown in FIG. 3 and the second individual preview screen 702 shown in FIG. 10, the preview images 781 to 785 in which formation candidates 721 to 725 are projected onto the forming surfaces 711 to 715 of the three-dimensional object W are displayed. In another embodiment, at least the formation candidates 721 to 725 may be visible to the user on the first individual preview screen 701 and the second individual preview screen 702. For example, only the image of the heart, which is the first formation candidate 721, may be displayed on the first preview screen 71 as the first individual preview screen 701 in the first screen S1. Even in such an embodiment, when a formation is formed on the three-dimensional object W which is a three-dimensionally formed object, images of formation candidates 721 to 724 to be formed viewed in a plurality of directions can be displayed. Therefore, the user can easily confirm the formations formed on the plurality of forming surfaces 711 to 715 of the three-dimensional object W. That is, the user can confirm whether or not the desired formation is formed on each of the forming surfaces 711 to 715 of the three-dimensional object W before printing is started.

Further, in the above embodiment, the three-dimensional object forming device 100 that forms an image as a formation on the three-dimensional object W by printing is exemplified. On the other hand, the three-dimensional object forming device 100 constituting the three-dimensional object forming system 10 in the present disclosure may be a three-dimensional object forming device 100 for forming a three-dimensional object such as a three-dimensional modeling device. For example, when the three-dimensional object forming device 100 is a three-dimensional modeling device, the preview may be displayed as an image of the formation formed by the three-dimensional modeling device as viewed in a plurality of directions. Even in such an embodiment, when forming the three-dimensional object W which is a three-dimensionally formed object, images of formation candidates 721 to 725 to be formed viewed in a plurality of directions can be displayed. Therefore, the user can easily confirm the formations formed on the plurality of forming surfaces 711 to 715 of the three-dimensional object W. That is, the user can confirm whether or not the desired formation is formed on each of the forming surfaces 711 to 715 of the three-dimensional object W before printing is started.

B-2. Other Embodiment 2

The control section 611 may cause the display section 601 to display either one of the first screen S1 and the second screen S2 for a plurality of combinations at the same time. For example, one of the first screen S1 and the second screen S2 in the first combination as a combination and one of the first screen S1 and the second screen S2 in the second combination as a combination are displayed in separate windows. In such an embodiment, the preview screen 70 in a plurality of combinations can be visually recognized at the same time. Therefore, the user can compare and consider which combination to select from the plurality of combinations, and the convenience of the user is further improved.

B-3. Other Embodiment 3

The control section 611 may cause the display section 601 to display the preview images 781 to 785 reflecting the color and shape of the three-dimensional object W with respect to the preview images 781 to 785 displayed on the preview screen 70. In such an embodiment, since the display is in line with the actual three-dimensional object W, it is possible to provide preview images 781 to 785 that make it easier to image the state after formation, and the convenience of the user is further improved.

B-4. Other Embodiment 4

The control section 611 may further cause the display section 601 to display the forming surface setting screen for the user to set any portion with respect to the three-dimensional object W as the forming surfaces 711 to 715, as the administrator screen AS. In such an embodiment, the preview images 781 to 785 can be displayed with the forming surfaces 711 to 715 at locations other than the front surface, the back surface, the left surface, the right surface, and the bottom surface, and the convenience of the user is further improved.

The present disclosure is not limited to the above-described embodiments, and can be realized in various forms without departing from the spirit thereof. For example, the present disclosure can also be realized in the following aspects. The technical features in the above embodiments corresponding to the technical features in each of aspects described below can be replaced or combined as appropriate in order to solve some or all of the problems of the present disclosure or to achieve some or all of the effects of the present disclosure. Further, if the technical feature is not described as essential in the present specification, it can be appropriately deleted.

1. According to a first aspect of the present disclosure, there is provided an image processing device. This image processing device is used to form a three-dimensional object, the image processing device includes a control section that causes a display section to display a first screen for a user to give an instruction, and a reception section that receives the instruction from the user via the display section, the first screen includes a preview screen that makes formation candidates to be formed on the three-dimensional object visible to the user, and the preview screen includes i. a first preview screen that makes a first formation candidate, which is the formation candidate to be formed on a first forming surface of the three-dimensional object, visible to the user, ii. a second preview screen that makes a second formation candidate, which is the formation candidate to be formed on a second forming surface different from the first forming surface of the three-dimensional object, visible to the user, and iii. a third preview screen that makes a third formation candidate, which is the formation candidate to be formed on a third forming surface different from the first forming surface and the second forming surface of the three-dimensional object, visible to the user. According to the aspect, when a formation is formed on a three-dimensional object which is a three-dimensionally formed object, images of formation candidates to be formed viewed in a plurality of directions are displayed. Therefore, the user can easily confirm the formation formed on the plurality of forming surfaces. Accordingly, the user can confirm whether or not the desired formation is formed on each forming surface of the three-dimensional object before the formation is started. Further, the image processing device displays the formation candidates for each forming surface of the three-dimensional object. Accordingly, the formation candidate as a preview image of the three-dimensional object can be visually recognized without requiring the user to perform an operation such as rotation.

2. In the above aspect, the first preview screen may further include a first individual determination screen for the user to determine whether or not to form the first formation candidate displayed on the first preview screen on the first forming surface. According to the aspect, the first screen includes a first individual determination screen for individually setting the first forming surface of the three-dimensional object. Accordingly, when a setting is changed for a part of the first forming surface of the three-dimensional object, the user can change the setting individually.

3. In the above aspect, the first screen may further include an operation screen, the operation screen may include a first operation screen corresponding to the first preview screen, and the first operation screen may include a first individual selection screen for the user to individually select the first formation candidate. According to the aspect, the first screen includes a first individual selection screen for individually setting the first forming surface of the three-dimensional object. Accordingly, when a setting is changed for a part of the first forming surface of the three-dimensional object, the user can change the setting individually.

4. In the above aspect, the first operation screen may include a determination screen for the user to determine whether or not to form the first formation candidate displayed on the first preview screen on the first forming surface. According to the aspect, the first screen includes a determination screen for individually setting the first forming surface of the three-dimensional object. Accordingly, when a setting is changed for a part of the first forming surface of the three-dimensional object, the user can change the setting individually.

5. In the above aspect, the image processing device may further perform control such that a determination of the user for the first individual determination screen via the reception section and a determination of the user for the determination screen via the reception section are linked to each other. According to the aspect, the user may operate either the first individual determination screen or the determination screen when individually setting the first forming surface of the three-dimensional object. Thereby, the convenience of the user is improved.

6. In the above aspect, the first operation screen in the image processing device may include a thumbnail screen that makes a thumbnail of the first formation candidate visible to the user. According to the aspect, the first operation screen includes a thumbnail screen as a thumbnail of the first formation candidate. Accordingly, the user can easily visually recognize the entire image of the first formation candidate on the first operation screen.

7. In the above aspect, the first preview screen may make the first formation candidate visible together with the three-dimensional object, and the thumbnail screen may not make the three-dimensional object visible, and make the first formation candidate visible. According to the aspect, the first preview screen includes a preview image obtained by combining the image of the first formation candidate with the image of the first forming surface of the three-dimensional object, and the thumbnail screen includes only the image of the first formation candidate. Accordingly, the user can confirm whether or not the desired formation is formed on the first forming surface of the three-dimensional object before the formation is started.

8. In the above aspect, the second preview screen may include a second individual determination screen for the user to determine whether or not to form the second formation candidate displayed on the second preview screen on the second forming surface, and the third preview screen may include a third individual determination screen for the user to determine whether or not to form the third formation candidate displayed on the third preview screen on the third forming surface. According to the aspect, the first screen includes an individual determination screen for individually setting each forming surface of the three-dimensional object. Accordingly, when a setting is changed for a part of each forming surface of the three-dimensional object, the user can change the setting individually.

9. In the above aspect, the first screen may include a combination selection screen for the user to select a combination of the first formation candidate, the second formation candidate, and the third formation candidate. According to the aspect, the combination is a group of information associating each forming surface of the three-dimensional object with a formation formed on each forming surface, and the user can set the formations formed on each forming surface of the three-dimensional object at once by selecting any combination displayed on the combination selection screen. Accordingly, since the user can set the formation to be formed by using the combination, for images whose setting contents are infrequently changed, it is not necessary to reset the setting every time printing is performed on each forming surface of the three-dimensional object. That is, the convenience of the user is improved.

10. In the above aspect, the control section may cause the display section to display the first screen and a second screen in a switchable manner, the second screen may include another preview screen that makes another formation candidate, which is the formation candidate to be formed on another forming surface different from the first forming surface, the second forming surface, and the third forming surface of the three-dimensional object, visible to the user, and the first screen may not include the other preview screen. According to the aspect, even when the forming surface of the three-dimensional object is four or more, images of formation candidates to be formed viewed in a plurality of directions are displayed. Therefore, the user can grasp the state after formation from various surfaces. Accordingly, the user can confirm whether or not the desired formation is formed on each forming surface of the three-dimensional object before the formation is started.

11. In the above aspect, the second screen may further include the first preview screen, the second preview screen, and the third preview screen. According to the aspect, the user can visually recognize the first preview screen including the preview image on the first forming surface of the three-dimensional object, the second preview screen including the preview image on the second forming surface of the three-dimensional object, the third preview screen including the preview image on the third forming surface of the three-dimensional object, and another preview screen including the preview image on another forming surface of the three-dimensional object in one screen.

12. In the above aspect, the preview screen of the first screen may include M number of first individual preview screens, M being an integer of three or more, the second screen may include N number of second individual preview screens, N being an integer greater than M, the M number of first individual preview screens may include the first preview screen, the second preview screen, and the third preview screen as the first individual preview screen, and the N number of second individual preview screens may include the first preview screen, the second preview screen, the third preview screen, and the other preview screen as the second individual preview screen. According to the aspect, the number of individual preview screens displayed on the display section is larger in the second screen than in the first screen. Accordingly, the user can visually recognize the individual preview screen for the forming surface of more three-dimensional objects in the second screen as compared with the first screen.

13. In the above aspect, the second screen may not include the first individual determination screen for the user to determine whether or not to form the first formation candidate displayed on the first preview screen on the first forming surface, the first individual determination screen being located on the first preview screen. According to the aspect, in an image processing device used to form a three-dimensional object, when displaying a preview image, the user can easily confirm the formation formed on a plurality of surfaces of the three-dimensional object.

14. In the above aspect, the second screen may not include the operation screen. According to the aspect, the preview screen on the second screen has a larger area for displaying the preview than the preview screen on the first screen. Therefore, the user can visually recognize more second individual preview screens than the first individual preview screen on the first screen. Accordingly, in the image processing device used to form the three-dimensional object, when displaying a preview image, the user can easily confirm the formation formed on the plurality of surfaces of the three-dimensional object.

15. In the above aspect, when the user gives a non-formation instruction not to form the formation candidate on the first individual determination screen via the reception section, the first screen may not display the formation candidate for which the non-formation instruction is given on the preview screen. According to the aspect, the number of the first individual preview screens displayed in the preview screen of the first screen is reduced, and the hidden area becomes a free area. Accordingly, the user can display another first individual preview screen in the free area, or enlarge the currently displayed first individual preview screen.

16. In the above aspect, the control section may be able to enlarge a size of the formation candidate displayed on the preview screen as compared with a first case in a second case where the number of the formation candidates displayed on the preview screen is smaller than that of the first case. According to the aspect, the free area of the preview screen in the second case is large by the difference between the number of first individual preview screens displayed in the preview screen in the second case and the number of first individual preview screens displayed in the preview screen in the first case. Accordingly, the user can enlarge the size of the formation candidate displayed on the preview screen in the free area as compared with the first case.

17. In the above aspect, the image processing device may further include a generation section that ejects a liquid to the three-dimensional object to generate image data for forming an image as the formation candidate. According to the aspect, also when ejecting a liquid to a three-dimensional object to form an image as the formation candidate, the user can easily confirm the formation formed on a plurality of surfaces of the three-dimensional object.

18. According to a second aspect of the present disclosure, there is provided a three-dimensional object forming device. This three-dimensional object forming device includes an ejection head that ejects a liquid, and the image processing device according to any one of the above aspects. According to the aspect, when a formation is formed on a three-dimensional object which is a three-dimensionally formed object, images of formation candidates to be formed viewed in a plurality of directions are displayed. Therefore, the user can easily confirm the formation formed on the plurality of forming surfaces. Accordingly, the user can confirm whether or not the desired formation is formed on each forming surface of the three-dimensional object before the formation is started. Further, the image processing device displays the formation candidates for each forming surface of the three-dimensional object. Accordingly, the formation candidate as a preview image of the three-dimensional object can be visually recognized without requiring the user to perform an operation such as rotation.

19. According to a third aspect of the present disclosure, there is provided an image processing method. This image processing method is used to form a three-dimensional object, the image processing method includes a display step of causing a display section to display a first screen for a user to give an instruction, and a reception step of receiving the instruction from the user via the display section, the first screen includes a preview screen that makes formation candidates to be formed on the three-dimensional object visible to the user, and the preview screen includes i. a first preview screen that makes a first formation candidate, which is the formation candidate to be formed on a first forming surface of the three-dimensional object, visible to the user, ii. a second preview screen that makes a second formation candidate, which is the formation candidate to be formed on a second forming surface different from the first forming surface of the three-dimensional object, visible to the user, and iii. a third preview screen that makes a third formation candidate, which is the formation candidate to be formed on a third forming surface different from the first forming surface and the second forming surface of the three-dimensional object, visible to the user. According to the aspect, when a formation is formed on a three-dimensional object which is a three-dimensionally formed object, images of formation candidates to be formed viewed in a plurality of directions are displayed. Therefore, the user can easily confirm the formation formed on the plurality of forming surfaces. Accordingly, the user can confirm whether or not the desired formation is formed on each forming surface of the three-dimensional object before the formation is started. Further, the image processing device displays the formation candidates for each forming surface of the three-dimensional object. Accordingly, the formation candidate as a preview image of the three-dimensional object can be visually recognized without requiring the user to perform an operation such as rotation.

20. According to a fourth aspect of the present disclosure, there is provided a non-transitory computer-readable storage medium storing a computer program. This computer program is used to form a three-dimensional object, the computer program causes a computer to execute a display function of causing a display section to display a first screen for a user to give an instruction, and a reception function of receiving the instruction from the user via the display section, the first screen includes a preview screen that makes formation candidates to be formed on the three-dimensional object visible to the user, and the preview screen includes i. a first preview screen that makes a first formation candidate, which is the formation candidate to be formed on a first forming surface of the three-dimensional object, visible to the user, ii. a second preview screen that makes a second formation candidate, which is the formation candidate to be formed on a second forming surface different from the first forming surface of the three-dimensional object, visible to the user, and iii. a third preview screen that makes a third formation candidate, which is the formation candidate to be formed on a third forming surface different from the first forming surface and the second forming surface of the three-dimensional object, visible to the user. According to the aspect, when a formation is formed on a three-dimensional object which is a three-dimensionally formed object, images of formation candidates to be formed viewed in a plurality of directions are displayed. Therefore, the user can easily confirm the formation formed on the plurality of forming surfaces. Accordingly, the user can confirm whether or not the desired formation is formed on each forming surface of the three-dimensional object before the formation is started. Further, the image processing device displays the formation candidates for each forming surface of the three-dimensional object. Accordingly, the formation candidate as a preview image of the three-dimensional object can be visually recognized without requiring the user to perform an operation such as rotation.

The present disclosure can also be realized in various forms other than the image processing device. For example, the present disclosure can be realized in the form of a three-dimensional object forming device, an image processing method, a computer program for realizing the image processing method, a non-transitory recording medium on which the computer program is recorded, a manufacturing method of the image processing device, and the like.

What is claimed is:

1. An image processing device used to form a three-dimensional object, the image processing device comprising:
   a control section that causes a display section to display a first screen for a user to give an instruction; and
   a reception section that receives the instruction from the user via the display section, wherein
   the first screen includes a preview screen that makes formation candidates to be formed on the three-dimensional object visible to the user, and
   the preview screen includes
      i. a first preview screen that makes a first formation candidate, which is the formation candidate to be formed on a first forming surface of the three-dimensional object, visible to the user,
      ii. a second preview screen that makes a second formation candidate, which is the formation candidate to be formed on a second forming surface different from the first forming surface of the three-dimensional object, visible to the user, and
      iii. a third preview screen that makes a third formation candidate, which is the formation candidate to be formed on a third forming surface different from the first forming surface and the second forming surface of the three-dimensional object, visible to the user.

2. The image processing device according to claim 1, wherein
   the first preview screen includes a first individual determination screen for the user to determine whether or not to form the first formation candidate displayed on the first preview screen on the first forming surface.

3. The image processing device according to claim 2, wherein
   the first screen further includes an operation screen,
   the operation screen includes a first operation screen corresponding to the first preview screen, and
   the first operation screen includes a first individual selection screen for the user to individually select the first formation candidate.

4. The image processing device according to claim 3, wherein
   the first operation screen includes a determination screen for the user to determine whether or not to form the first formation candidate displayed on the first preview screen on the first forming surface.

5. The image processing device according to claim 4, wherein
   a determination of the user for the first individual determination screen via the reception section and a determination of the user for the determination screen via the reception section are linked to each other.

6. The image processing device according to claim 3, wherein
   the first operation screen includes a thumbnail screen that makes a thumbnail of the first formation candidate visible to the user.

7. The image processing device according to claim 6, wherein
   the first preview screen makes the first formation candidate visible together with the three-dimensional object, and
   the thumbnail screen does not make the three-dimensional object visible, and makes the first formation candidate visible.

8. The image processing device according to claim 3, wherein
   the second preview screen includes a second individual determination screen for the user to determine whether or not to form the second formation candidate displayed on the second preview screen on the second forming surface, and
   the third preview screen includes a third individual determination screen for the user to determine whether or not to form the third formation candidate displayed on the third preview screen on the third forming surface.

9. The image processing device according to claim 3, wherein
   the first screen includes a combination selection screen for the user to select a combination of the first formation candidate, the second formation candidate, and the third formation candidate.

10. The image processing device according to claim 3, wherein
    the control section causes the display section to display the first screen and a second screen in a switchable manner,
    the second screen includes another preview screen that makes another formation candidate, which is the formation candidate to be formed on another forming surface different from the first forming surface, the second forming surface, and the third forming surface of the three-dimensional object, visible to the user, and
    the first screen does not include the other preview screen.

11. The image processing device according to claim 10, wherein
    the second screen further includes the first preview screen, the second preview screen, and the third preview screen.

12. The image processing device according to claim 11, wherein
    the preview screen of the first screen includes M number of first individual preview screens, M being an integer of three or more,
    the second screen includes N number of second individual preview screens, N being an integer greater than M,
    the M number of first individual preview screens include the first preview screen, the second preview screen, and the third preview screen as the first individual preview screen, and the N number of second individual preview screens include the first preview screen, the second preview screen, the third preview screen, and the other preview screen as the second individual preview screen.

13. The image processing device according to claim 12, wherein
the second screen does not include the first individual determination screen for the user to determine whether or not to form the first formation candidate displayed on the first preview screen on the first forming surface, the first individual determination screen being located on the first preview screen.

14. The image processing device according to claim 11, wherein
the second screen does not include the operation screen.

15. The image processing device according to claim 11, wherein
when the user gives a non-formation instruction not to form the formation candidate on the first individual determination screen via the reception section, the first screen does not display the formation candidate for which the non-formation instruction is given on the preview screen.

16. The image processing device according to claim 11, wherein
the control section is configured to enlarge a size of the formation candidate displayed on the preview screen as compared with a first case in a second case where the number of the formation candidates displayed on the preview screen is smaller than that of the first case.

17. The image processing device according to claim 1, further comprising:
a generation section that ejects a liquid to the three-dimensional object to generate image data for forming an image as the formation candidate.

18. A three-dimensional object forming device comprising:
an ejection head that ejects a liquid; and
the image processing device according to claim 1.

19. An image processing method used to form a three-dimensional object, the image processing method comprising:
a display step of causing a display section to display a first screen for a user to give an instruction; and
a reception step of receiving the instruction from the user via the display section, wherein
the first screen includes a preview screen that makes formation candidates to be formed on the three-dimensional object visible to the user, and
the preview screen includes
  i. a first preview screen that makes a first formation candidate, which is the formation candidate to be formed on a first forming surface of the three-dimensional object, visible to the user,
  ii. a second preview screen that makes a second formation candidate, which is the formation candidate to be formed on a second forming surface different from the first forming surface of the three-dimensional object, visible to the user, and
  iii. a third preview screen that makes a third formation candidate, which is the formation candidate to be formed on a third forming surface different from the first forming surface and the second forming surface of the three-dimensional object, visible to the user.

20. A non-transitory computer-readable storage medium storing a computer program used to form a three-dimensional object, the computer program causing a computer to execute:
a display function of causing a display section to display a first screen for a user to give an instruction; and
a reception function of receiving the instruction from the user via the display section, wherein
the first screen includes a preview screen that makes formation candidates to be formed on the three-dimensional object visible to the user, and
the preview screen includes
  i. a first preview screen that makes a first formation candidate, which is the formation candidate to be formed on a first forming surface of the three-dimensional object, visible to the user,
  ii. a second preview screen that makes a second formation candidate, which is the formation candidate to be formed on a second forming surface different from the first forming surface of the three-dimensional object, visible to the user, and
  iii. a third preview screen that makes a third formation candidate, which is the formation candidate to be formed on a third forming surface different from the first forming surface and the second forming surface of the three-dimensional object, visible to the user.

* * * * *